US005563642A

United States Patent [19]

Keefe et al.

[11] Patent Number: 5,563,642

[45] Date of Patent: Oct. 8, 1996

[54] INKJET PRINTHEAD ARCHITECTURE FOR HIGH SPEED INK FIRING CHAMBER REFILL

[75] Inventors: Brian J. Keefe, La Jolla; May F. Ho, La Mesa; Kenneth J. Courian, San Diego; Steven W. Steinfield, San Diego; Winthrop D. Childers, San Diego, all of Calif.; Ellen R. Tappon; Kenneth E. Trueba, both of Corvallis, Oreg.; Terri I. Chapman, Escondido, Calif.; William R. Knight; Jules G. Moritz, III, both of Corvallis, Oreg.

[73] Assignee: Hewlett-Packard Company, Palo Alto, Calif.

[21] Appl. No.: 320,084

[22] Filed: Oct. 6, 1994

Related U.S. Application Data

[63] Continuation-in-part of Ser. No. 179,866, Jan. 11, 1994, which is a continuation of Ser. No. 862,086, Apr. 2, 1992, Pat. No. 5,278,584.

[51] Int. Cl.$^6$ .................................................... G01D 15/18

[52] U.S. Cl. ................................................................ 347/84

[58] Field of Search ................................. 347/84, 85, 86, 347/87, 62–63, 65

[56] References Cited

U.S. PATENT DOCUMENTS

| | | | |
|---|---|---|---|
| 4,312,009 | 1/1982 | Lange . | |
| 4,502,060 | 2/1985 | Rankin et al. . | |
| 4,558,333 | 12/1985 | Sugitani et al. . | |
| 4,587,534 | 5/1986 | Saito et al. . | |
| 4,611,219 | 9/1986 | Sugitani et al. . | |
| 4,638,337 | 1/1987 | Tarpey et al. | 347/62 |
| 4,683,481 | 7/1987 | Johnson . | |
| 4,695,854 | 9/1987 | Cruz-Uribe . | |
| 4,712,172 | 12/1987 | Kiyohara et al. . | |
| 4,734,717 | 3/1988 | Rayfield . | |
| 4,789,425 | 12/1988 | Drake et al. | 156/644 |
| 4,791,440 | 12/1988 | Eldridge et al. . | |
| 4,847,630 | 7/1989 | Bhaskar et al. . | |
| 4,882,595 | 11/1989 | Trueba et al. . | |
| 4,897,666 | 1/1990 | Katerberg et al. | 347/62 |
| 4,942,408 | 7/1990 | Braun . | |
| 4,999,650 | 3/1991 | Braun . | |
| 5,008,689 | 4/1991 | Pan et al. | 347/63 |
| 5,059,989 | 10/1991 | Eldridge et al. . | |
| 5,198,834 | 3/1993 | Childers et al. | 347/47 |
| 5,202,659 | 4/1993 | De Bonte et al. | 347/63 |
| 5,305,015 | 4/1994 | Schantz et al. | 347/47 |

FOREIGN PATENT DOCUMENTS

| | | | |
|---|---|---|---|
| 314486 | 3/1989 | European Pat. Off. | B41J 3/04 |

*Primary Examiner*—Tru Anh Dang
*Attorney, Agent, or Firm*—Dennis G. Stenstrom

[57] ABSTRACT

Disclosed is an inkjet print cartridge having an ink reservoir; a substrate having a plurality of individual ink firing chambers with an ink firing element in each chamber along a top surface of the substrate and having a first outer edge along a periphery of substrate; the first outer edge being in close proximity to the ink firing chambers. The ink firing chambers are arranged in a first chamber array and a second chamber array and with the firing chambers spaced so as to provide 600 dots per inch printing. An ink channel connects the reservoir with the ink firing chambers, the channel including a primary channel connected at a first end with the reservoir and at a second end to a secondary channel; the primary channel allowing ink to flow from the ink reservoir, around the first outer edge of the substrate to the secondary channel along the top surface of the substrate so as to be proximate to the ink firing chambers. A separate inlet passage for each firing chamber connecting the secondary channel with the firing chamber for allowing high frequency refill of the firing chamber. A group of the firing chambers in adjacent relationship forming a primitive in which only one firing chamber in the primitive is activated at a time. First circuit member on the substrate connects to the firing elements and a second circuit member on the cartridge connects to the first circuit member, for transmitting firing signals to the ink firing elements at a frequency greater than 9 kHz.

22 Claims, 39 Drawing Sheets

| NOZZLE | X | Y | NOZZLE | X | Y |
|---|---|---|---|---|---|
| 1 | 2035.0 | 6329.0 | 51 | 2036.5 | 4212.5 |
| 2 | -2057.0 | 6285.5 | 52 | -2055.5 | 4170.0 |
| 3 | 2061.0 | 6244.25 | 53 | 2062.75 | 4127.50 |
| 4 | -2069.50 | 6202.00 | 54 | -2068.00 | 1085.25 |
| 5 | 2048.75 | 6159.50 | 55 | 2050.50 | 4042.75 |
| 6 | -2043.75 | 6117.25 | 56 | -2042.00 | 4000.50 |
| 7 | 2036.75 | 6075.00 | 57 | 2038.50 | 3958.25 |
| 8 | -2055.75 | 6032.75 | 58 | -2054.00 | 3916.00 |
| 9 | 2062.75 | 5990.25 | 59 | 2064.50 | 3873.50 |
| 10 | -2068.00 | 5948.00 | 60 | -2066.25 | 3831.25 |
| 11 | 2050.50 | 5905.50 | 61 | 2052.25 | 3788.75 |
| 12 | -2042.0 | 5863.25 | 62 | -2040.25 | 3746.50 |
| 13 | 2038.50 | 5821.00 | 63 | 2040.25 | 3704.25 |
| 14 | -2054.00 | 5778.75 | 64 | -2052.25 | 3662.00 |
| 15 | 2064.50 | 5736.25 | 65 | 2066.25 | 3619.50 |
| 16 | -2066.25 | 5694.00 | 66 | -2064.50 | 3577.25 |
| 17 | 2052.25 | 5651.50 | 67 | 2054.00 | 3534.75 |
| 18 | 2040.25 | 5609.25 | 68 | -2038.50 | 3492.50 |
| 19 | 2040.25 | 5567.00 | 69 | 2042.00 | 3450.25 |
| 20 | -2052.25 | 5524.75 | 70 | -2050.50 | 3408.00 |
| 21 | 2066.25 | 5482.25 | 71 | 2068.00 | 3365.50 |
| 22 | -2064.50 | 5440.00 | 72 | -2062.75 | 3223.25 |
| 23 | 2054.00 | 5397.50 | 73 | 2055.75 | 3280.75 |
| 24 | -2038.50 | 5355.25 | 74 | -2036.75 | 3238.50 |
| 25 | 2042.00 | 5313.00 | 75 | 2043.75 | 3196.25 |
| 26 | -2050.50 | 5270.75 | 76 | -2048.75 | 3154.00 |
| 27 | 2068.00 | 5228.25 | 77 | 2069.50 | 3111.50 |
| 28 | -2062.75 | 5186.00 | 78 | -2061.00 | 3069.25 |
| 29 | 2055.75 | 5143.50 | 79 | 2057.50 | 3026.75 |
| 30 | -2036.75 | 5101.25 | 80 | -2035.00 | 2984.50 |
| 31 | 2043.75 | 5059.00 | 81 | 2045.25 | 2942.25 |
| 32 | -2048.75 | 5016.75 | 82 | -2047.00 | 2900.00 |
| 33 | 2069.50 | 1974.25 | 83 | 2071.25 | 2875.50 |
| 34 | -2061.00 | 1932.00 | 84 | -2059.25 | 2815.25 |
| 35 | 2057.50 | 1889.50 | 85 | 2059.25 | 2772.75 |
| 36 | -2035.00 | 1847.25 | 86 | -2071.25 | 2730.50 |
| 37 | 2045.25 | 1805.00 | 87 | 2047.00 | 2688.00 |
| 38 | -2047.00 | 1762.75 | 88 | -2045.25 | 2645.75 |
| 39 | 2071.25 | 1720.25 | 89 | 2035.00 | 2603.50 |
| 40 | -2059.25 | 1678.00 | 90 | -2057.50 | 2561.25 |
| 41 | 2059.25 | 1635.50 | 91 | 2061.00 | 2518.75 |
| 42 | 2071.25 | 1593.25 | 92 | -2069.50 | 2476.50 |
| 43 | 2047.00 | 1550.75 | 93 | 2048.75 | 2434.00 |
| 44 | -2045.25 | 1508.50 | 94 | -2043.75 | 2391.75 |
| 45 | 2035.00 | 1466.25 | 95 | 2036.50 | 2349.50 |
| 46 | -2057.50 | 1124.00 | 96 | -2055.75 | 2307.25 |
| 47 | 2061.00 | 1381.50 | 97 | 2062.75 | 2264.75 |
| 48 | -2069.50 | 1339.25 | 98 | -2068.00 | 2222.50 |
| 49 | 2048.75 | 1296.75 | 99 | 2050.50 | 2180.00 |
| 50 | -2043.75 | 1254.50 | 100 | -2042.00 | 2137.75 |

FIG.24A

| NOZZLE | X | Y | NOZZLE | X | Y |
|---|---|---|---|---|---|
| 101 | 2038.50 | 2095.50 | 151 | 2040.25 | -21.00 |
| 102 | -2054.00 | 2053.25 | 152 | -2052.25 | -63.25 |
| 103 | 2064.50 | 2010.75 | 153 | 2066.25 | -105.75 |
| 104 | -2066.25 | 1968.50 | 154 | -2064.50 | -148.00 |
| 105 | 2052.25 | 1926.00 | 155 | 2054.00 | -190.50 |
| 106 | -2040.25 | 1883.75 | 156 | -2038.50 | -232.75 |
| 107 | 2040.25 | 1841.50 | 157 | 2042.00 | -275.00 |
| 108 | -2052.25 | 1799.25 | 158 | 2050.50 | -317.25 |
| 109 | 2066.25 | 1756.75 | 159 | 2068.00 | -359.75 |
| 110 | -2064.50 | 1714.50 | 160 | -2062.75 | -402.00 |
| 111 | 2054.00 | 1672.00 | 161 | 2055.75 | -444.50 |
| 112 | -2038.50 | 1629.75 | 162 | -2036.75 | -486.75 |
| 113 | 2042.00 | 1587.50 | 163 | 2043.75 | -529.00 |
| 114 | -2050.50 | 1545.25 | 164 | -2048.75 | -571.25 |
| 115 | 2068.00 | 1502.75 | 165 | 2069.50 | -613.75 |
| 116 | -2062.75 | 1460.50 | 166 | -2061.00 | -656.00 |
| 117 | 2055.75 | 1418.00 | 167 | 2057.50 | -698.50 |
| 118 | -2036.75 | 1375.75 | 168 | -2035.00 | -740.75 |
| 119 | 2043.75 | 1333.50 | 169 | 2045.25 | -783.00 |
| 120 | -2048.75 | 1291.25 | 170 | -2047.00 | -825.25 |
| 121 | 2069.50 | 1248.75 | 171 | 2071.25 | -867.75 |
| 122 | -2061.00 | 1206.50 | 172 | -2059.25 | -910.00 |
| 123 | 2057.50 | 1164.00 | 173 | 2059.25 | -952.50 |
| 124 | -2035.00 | 1121.75 | 174 | -2071.25 | -994.75 |
| 125 | 2045.25 | 1079.50 | 175 | 2047.00 | -1037.25 |
| 126 | -2047.00 | 1037.25 | 176 | -2045.25 | -1079.50 |
| 127 | 2071.25 | 994.75 | 177 | 2035.00 | -1121.75 |
| 128 | -2059.25 | 952.50 | 178 | -2057.50 | -1164.00 |
| 129 | 2059.25 | 910.25 | 179 | 2061.00 | -1206.50 |
| 130 | -2071.25 | 868.00 | 180 | -2069.50 | -1248.75 |
| 131 | 2047.00 | 825.50 | 181 | 2048.75 | -1291.25 |
| 132 | -2045.25 | 783.25 | 182 | -2043.75 | -1333.50 |
| 133 | 2035.00 | 741.00 | 183 | 2036.75 | -1375.75 |
| 134 | -2057.50 | 698.75 | 184 | -2055.75 | -1418.00 |
| 135 | 2061.00 | 656.25 | 185 | 2062.75 | -1460.50 |
| 136 | -2069.50 | 614.00 | 186 | -2068.00 | -1502.75 |
| 137 | 2048.75 | 571.50 | 187 | 2050.50 | -1545.25 |
| 138 | -2043.75 | 529.25 | 188 | -2012.00 | -1587.50 |
| 139 | 2036.75 | 447.00 | 189 | 2038.50 | -1629.75 |
| 140 | -2055.75 | 444.75 | 190 | -2054.00 | -1672.00 |
| 141 | 2062.75 | 402.25 | 191 | 2064.50 | -1714.50 |
| 142 | -2068.00 | 360.00 | 192 | -2066.25 | -1756.75 |
| 143 | 2050.50 | 317.50 | 193 | 2052.25 | -1799.25 |
| 144 | -2042.00 | 275.25 | 194 | -2040.25 | -1841.50 |
| 145 | 2038.50 | 233.00 | 195 | 2040.25 | -1883.75 |
| 146 | -2054.00 | 190.75 | 196 | -2052.25 | -1926.00 |
| 147 | 2064.50 | 148.25 | 197 | 2066.25 | -1968.50 |
| 148 | -2066.25 | 106.00 | 198 | -2064.50 | -2010.75 |
| 149 | 2052.25 | 63.50 | 199 | 2054.00 | -2053.25 |
| 150 | -2040.25 | 21.25 | 200 | 2038.50 | -2095.50 |

FIG.24B

| NOZZLE | X | Y | NOZZLE | X | Y |
|---|---|---|---|---|---|
| 201 | 2042.00 | -2137.75 | 251 | 2043.75 | -4254.50 |
| 202 | -2050.50 | -2180.00 | 252 | -2048.75 | -4296.75 |
| 203 | 2068.00 | -2222.50 | 253 | 2069.50 | -4339.25 |
| 204 | -2062.75 | -2264.75 | 254 | -2061.00 | -4381.50 |
| 205 | 2055.75 | -2307.25 | 255 | 2057.00 | -4424.00 |
| 206 | -2036.75 | -2349.50 | 256 | -2035.00 | -4466.25 |
| 207 | 2043.75 | -2391.75 | 257 | 2045.25 | -4508.50 |
| 208 | -2048.75 | -2434.00 | 258 | -2047.00 | -4550.75 |
| 209 | 2069.50 | -2476.50 | 259 | 2071.25 | -4593.25 |
| 210 | -2061.00 | -2518.75 | 260 | -2059.25 | -4635.50 |
| 211 | 2057.50 | -2561.25 | 261 | 2059.25 | -4577.75 |
| 212 | -2035.00 | -2603.50 | 262 | -2071.25 | -4720.00 |
| 213 | 2045.25 | -2645.75 | 263 | 2047.00 | -4762.50 |
| 214 | -2047.00 | -2688.00 | 264 | -2045.25 | -4804.75 |
| 215 | 2071.25 | -2730.50 | 265 | 2035.00 | -4847.00 |
| 216 | -2059.25 | -2772.75 | 266 | -2057.50 | -4889.25 |
| 217 | 2059.25 | -2815.25 | 267 | 2061.00 | -4931.75 |
| 218 | -2071.25 | -2857.50 | 268 | -2069.50 | -4974.00 |
| 219 | 2047.00 | -2900.00 | 269 | 2048.75 | -5016.50 |
| 220 | -2045.25 | -2942.25 | 270 | -2043.75 | -5058.75 |
| 221 | 2035.00 | -2984.50 | 271 | 2036.75 | -5101.00 |
| 222 | -2057.50 | -3026.75 | 272 | -2055.75 | -5143.25 |
| 223 | 2061.00 | -3069.25 | 273 | 2062.75 | -5185.75 |
| 224 | -2069.50 | -3111.50 | 274 | -2068.00 | -5228.00 |
| 225 | 2048.75 | -3154.00 | 275 | 2050.50 | -5270.50 |
| 226 | -2043.75 | -3196.25 | 276 | -2042.00 | -5312.75 |
| 227 | 2036.75 | -3238.50 | 277 | 2038.50 | -5355.00 |
| 228 | -2055.75 | -3280.75 | 278 | -2054.00 | -5397.25 |
| 229 | 2062.75 | -3323.25 | 279 | 2064.50 | -5439.75 |
| 230 | -2068.00 | -3365.50 | 280 | -2066.25 | -5482.00 |
| 231 | 2050.50 | -3408.00 | 281 | 2052.25 | -5524.50 |
| 232 | -2042.00 | -3450.25 | 282 | -2040.25 | -5566.75 |
| 233 | 2038.50 | -3492.50 | 283 | 2040.25 | -5609.00 |
| 234 | -2054.00 | -3534.75 | 284 | -2052.25 | -5651.25 |
| 235 | 2064.50 | -3577.25 | 285 | 2066.25 | -5693.75 |
| 236 | -2066.25 | -3619.50 | 286 | -2064.50 | -5736.00 |
| 237 | 2052.25 | -3662.00 | 287 | 2054.00 | -5778.50 |
| 238 | -2040.25 | -3701.25 | 288 | -2038.50 | -5820.75 |
| 239 | 2040.25 | -3746.50 | 289 | 2042.00 | -5863.00 |
| 240 | -2052.25 | -3788.75 | 290 | -2050.50 | -5905.25 |
| 241 | 2066.25 | -3831.25 | 291 | 2068.00 | -5947.75 |
| 242 | -2064.50 | -3873.50 | 292 | -2062.75 | -5990.00 |
| 243 | 2054.00 | -3916.00 | 293 | 2055.75 | -6032.50 |
| 244 | -2038.50 | -3958.25 | 294 | -2036.75 | -6074.75 |
| 245 | 2042.00 | -4000.50 | 295 | 2043.75 | -6117.00 |
| 246 | -2050.50 | -4042.75 | 296 | -2048.75 | -6159.25 |
| 247 | 2068.00 | -4085.25 | 297 | 2069.50 | -6201.75 |
| 248 | -2062.75 | -4127.50 | 298 | -2061.00 | -6244.00 |
| 249 | 2055.75 | -4170.00 | 299 | 2057.50 | -6286.50 |
| 250 | -2036.75 | -4212.25 | 300 | -2035.00 | -6328.75 |

FIG.24C

| NOZZLE | PRIM # | ADDR # | | NOZZLE | PRIM # | ADDR # |
|---|---|---|---|---|---|---|
| 1 | 1 | 1 | | 51 | 3 | 2 |
| 2 | 2 | 9 | | 52 | 4 | 10 |
| 3 | 1 | 16 | | 53 | 3 | 17 |
| 4 | 2 | 2 | | 54 | 4 | 3 |
| 5 | 1 | 9 | | 55 | 3 | 10 |
| 6 | 2 | 17 | | 56 | 4 | 18 |
| 7 | 1 | 2 | | 57 | 3 | 3 |
| 8 | 2 | 10 | | 58 | 4 | 11 |
| 9 | 1 | 17 | | 59 | 3 | 18 |
| 10 | 2 | 3 | | 60 | 4 | 4 |
| 11 | 1 | 10 | | 61 | 3 | 11 |
| 12 | 2 | 18 | | 62 | 4 | 19 |
| 13 | 1 | 3 | | 63 | 3 | 4 |
| 14 | 2 | 11 | | 64 | 4 | 12 |
| 15 | 1 | 18 | | 65 | 3 | 19 |
| 16 | 2 | 4 | | 66 | 4 | 5 |
| 17 | 1 | 11 | | 67 | 3 | 12 |
| 18 | 2 | 19 | | 68 | 4 | 20 |
| 19 | 1 | 4 | | 69 | 3 | 5 |
| 20 | 2 | 12 | | 70 | 4 | 13 |
| 21 | 1 | 19 | | 71 | 3 | 20 |
| 22 | 2 | 5 | | 72 | 4 | 6 |
| 23 | 1 | 12 | | 73 | 3 | 13 |
| 24 | 2 | 20 | | 74 | 4 | 21 |
| 25 | 1 | 5 | | 75 | 3 | 6 |
| 26 | 2 | 13 | | 76 | 4 | 14 |
| 27 | 1 | 20 | | 77 | 3 | 21 |
| 28 | 2 | 6 | | 78 | 4 | 7 |
| 29 | 1 | 13 | | 79 | 3 | 14 |
| 30 | 2 | 21 | | 80 | 4 | 22 |
| 31 | 1 | 6 | | 81 | 3 | 7 |
| 32 | 2 | 14 | | 82 | 4 | 15 |
| 33 | 1 | 21 | | 83 | 3 | 22 |
| 34 | 2 | 7 | | 84 | 4 | 8 |
| 35 | 1 | 14 | | 85 | 5 | 15 |
| 36 | 2 | 22 | | 86 | 6 | 1 |
| 37 | 1 | 7 | | 87 | 5 | 8 |
| 38 | 2 | 15 | | 88 | 6 | 16 |
| 39 | 1 | 22 | | 89 | 5 | 1 |
| 40 | 2 | 8 | | 90 | 6 | 9 |
| 41 | 3 | 15 | | 91 | 5 | 16 |
| 42 | 4 | 1 | | 92 | 6 | 2 |
| 43 | 3 | 8 | | 93 | 5 | 9 |
| 44 | 4 | 16 | | 94 | 6 | 17 |
| 45 | 3 | 1 | | 95 | 5 | 2 |
| 46 | 4 | 9 | | 96 | 6 | 10 |
| 47 | 3 | 16 | | 97 | 5 | 17 |
| 48 | 4 | 2 | | 98 | 6 | 3 |
| 49 | 3 | 9 | | 99 | 5 | 10 |
| 50 | 4 | 17 | | 100 | 6 | 18 |

FIG.28A

| NOZZLE | PRIM # | ADDR # | | NOZZLE | PRIM # | ADDR # |
|---|---|---|---|---|---|---|
| 101 | 5 | 3 | | 151 | 7 | 4 |
| 102 | 6 | 11 | | 152 | 8 | 12 |
| 103 | 5 | 18 | | 153 | 7 | 19 |
| 104 | 6 | 4 | | 154 | 8 | 5 |
| 105 | 5 | 11 | | 155 | 7 | 12 |
| 106 | 6 | 19 | | 156 | 8 | 20 |
| 107 | 5 | 4 | | 157 | 7 | 5 |
| 108 | 6 | 12 | | 158 | 8 | 13 |
| 109 | 5 | 19 | | 159 | 7 | 20 |
| 110 | 6 | 5 | | 160 | 8 | 6 |
| 111 | 5 | 12 | | 161 | 7 | 13 |
| 112 | 6 | 20 | | 162 | 8 | 21 |
| 113 | 5 | 5 | | 163 | 7 | 6 |
| 114 | 6 | 13 | | 164 | 8 | 14 |
| 115 | 5 | 20 | | 165 | 7 | 21 |
| 116 | 6 | 6 | | 166 | 8 | 7 |
| 117 | 5 | 13 | | 167 | 7 | 14 |
| 118 | 6 | 21 | | 168 | 8 | 22 |
| 119 | 5 | 6 | | 169 | 7 | 7 |
| 120 | 6 | 14 | | 170 | 8 | 15 |
| 121 | 5 | 21 | | 171 | 7 | 22 |
| 122 | 6 | 7 | | 172 | 8 | 8 |
| 123 | 5 | 14 | | 173 | 9 | 15 |
| 124 | 6 | 22 | | 174 | 10 | 1 |
| 125 | 5 | 7 | | 175 | 9 | 8 |
| 126 | 6 | 15 | | 176 | 10 | 16 |
| 127 | 5 | 22 | | 177 | 9 | 1 |
| 128 | 6 | 8 | | 178 | 10 | 9 |
| 129 | 7 | 15 | | 179 | 9 | 16 |
| 130 | 8 | 1 | | 180 | 10 | 2 |
| 131 | 7 | 8 | | 181 | 9 | 9 |
| 132 | 8 | 16 | | 182 | 10 | 17 |
| 133 | 7 | 1 | | 183 | 9 | 2 |
| 134 | 8 | 9 | | 184 | 10 | 10 |
| 135 | 7 | 16 | | 185 | 9 | 17 |
| 136 | 8 | 2 | | 186 | 10 | 3 |
| 137 | 7 | 9 | | 187 | 9 | 10 |
| 138 | 8 | 17 | | 188 | 10 | 18 |
| 139 | 7 | 2 | | 189 | 9 | 3 |
| 140 | 8 | 10 | | 190 | 10 | 11 |
| 141 | 7 | 17 | | 191 | 9 | 18 |
| 142 | 8 | 3 | | 192 | 10 | 4 |
| 143 | 7 | 10 | | 193 | 9 | 11 |
| 144 | 8 | 18 | | 194 | 10 | 19 |
| 145 | 7 | 3 | | 195 | 9 | 4 |
| 146 | 8 | 11 | | 196 | 10 | 12 |
| 147 | 7 | 18 | | 197 | 9 | 19 |
| 148 | 8 | 4 | | 198 | 10 | 5 |
| 149 | 7 | 11 | | 199 | 9 | 12 |
| 150 | 8 | 19 | | 200 | 10 | 20 |

FIG.28B

| NOZZLE | PRIM # | ADDR # | | NOZZLE | PRIM # | ADDR # |
|---|---|---|---|---|---|---|
| 201 | 9 | 5 | | 251 | 11 | 6 |
| 202 | 10 | 13 | | 252 | 12 | 14 |
| 203 | 9 | 20 | | 253 | 11 | 21 |
| 204 | 10 | 6 | | 254 | 12 | 7 |
| 205 | 9 | 13 | | 255 | 11 | 14 |
| 206 | 10 | 21 | | 256 | 12 | 22 |
| 207 | 9 | 6 | | 257 | 11 | 7 |
| 208 | 10 | 14 | | 258 | 12 | 15 |
| 209 | 9 | 21 | | 259 | 11 | 22 |
| 210 | 10 | 7 | | 260 | 12 | 8 |
| 211 | 9 | 14 | | 261 | 13 | 15 |
| 212 | 10 | 22 | | 262 | 14 | 1 |
| 213 | 9 | 7 | | 263 | 13 | 8 |
| 214 | 10 | 15 | | 264 | 14 | 16 |
| 215 | 9 | 22 | | 265 | 13 | 1 |
| 216 | 10 | 8 | | 266 | 14 | 9 |
| 217 | 11 | 15 | | 267 | 13 | 16 |
| 218 | 12 | 1 | | 268 | 14 | 2 |
| 219 | 11 | 8 | | 269 | 13 | 9 |
| 220 | 12 | 16 | | 270 | 14 | 17 |
| 221 | 11 | 1 | | 271 | 13 | |
| 222 | 12 | 9 | | 272 | 14 | |
| 223 | 11 | 16 | | 273 | 13 | 17 |
| 224 | 12 | 2 | | 274 | 14 | 3 |
| 225 | 11 | 9 | | 275 | 13 | 10 |
| 226 | 12 | 17 | | 276 | 14 | 18 |
| 227 | 11 | 2 | | 277 | 13 | 3 |
| 228 | 12 | 10 | | 278 | 14 | 11 |
| 229 | 11 | 17 | | 279 | 13 | 18 |
| 230 | 12 | 3 | | 280 | 14 | 4 |
| 231 | 11 | 10 | | 281 | 13 | 11 |
| 232 | 12 | 18 | | 282 | 14 | 19 |
| 233 | 11 | 3 | | 283 | 13 | 4 |
| 234 | 12 | 11 | | 284 | 14 | 12 |
| 235 | 11 | 18 | | 285 | 13 | 19 |
| 236 | 12 | 4 | | 286 | 14 | 5 |
| 237 | 11 | 11 | | 287 | 13 | 12 |
| 238 | 12 | 19 | | 288 | 14 | 20 |
| 239 | 11 | 4 | | 289 | 13 | 5 |
| 240 | 12 | 12 | | 290 | 14 | 13 |
| 241 | 11 | 19 | | 291 | 13 | 20 |
| 242 | 12 | 5 | | 292 | 14 | |
| 243 | 11 | 12 | | 293 | 13 | |
| 244 | 12 | 20 | | 294 | 14 | 21 |
| 245 | 11 | 5 | | 295 | 13 | 6 |
| 246 | 12 | 13 | | 296 | 14 | 14 |
| 247 | 11 | 20 | | 297 | 13 | 21 |
| 248 | 12 | 6 | | 298 | 14 | 7 |
| 249 | 11 | 13 | | 299 | 13 | 14 |
| 250 | 12 | 21 | | 300 | 14 | 22 |

FIG.28C

INKJET PRINTHEAD ARCHITECTURE FOR HIGH SPEED INK FIRING CHAMBER REFILL

CROSS-REFERENCE TO RELATED APPLICATIONS

This application is a continuation-in-part application of co-pending U.S. application Ser. No. 08/179,866, filed Jan. 11, 1994 entitled "Improved Ink Delivery System for an Inkjet Printhead," by Brian J. Keefe, et al., which is a continuation application of U.S. application Ser. No. 07/862,086, filed Apr. 2, 1992 now U.S. Pat. No. 5,278,584 to Keefe, et al., entitled "Ink Delivery System for an Inkjet Printhead."

This application also relates to the subject matter disclosed in the following U.S. patents and co-pending U.S. applications:

U.S. Pat. No. 4,926,197 to Childers, entitled "Plastic Substrate for Thermal Ink Jet Printer;"

U.S. Pat. No. 5,305,018, entitled "Excimer Laser Ablated Components for Inkjet Printheads;"

U.S. Pat. No. 5,442,384, entitled "Integrated Nozzle Member and TAB Circuit for Inkjet Printhead;"

U.S. Pat. No. 5,291,226, entitled "Nozzle Member Including Ink Flow Channels;"

U.S. Pat. No. 5,305,015, entitled "Laser Ablated Nozzle Member for Inkjet Printhead;"

U.S. Pat. No. 5,420,627, entitled "Improved Inkjet Printhead;"

U.S. Pat. No. 5,442,386, entitled "Structure and Method for Aligning a Substrate With Respect to Orifices in an Inkjet Printhead;"

U.S. Pat. No. 5,450,113, entitled "Inkjet Printhead with Improved Seal Arrangement;"

U.S. Pat. No. 5,300,959, entitled "Efficient Conductor Routing for an Inkjet Printhead;"

U.S. Pat. No. 5,469,199, entitled "Wide Inkjet Printhead;"

U.S. application Ser. No. 08/009,151, filed Jan. 25, 1993, entitled "Fabrication of Ink Fill Slots in Thermal Inkjet Printheads Utilizing Chemical Micromachining;"

U.S. application Ser. No. 08/236,915, filed Apr. 29, 1994, entitled "Thermal Inkjet Printer Printhead;"

U.S. application Ser. No. 08/235,610, filed Apr. 29, 1994, entitled "Edge Feed Ink Delivery Thermal Inkjet Printhead Structure and Method of Fabrication;"

U.S. Pat. No. 4,719,477 to Hess, entitled "Integrated Thermal Ink Jet Printhead and Method of Manufacture;"

U.S. Pat. No. 5,122,812 to Hess, et al., entitled "Thermal Inkjet Printhead Having Driver Circuitry Thereon and Method for Making the Same;" and U.S. Pat. No. 5,159,353 to Fasen, et al., entitled "Thermal Inkjet Printhead Structure and Method for Making the Same;"

U.S. patent application ser. No. 08/319,896, filed Oct. 6, 1994, entiltled "Inkjet Printhead Architecture for High Speed and High Resolution Printing," Attorney Docket No. 1093667-1;

U.S. patent application Ser. No. 08/319,404, filed Oct. 6, 1994, entiltled "Inkjet Printhead Architecture for High Frequency Operation," Attorney Docket No. 1093720-1;

U.S. patent application Ser. No. 08/320,084, filed Oct. 6, 1994, entiltled "High Density Nozzle Array for Inkjet Printhead," Attorney Docket No. 1093722-1;

U.S. patent application Ser. No. 08/319,893, filed Oct. 6, 1994, entiltled "Barrier Architecture for Inkjet Printhead," Attorney Docket No. 1094610-1;

U.S. patent application Ser. No. 08/319,895, filed Oct. 6, 1994, entiltled "Compact Inkjet Substrate with a Minimal Number of Circuit Interconnects Located at the End Thereof," Attorney Docket No. 1094979-1; and U.S. patent application filed concurrently herewith, entiltled "Compact Inkjet Substrate with Centrally Located Circuitry and Edge Feed Ink Channels," Attorney Docket No. 1093721-1;

The above patent and co-pending applications are assigned to the present assignee and are incorporated herein by reference.

FIELD OF THE INVENTION

The present invention generally relates to inkjet and other types of printers and, more particularly, to the printhead portion of an inkjet printer.

BACKGROUND OF THE INVENTION

Thermal inkjet print cartridges operate by rapidly heating a small volume of ink to cause the ink to vaporize and be ejected through one of a plurality of orifices so as to print a dot of ink on a recording medium, such as a sheet of paper. Typically, the orifices are arranged in one or more linear arrays in a nozzle member. The properly sequenced ejection of ink from each orifice causes characters or other images to be printed upon the paper as the printhead is moved relative to the paper. The paper is typically shifted each time the printhead has moved across the paper. The thermal inkjet printer is fast and quiet, as only the ink strikes the paper. These printers produce high quality printing and can be made both compact and affordable.

An inkjet printhead generally includes: (1) ink channels to supply ink from an ink reservoir to each vaporization chamber proximate to an orifice; (2) a metal orifice plate or nozzle member in which the orifices are formed in the required pattern; and (3) a silicon substrate containing a series of thin film resistors, one resistor per vaporization chamber.

To print a single dot of ink, an electrical current from an external power supply is passed through a selected thin film resistor. The resistor is then heated, in turn superheating a thin layer of the adjacent ink within a vaporization chamber, causing explosive vaporization, and, consequently, causing a droplet of ink to be ejected through an associated orifice onto the paper.

In an inkjet printhead, described in U.S. Pat. No. 4,683,481 to Johnson, entitled "Thermal Ink Jet Common-Slotted Ink Feed Printhead," ink is fed from an ink reservoir to the various vaporization chambers through an elongated hole formed in the substrate. The ink then flows to a manifold area, formed in a barrier layer between the substrate and a nozzle member, then into a plurality of ink channels, and finally into the various vaporization chambers. This design may be classified as a "center" feed design, whereby ink is fed to the vaporization chambers from a central location then distributed outward into the vaporization chambers. Some disadvantages of this type of ink feed design are that manufacturing time is required to make the hole in the substrate, and the required substrate area is increased by at least the area of the hole. Also, once the hole is formed, the substrate is relatively fragile, making handling more difficult. Further, the manifold inherently provides some restriction of ink flow to the vaporization chambers such that the energization of heater elements within a vaporization chamber may affect the flow of ink into a nearby vaporization chamber, thus producing crosstalk which affects the amount of ink emitted by an orifice upon energization of a nearby heater element. More importantly, prior printhead design limited the ability of printheads to have the high nozzle densities and the high operating frequencies and firing rates required for increased resolution and throughput. Print resolution depends on the density of ink-ejecting orifices and heating resistors formed on the cartridge printhead substrate. Modern circuit fabrication techniques allow the placement of substantial numbers of resistors on a single printhead substrate. However, the number of resistors applied to the substrate is limited by the conductive components used to electrically connect the cartridge to external driver circuitry in the printer unit. Specifically, an increasingly large number of resistors requires a correspondingly large number of interconnection pads, leads, and the like. This increase in components and interconnects causes greater manufacturing/production costs, and increases the probability that defects will occur during the manufacturing process. In order to solve this problem, thermal inkjet printheads have been developed which incorporate pulse driver circuitry directly on the printhead substrate with the resistors. The incorporation of driver circuitry on the printhead substrate in this manner reduces the number of interconnect components needed to electrically connect the cartridge to the printer unit. This results in an improved degree of production and operating efficiency. This development is described in U.S. Pat. Nos. 4,719,477 and 5,122,812 which are herein incorporated by reference.

To produce high-efficiency, integrated printing systems as described above, significant research has been conducted in order to develop improved transistor structures and methods for integrating the same into thermal inkjet printing units. The integration of driver components and printing resistors onto a common substrate results in a need for specialized, multi-layer connective circuitry so that the driver transistors can communicate with the resistors and other portions of the printing system. Typically, this connective circuitry involves a plurality of separate conductive layers, each being formed using conventional circuit fabrication techniques.

To create the resistors, an electrically conducting layer is positioned on selected portions of the layer of resistive material in order to form covered sections of the resistive materials and uncovered sections thereof. The uncovered sections ultimately function as heating resistors in the printhead. The covered sections are used to form continuous conductive links between the electrical contact regions of the transistors and other components in the printing system. Thus, the layer of resistive material performs dual functions: as heating resistors in the system, and as direct conductive pathways to the drive transistors. This substantially eliminates the need to use multiple layers for carrying out these functions alone.

A selected portion of protective material is then applied to the covered and uncovered sections of resistive material. Thereafter, an orifice plate having a plurality of openings through the plate was positioned on the protective material. Beneath the openings, a section of the protective material which was removed forms ink firing cavities or vaporization chambers. Positioned at the bottom surface of each chamber is one of the heater resistors. The electrical activation of each resistor causes the resistor to rapidly heat and vaporize a portion of the ink in the cavity. The rapidly formed (nucleated) ink bubble ejects a droplet of ink from the orifice associated with the activated resistor and ink firing vaporization chamber.

To increase resolution and print quality, the printhead nozzles must be placed closer together. This requires that both heater resistors and the associated orifices be placed closer together. To increase printer throughput, the width of the printing swath must be increased by placing more nozzles on the print head. However, adding resistors and nozzles requires adding associated power and control interconnections. These interconnections are conventionally flexible wires or equivalent conductors that electrically connect the transistor drivers on the printhead to printhead interface circuitry in the printer. They may be contained in a ribbon cable that connects on one end to control circuitry within the printer and on the other end to driver circuitry on the printhead. An increased number of heater resistors spaced closer together also creates a greater likelihood of crosstalk and increased difficulty in supplying ink to each vaporization chamber quickly.

Interconnections are a major source of cost in printer design, and adding them in increase the number of heater resistors increases the cost and reduces the reliability of the printer. Thus, as the number of drivers on a printhead has increased over the years, there have been attempts to reduce the number of interconnections per driver. A matrix approach offers an improvement over the direct drive approach, yet as previously realized a matrix approach has its drawbacks. The number of interconnections with a simple matrix is still large and still results in an undesirable increase in the number of interconnections.

Another concern with inkjet printing is the sufficiency of ink flow to the paper or other print media. Print quality is also a function of ink flow through the printhead. Too little ink on the paper or other media to be printed upon produces faded and hard-to-read printed documents. Ink flow from its storage space to the ink firing chamber has suffered, in previous printhead designs, from an inability to be rapidly supplied to the firing chambers. The manifold from the ink source inherently provides some restriction on ink flow to the firing chambers thereby reducing the speed of printhead operation as well as resulting in crosstalk.

To resolve these needs of increased printing speed, resolution and quality, increased throughput, reduced number of interconnections, and improved ink flow control for higher frequency firing rates, a modern design of ink jet printer printheads is desirable.

SUMMARY OF THE INVENTION

Prior printhead design limited the ability of printheads to have the high nozzle densities and the high operating frequencies and firing rates required for increased resolution and throughput. Print resolution depends on the density of ink-ejecting orifices and heating resistors formed on the cartridge printhead substrate. To increase resolution and print quality the heater resistors and the associated orifices be placed closer together. An increased number of heater resistors spaced closer together and higher resistor firing frequencies also creates a greater likelihood of crosstalk and increased difficulty in supplying an adequate supply of ink to each vaporization chamber quickly.

The edge feed feature, where ink flows around the edges of the substrate and directly into ink channels, has a number of performance advantages over previous printhead designs. The ink is able to flow more rapidly into the vaporization chambers, since there is less restriction on the ink flow. This more rapid ink flow improves the frequency response of the printhead, allowing higher printing rates. Further, the more rapid ink flow reduces crosstalk between nearby vaporization chambers caused by variations in ink flow as the heater elements in the vaporization chambers are fired. When firing the resistors at high frequencies, i.e., greater than 8 kHz, conventional ink channel barrier designs either do not allow the vaporization chambers to adequately refill or allow extreme blowback or catastrophic overshoot and puddling on the exterior of the nozzle member.

An embodiment of the present invention provides an inkjet print cartridge comprising an ink reservoir; a substrate having a plurality of individual ink firing chambers with an ink firing element in each chamber along a top surface of said substrate and having a first outer edge along a periphery of said substrate; said first outer edge being in close proximity to said ink firing chambers; said ink firing chambers arranged in first chamber array and a second chamber array and said firing chambers spaced so as to provide 600 dots per inch printing; an ink channel connecting said reservoir with said ink firing chambers, said channel including a primary channel connected at a first end with said reservoir and at a second end to a secondary channel; said primary channel allowing ink to flow from said ink reservoir, around said first outer edge of said substrate to said secondary channel along said top surface of said substrate so as to be proximate to said ink firing chambers; a separate inlet passage for each firing chamber connecting said secondary channel with said firing chamber for allowing high frequency refill of the firing chamber; a group of said firing chambers in adjacent relationship forming a primitive in which only one firing chamber in said primitive is activated at a time; first circuit means on said substrate connected to said firing elements; and second circuit means on said cartridge connected to said first circuit means, for transmitting firing signals to said ink firing elements at a frequency greater than 9 kHz.

Other advantages will become apparent after reading the disclosure.

BRIEF DESCRIPTION OF THE DRAWINGS

The present invention can be further understood by reference to the following description and attached drawings which illustrate the preferred embodiment.

Other features and advantages will be apparent from the following detailed description of the preferred embodiment, taken in conjunction with the accompanying drawings, which illustrate, by way of example, the principles of the invention.

FIG. 24 is a table showing the spatial location of the 300 orifice nozzles of one embodiment of the present invention.

FIG. 28 is a table showing the primitive select line and address select line for each of the 300 heater orifice/resistors of one embodiment of the present invention.

DETAILED DESCRIPTION OF THE PREFERRED EMBODIMENTS

Figure 1:
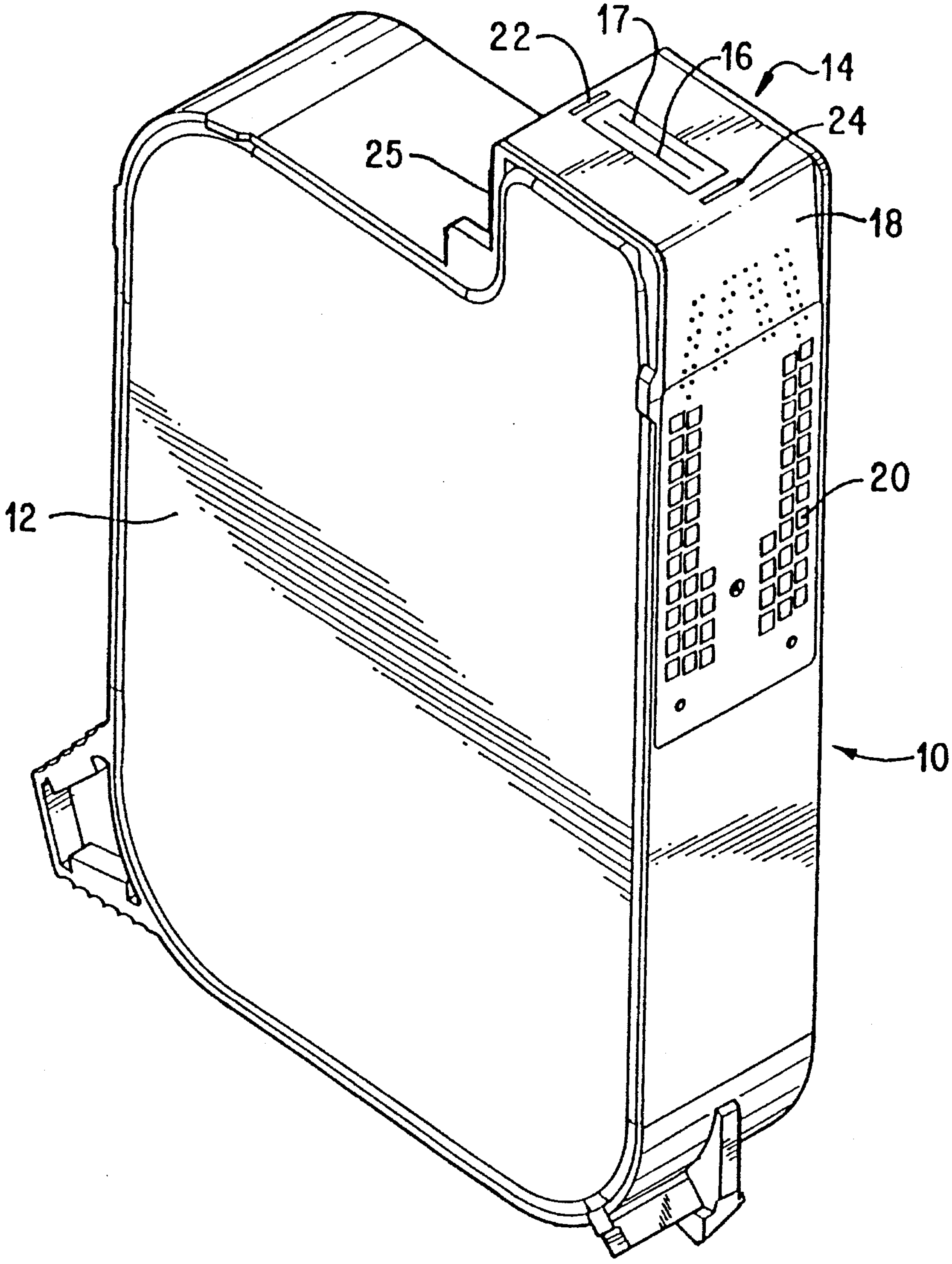
FIG. 1 is a perspective view of an inkjet print cartridge according to one embodiment of the present invention.

Referring to FIG. 1, reference numeral 10 generally indicates an inkjet print cartridge incorporating a printhead according to one embodiment of the present invention simplified for illustrative purposes. The inkjet print cartridge 10 includes an ink reservoir 12 and a printhead 14, where the printhead 14 is formed using Tape Automated Bonding (TAB). The printhead 14 (hereinafter "TAB head assembly 14") includes a nozzle member 16 comprising two parallel columns of offset holes or orifices 17 formed in a flexible polymer flexible circuit 18 by, for example, laser ablation.

A back surface of the flexible circuit 18 includes conductive traces 36 formed thereon using a conventional photolithographic etching and/or plating process. These conductive traces 36 are terminated by large contact pads 20 designed to interconnect with a printer. The print cartridge 10 is designed to be installed in a printer so that the contact pads 20, on the front surface of the flexible circuit 18, contact printer electrodes providing externally generated energization signals to the printhead.

Windows 22 and 24 extend through the flexible circuit 18 and are used to facilitate bonding of the other ends of the conductive traces 36 to electrodes on a silicon substrate containing heater resistors. The windows 22 and 24 are filled with an encapsulant to protect any underlying portion of the traces and substrate.

In the print cartridge 10 of FIG. 1, the flexible circuit 18 is bent over the back edge of the print cartridge "snout" and extends approximately one half the length of the back wall 25 of the snout. This flap portion of the flexible circuit 18 is needed for the routing of conductive traces 36 which are connected to the substrate electrodes through the far end window 22. The contact pads 20 are located on the flexible circuit 18 which is secured to this wall and the conductive traces 36 are routed over the bend and are connected to the substrate electrodes through the windows 22, 24 in the flexible circuit 18.

Figure 2A:
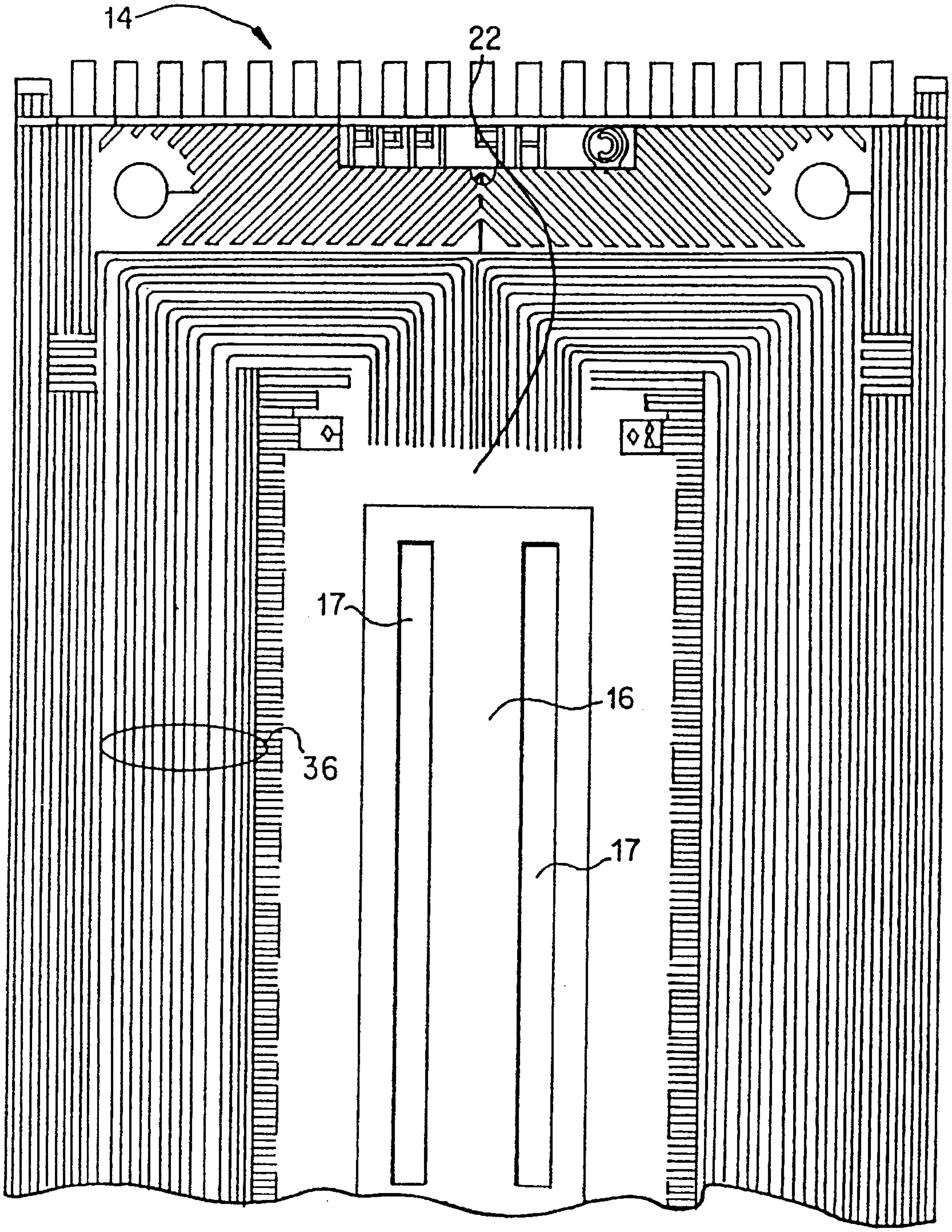
FIG. 2 is a perspective view of the front surface of the Tape Automated Bonding (TAB) printhead assembly (hereinafter "TAB head assembly") removed from the print cartridge of FIG. 1.
Figure 2B:
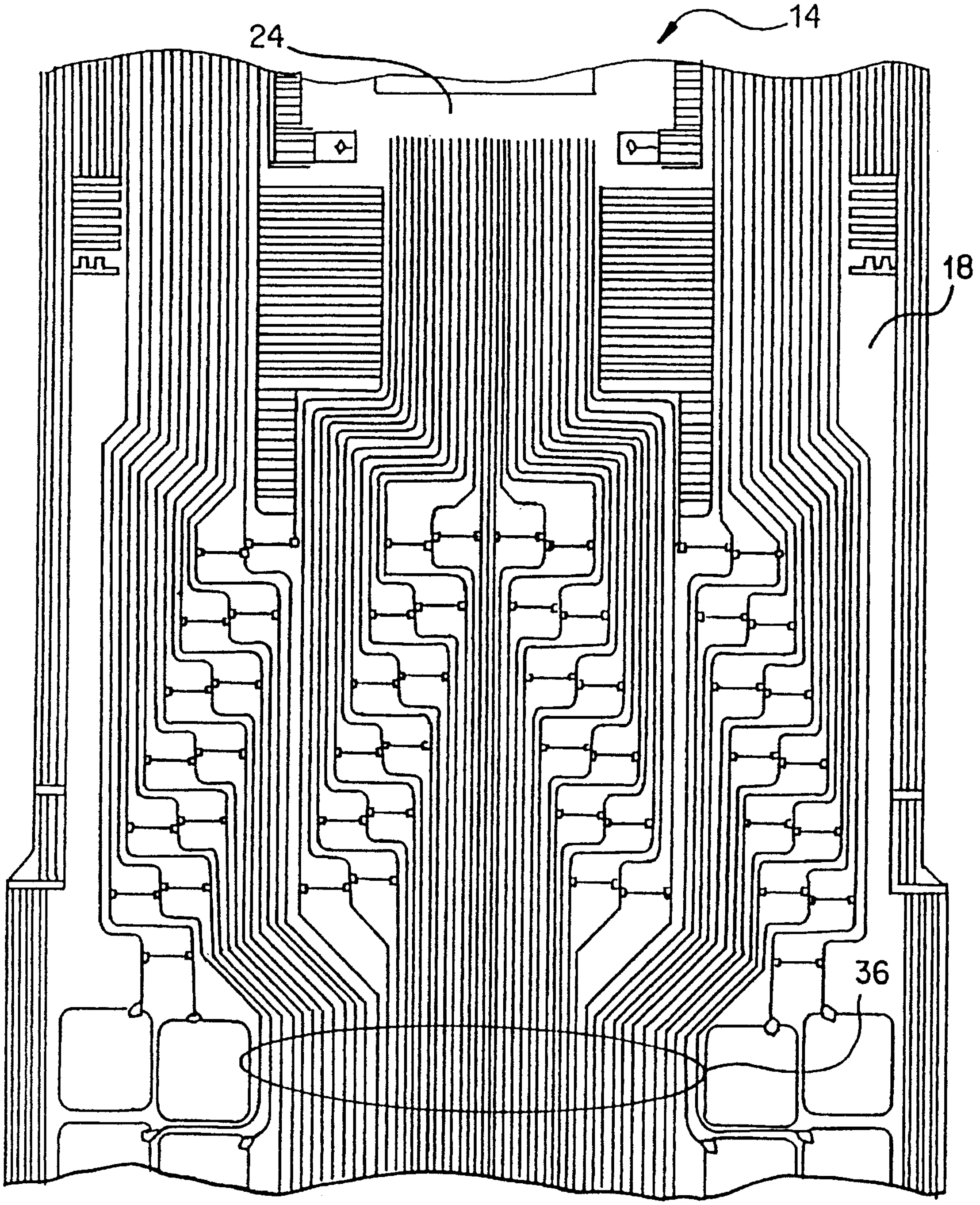
Figure 2C:
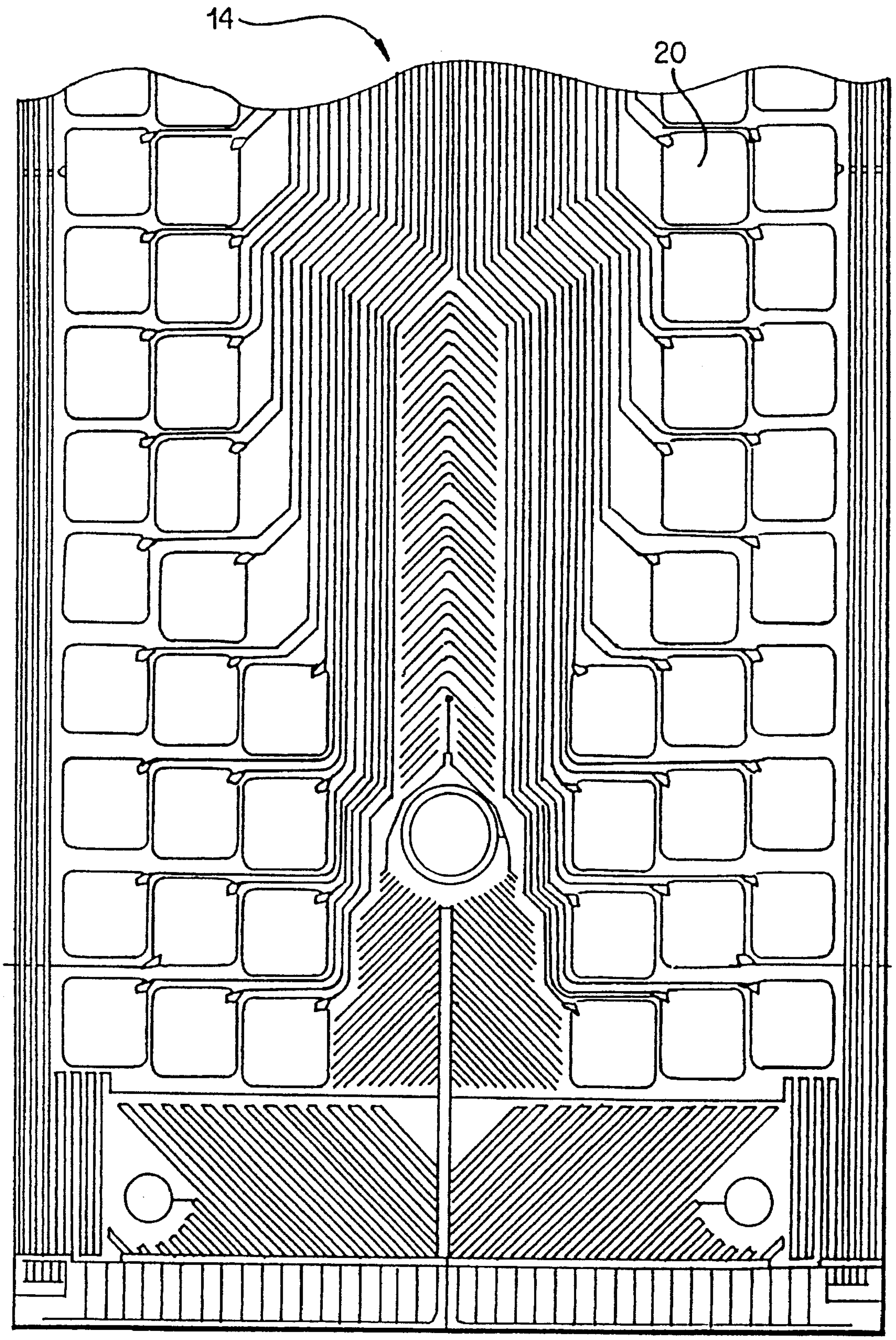

FIG. 2 shows a front view of the TAB head assembly 14 of FIG. 1 removed from the print cartridge 10 and prior to windows 22 and 24 in the TAB head assembly 14 being filled with an encapsulant. TAB head assembly 14 has affixed to the back of the flexible circuit 18 a silicon substrate 28 (not shown) containing a plurality of individually energizable thin fill resistors. Each resistor is located generally behind a single orifice 17 and acts as an ohmic heater when selectively energized by one or more pulses applied sequentially or simultaneously to one or more of the contact pads 20.

The orifices 17 and conductive traces 36 may be of any size, number, and pattern, and the various figures are designed to simply and clearly show the features of the invention. The relative dimensions of the various features have been greatly adjusted for the sake of clarity.

Figure 14:
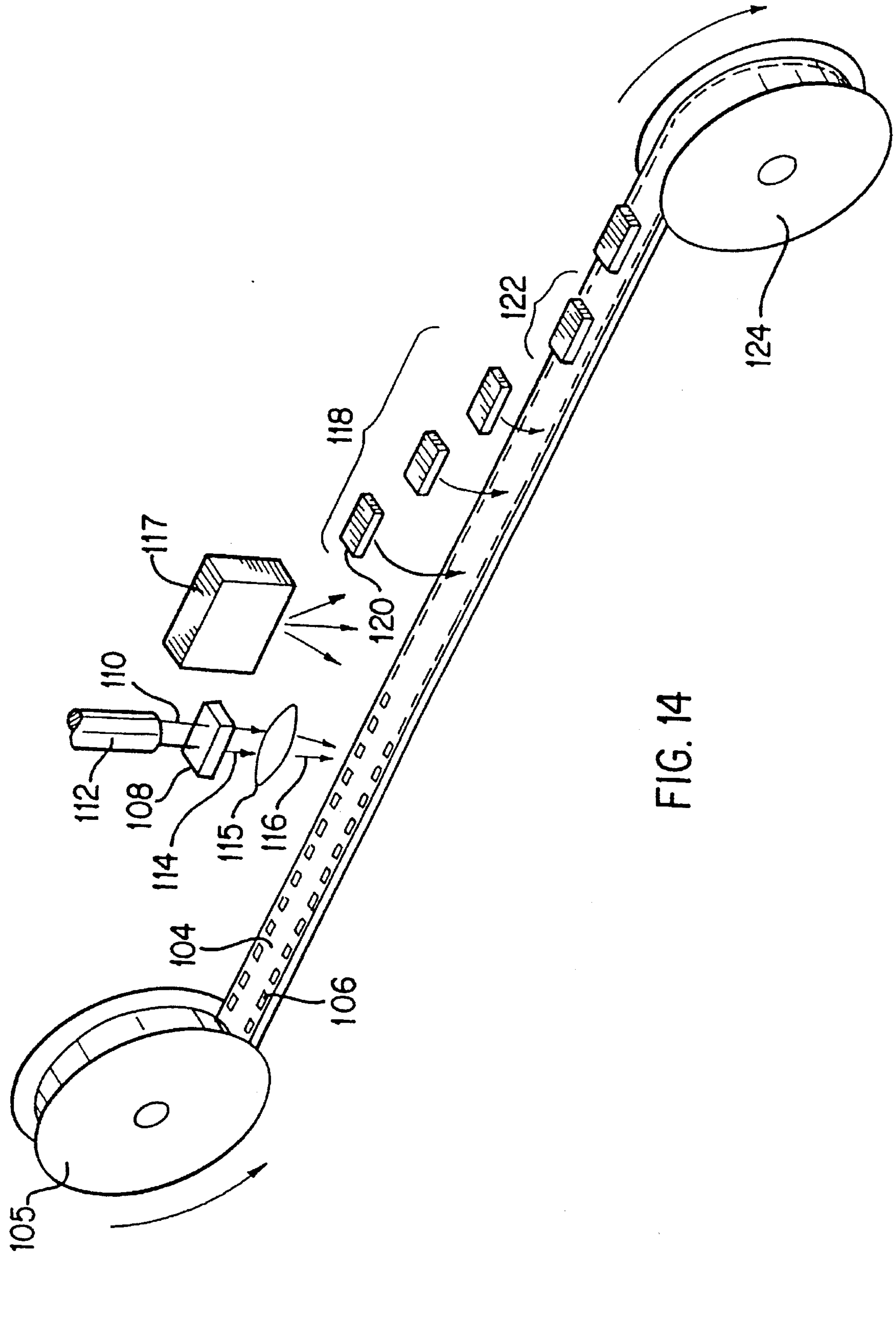
FIG. 14 illustrates one process which may be used to form the preferred TAB head assembly.

The orifice 17 pattern on the flexible circuit 18 shown in FIG. 2 may be formed by a masking process in combination with a laser or other etching means in a step-and-repeat process, which would be readily understood by one of ordinary skilled in the art after reading this disclosure. FIG. 14, to be described in detail later, provides additional details of this process. Further details regarding TAB head assembly 14 and flexible circuit 18 are provided below.

Figure 3:
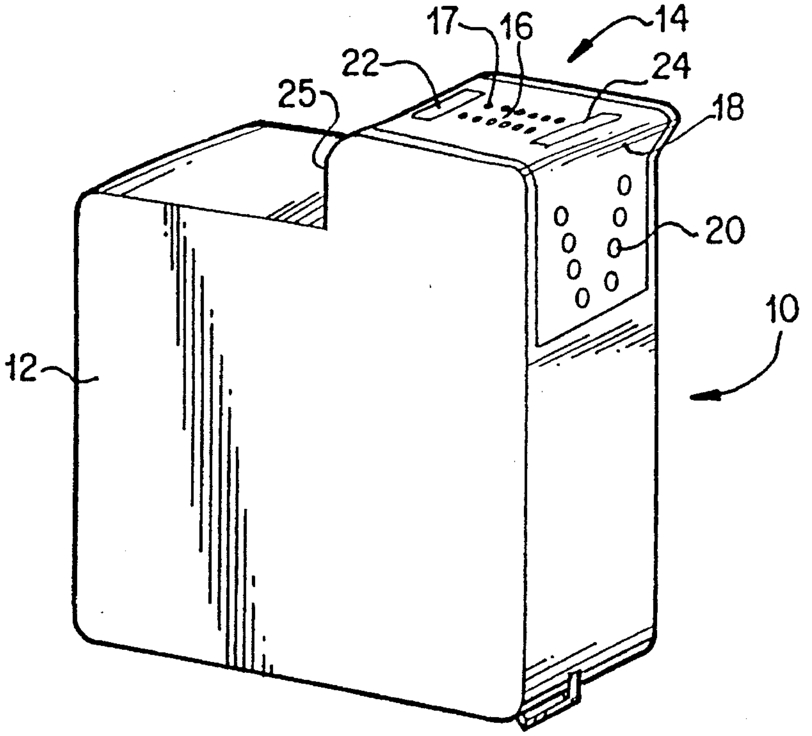
FIG. 3 is a perspective view of an simplified schematic of the inkjet print cartridge of FIG. 1 for illustrative purposes.
Figure 4:
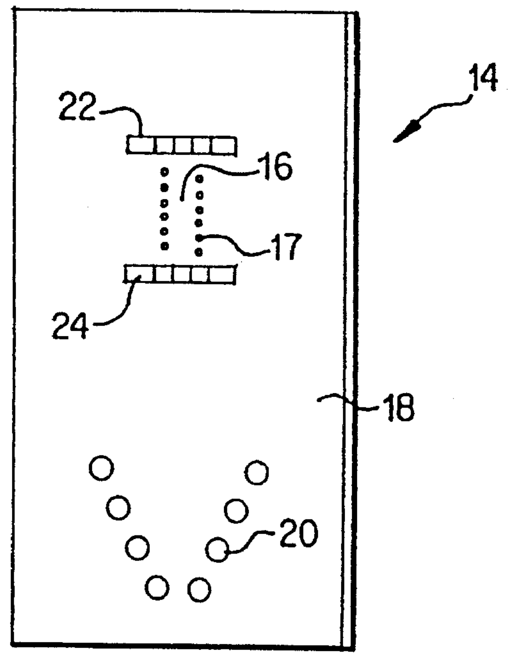
FIG. 4 is a perspective view of the front surface of the Tape Automated Bonding (TAB) printhead assembly (hereinafter "TAB head assembly") removed from the print cartridge of FIG. 3.

FIG. 3 is a perspective view of a simplified schematic of the inkjet print cartridge of FIG. 1 for illustrative purposes. FIG. 4 is a perspective view of the front surface of the Tape Automated Bonding (TAB) printhead assembly (hereinafter "TAB head assembly") removed from the simplified schematic print cartridge of FIG. 3.

Figure 5:
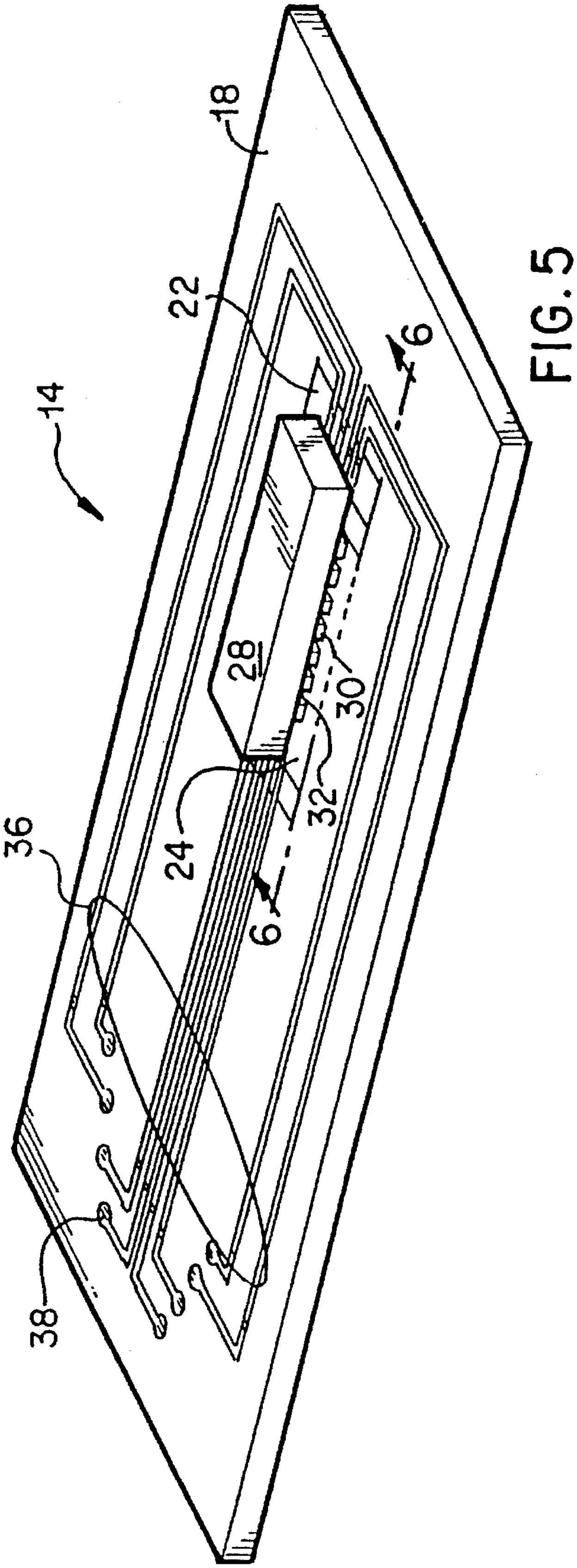
FIG. 5 is a perspective view of the back surface of the TAB head assembly of FIG. 4 with a silicon substrate mounted thereon and the conductive leads attached to the substrate.

FIG. 5 shows the back surface of the TAB head assembly 14 of FIG. 4 showing the silicon die or substrate 28 mounted to the back of the flexible circuit 18 and also showing one edge of the barrier layer 30 formed on the substrate 28 containing ink channels and vaporization chambers. FIG. 7 shows greater detail of this barrier layer 30 and will be discussed later. Shown along the edge of the barrier layer 30 are the entrances to the ink channels 32 which receive ink from the ink reservoir 12. The conductive traces 36 formed on the back of the flexible circuit 18 terminate in contact pads 20 (shown in FIG. 4) on the opposite side of the flexible circuit 18. The windows 22 and 24 allow access to the ends of the conductive traces 36 and the substrate electrodes 40 (shown in FIG. 6) from the other side of the flexible circuit 18 to facilitate bonding.

Figure 6:
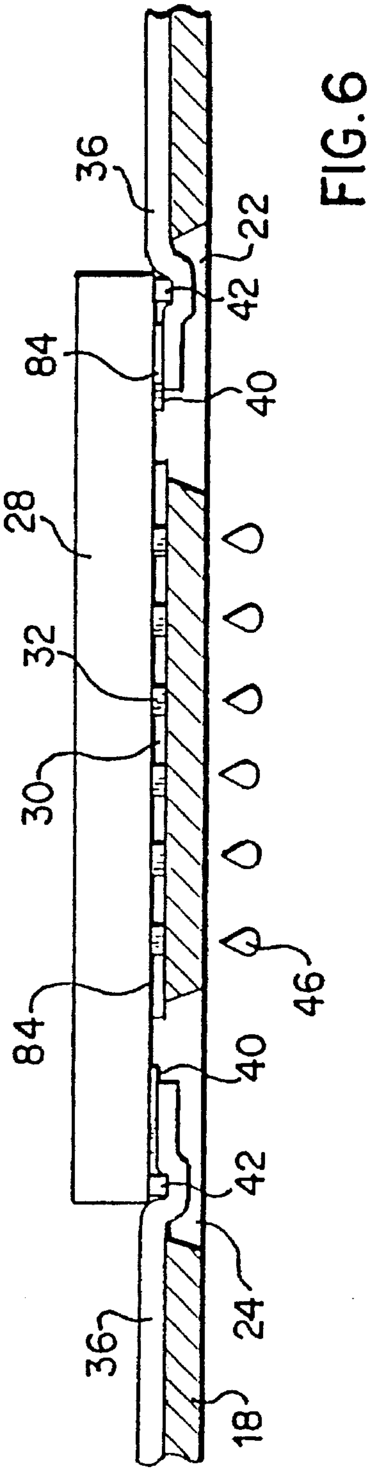
FIG. 6 is a side elevational view in cross-section taken along line A—A in FIG. 5 illustrating the attachment of conductive leads to electrodes on the silicon substrate.
Figure 7:
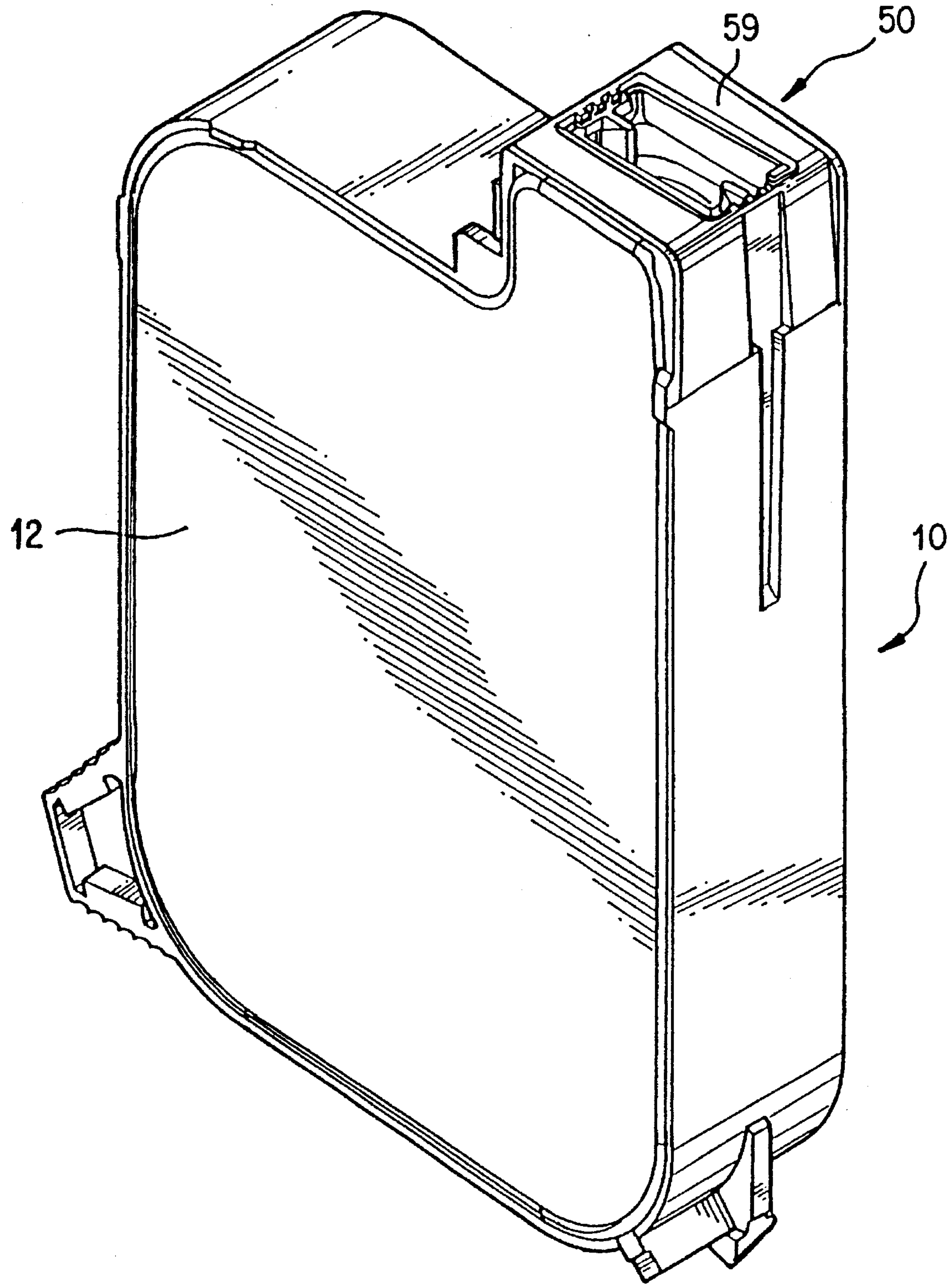
FIG. 7 is a perspective view of the inkjet print cartridge of FIG. 1 with the TAB head assembly removed.

FIG. 6 shows a side view cross-section taken along line A—A in FIG. 5 illustrating the connection of the ends of the conductive traces 36 to the electrodes 40 formed on the substrate 28. As seen in FIG. 6, a portion 42 of the barrier layer 30 is used to insulate the ends of the conductive traces 36 from the substrate 28. Also shown in FIG. 6 is a side view of the flexible circuit 18, the barrier layer 30, the windows 22 and 24, and the entrances of the various ink channels 32. Droplets of ink 46 are shown being ejected from orifice holes associated with each of the ink channels 32.

Figure 8:
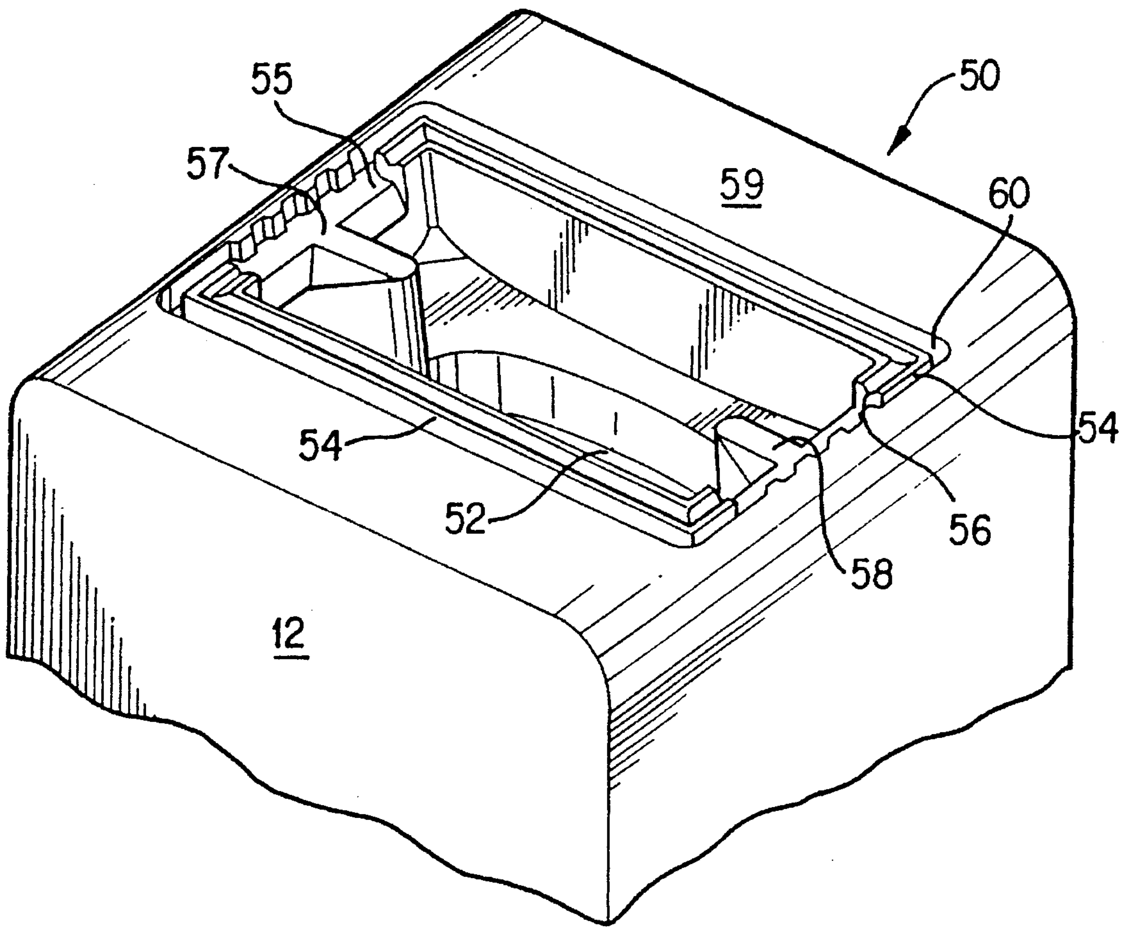
FIG. 8 is a perspective view of the headland area of the inkjet print cartridge of FIG. 7.
Figure 9:
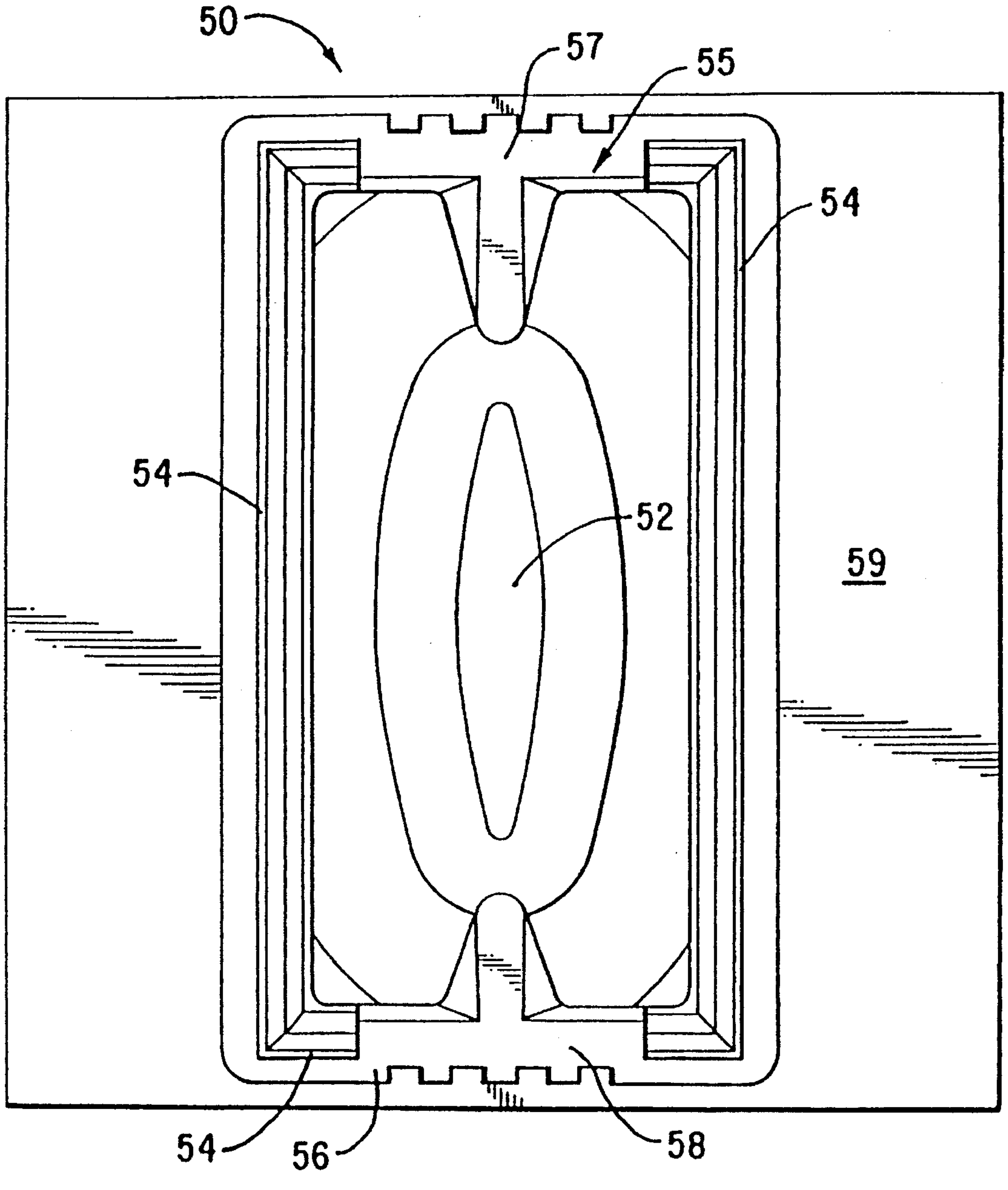
FIG. 9 is a top plan view of the headland area of the inkjet print cartridge of FIG. 7.

FIG. 7 shows the print cartridge 10 of FIG. 1 with the TAB head assembly 14 removed to reveal the headland pattern 50 used in providing a seal between the TAB head assembly 14 and the printhead body. FIG. 8 shows the headland area in enlarged perspective view. FIG. 9 shows the headland area in an enlarged top plan view. The headland characteristics are exaggerated for clarity. Shown in FIGS. 8 and 9 is a central slot 52 in the print cartridge 10 for allowing ink from the ink reservoir 12 to flow to the back surface of the TAB head assembly 14.

The headland pattern 50 formed on the print cartridge 10 is configured so that a bead of epoxy adhesive (not shown) dispensed on the inner raised walls 54 and across the wall openings 55 and 56 (so as to circumscribe the substrate when the TAB head assembly 14 is in place) will form an ink seal between the body of the print cartridge 10 and the back of the TAB head assembly 14 when the TAB head assembly 14 is pressed into place against the headland pattern 50. Other adhesives which may be used include hot-melt, silicone, UV curable adhesive, and mixtures thereof. Further, a patterned adhesive film may be positioned on the headland, as opposed to dispensing a bead of adhesive.

Figure 13:
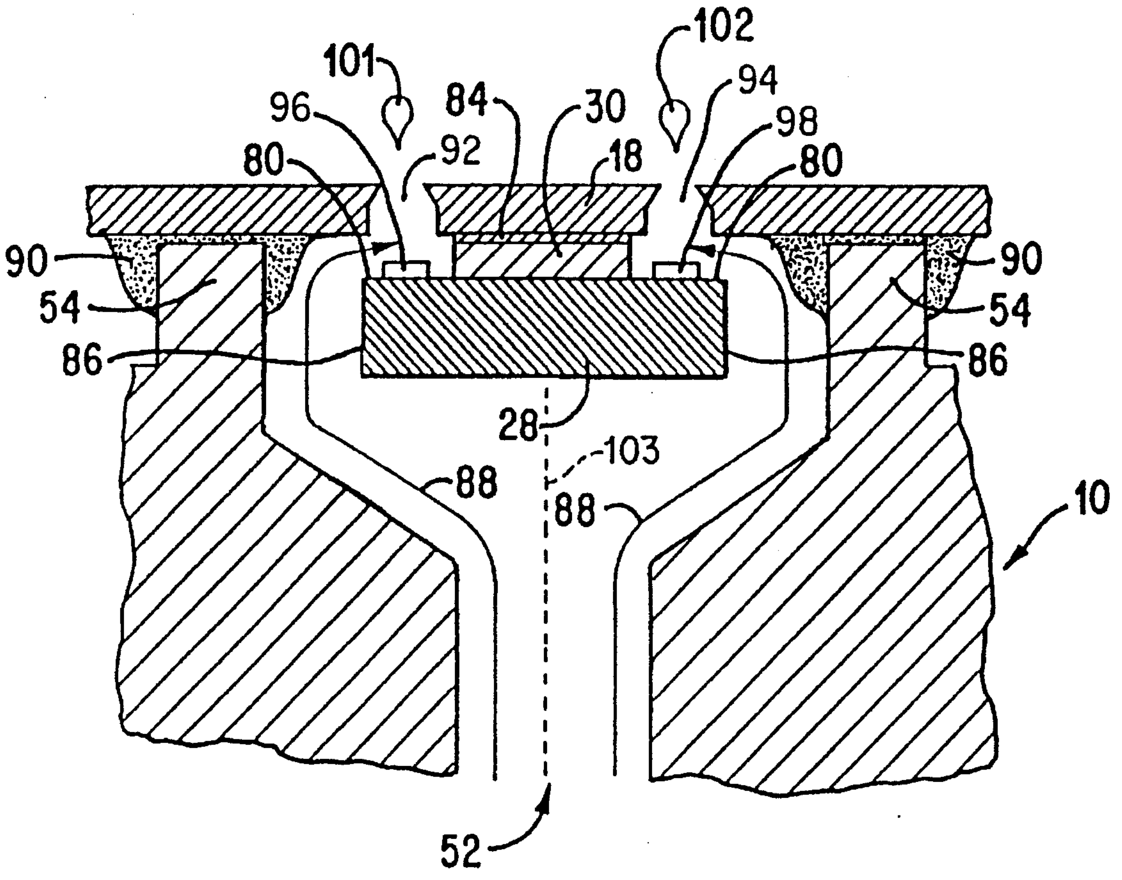
FIG. 13 is a schematic cross-sectional view taken along line B—B of FIG. 10 showing the adhesive seal between the TAB head assembly and the print cartridge as well as the ink flow path around the edges of the substrate.

When the TAB head assembly 14 of FIG. 5 is properly positioned and pressed down on the headland pattern 50 in FIG. 8 after the adhesive (not shown) is dispensed, the two short ends of the substrate 28 will be supported by the surface portions 57 and 58 within the wall openings 55 and 56. Additional details regarding adhesive 90 are shown in FIG. 13. The configuration of the headland pattern 50 is such that, when the substrate 28 is supported by the surface portions 57 and 58, the back surface of the flexible circuit 18 will be slightly above the top of the raised walls 54 and approximately flush with the flat top surface 59 of the print cartridge 10. As the TAB head assembly 14 is pressed down onto the headland 50, the adhesive is squished down. From the top of the inner raised walls 54, the adhesive overspills into the gutter between the inner raised walls 54 and the outer raised wall 60 and overspills somewhat toward the slot 52. From the wall openings 55 and 56, the adhesive squishes inwardly in the direction of slot 52 and squishes outwardly toward the outer raised wall 60, which blocks further outward displacement of the adhesive. The outward displacement of the adhesive not only serves as an ink seal, but encapsulates the conductive traces in the vicinity of the headland 50 from underneath to protect the traces from ink.

Figure 10:
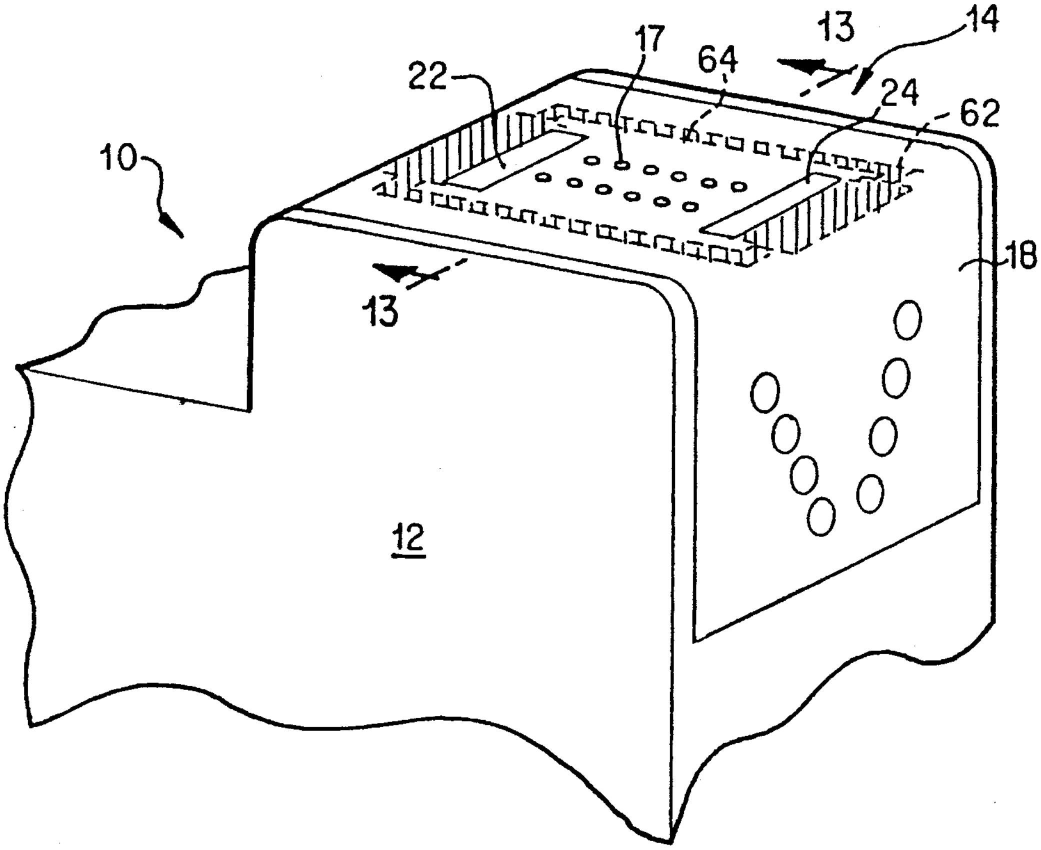
FIG. 10 is a perspective view of a portion of the inkjet print cartridge of FIG. 3 illustrating the configuration of a seal which is formed between the ink cartridge body and the TAB head assembly.

FIG. 10 shows a portion of the completed print cartridge 10 of FIG. 3 illustrating, by cross-hatching, the location of the underlying adhesive 90 (not shown) which forms the seal between the TAB head assembly 14 and the body of the print cartridge 10. In FIG. 10 the adhesive is located generally between the dashed lines surrounding the array of orifices 17, where the outer dashed line 62 is slightly within the boundaries of the outer raised wall 60 in FIG. 7, and the inner dashed line 64 is slightly within the boundaries of the inner raised walls 54 in FIG. 7. The adhesive is also shown being squished through the wall openings 55 and 56 (FIG. 7) to encapsulate the traces leading to electrodes on the substrate. A cross-section of this seal taken along line B—B in FIG. 10 is also shown in FIG. 13, to be discussed later.

This seal formed by the adhesive 90 circumscribing the substrate 28 allows ink to flow from slot 52 and around the sides of the substrate to the vaporization chambers formed in the barrier layer 30, but will prevent ink from seeping out from under the TAB head assembly 14. Thus, this adhesive seal 90 provides a strong mechanical coupling of the TAB head assembly 14 to the print cartridge 10, provides a fluidic seal, and provides trace encapsulation. The adhesive seal is also easier to cure than prior art seals, and it is much easier to detect leaks between the print cartridge body and the printhead, since the sealant line is readily observable. Further details on adhesive seal 90 are shown in FIG. 13.

Figure 11:
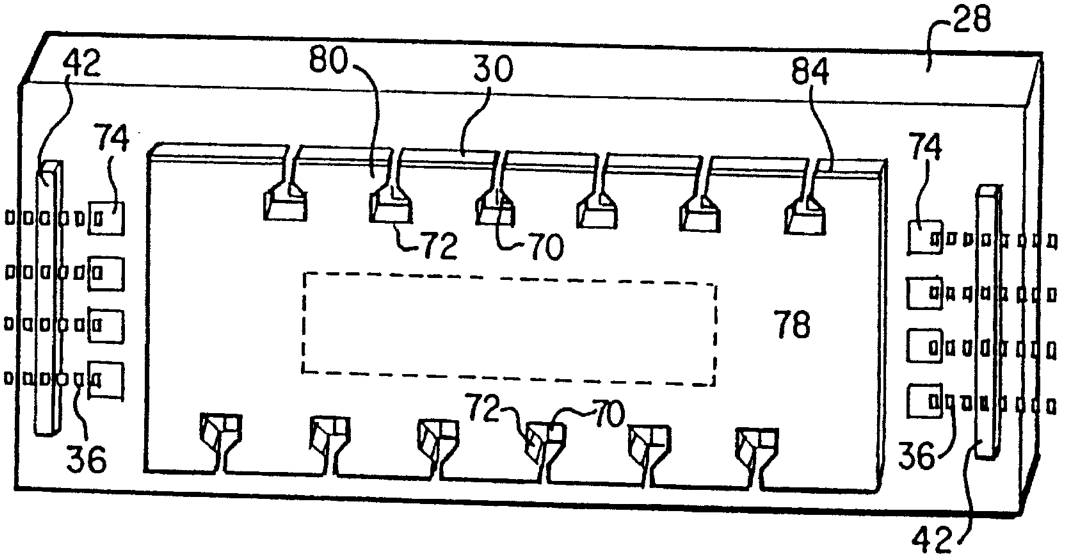
FIG. 11 is a top perspective view of a substrate structure containing heater resistors, ink channels, and vaporization chambers, which is mounted on the back of the TAB head assembly of FIG. 4.

FIG. 11 is a front perspective view of the silicon substrate 28 which is affixed to the back of the flexible circuit 18 in FIG. 5 to form the TAB head assembly 14. Silicon substrate 28 has formed on it, using conventional photolithographic techniques, two rows or colums of thin film resistors 70, shown in FIG. 11 exposed through the vaporization chambers 72 formed in the barrier layer 30.

In one embodiment, the substrate 28 is approximately one-half inch long and contains 300 heater resistors 70, thus enabling a resolution of 600 dots per inch. Heater resistors 70 may instead be any other type of ink ejection element, such as a piezoelectric pump-type element or any other conventional element. Thus, element 70 in all the various figures may be considered to be piezoelectric elements in an alternative embodiment without affecting the operation of the printhead. Also formed on the substrate 28 are electrodes 74 for connection to the conductive traces 36 (shown by dashed lines) formed on the back of the flexible circuit 18.

A demultiplexer 78, shown by a dashed outline in FIG. 11, is also formed on the substrate 28 for demultiplexing the incoming multiplexed signals applied to the electrodes 74 and distributing the signals to the various thin film resistors 70. The demultiplexer 78 enables the use of much fewer electrodes 74 than thin film resistors 70. Having fewer electrodes allows all connections to the substrate to be made from the short end portions of the substrate, as shown in FIG. 4, so that these connections will not interfere with the ink flow around the long sides of the substrate. The demultiplexer 78 may be any decoder for decoding encoded signals applied to the electrodes 74. The demultiplexer has input leads (not shown for simplicity) connected to the electrodes 74 and has output leads (not shown) connected to the various resistors 70. The demultiplexer 78 circuity is discussed in further detail below.

Also formed on the surface of the substrate 28 using conventional photolithographic techniques is the barrier layer 30, which may be a layer of photoresist or some other polymer, in which is formed the vaporization chambers 72 and ink channels 80. A portion 42 of the barrier layer 30 insulates the conductive traces 36 from the underlying substrate 28, as previously discussed with respect to FIG. 4.

In order to adhesively affix the top surface of the barrier layer 30 to the back surface of the flexible circuit 18 shown in FIG. 5, a thin adhesive layer 84 (not shown), such as an uncured layer of poly-isoprene photoresist, is applied to the top surface of the barrier layer 30. A separate adhesive layer may not be necessary if the top of the barrier layer 30 can be otherwise made adhesive. The resulting substrate structure is then positioned with respect to the back surface of the flexible circuit 18 so as to align the resistors 70 with the orifices formed in the flexible circuit 18. This alignment step also inherently aligns the electrodes 74 with the ends of the conductive traces 36. The traces 36 are then bonded to the electrodes 74. This alignment and bonding process is described in more detail later with respect to FIG. 14. The aligned and bonded substrate/flexible circuit structure is then heated while applying pressure to cure the adhesive layer 84 and firmly affix the substrate structure to the back surface of the flexible circuit 18.

Figure 12:
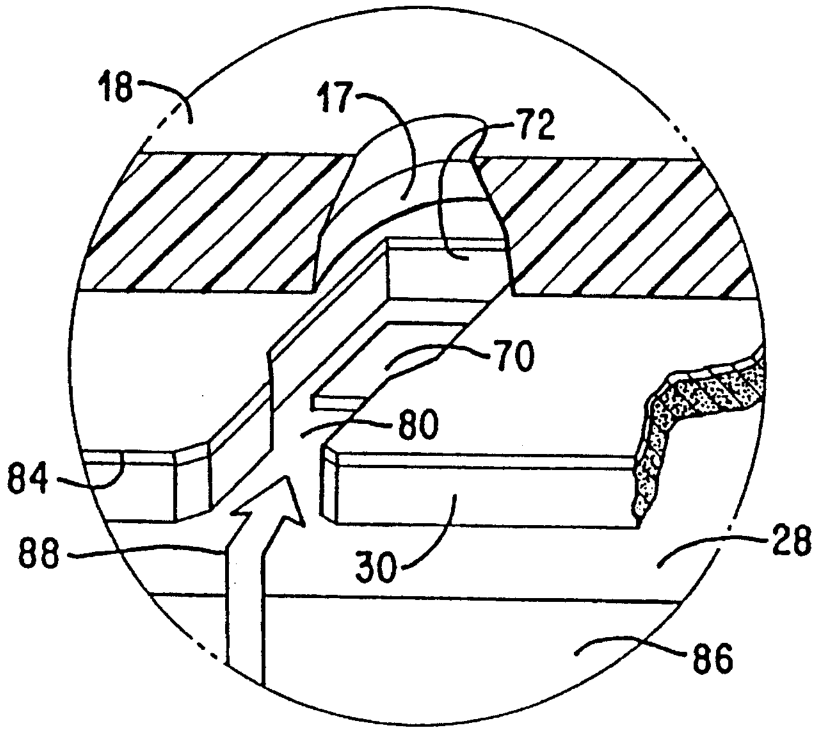
FIG. 12 is a top perspective view, partially cut away, of a portion of the TAB head assembly showing the relationship of an orifice with respect to a vaporization chamber, a heater resistor, and an edge of the substrate.

FIG. 12 is an enlarged view of a single vaporization chamber 72, thin film resistor 70, and frustum shaped orifice 17 after the substrate structure of FIG. 11 is secured to the back of the flexible circuit 18 via the thin adhesive layer 84. A side edge of the substrate 28 is shown as edge 86. In operation, ink flows from the ink reservoir 12 around the side edge 86 of the substrate 28, and into the ink channel 80 and associated vaporization chamber 72, as shown by the arrow 88. Upon energization of the thin film resistor 70, a thin layer of the adjacent ink is superheated, causing explosive vaporization and, consequently, causing a droplet of ink to be ejected through the orifice 17. The vaporization chamber 72 is then refilled by capillary action.

In a preferred embodiment, the barrier layer 30 is approximately 1 mils thick, the substrate 28 is approximately 20 mils thick, and the flexible circuit 18 is approximately 2 mils thick.

Shown in FIG. 13 is a side elevational view cross-section taken along line B—B in FIG. 10 showing a portion of the adhesive seal 90, applied to the inner raised wall 54 and wall openings 55, 56, surrounding the substrate 28 and showing the substrate 28 being adhesively secured to a central portion of the flexible circuit 18 by the thin adhesive layer 84 on the top surface of the barrier layer 30 containing the ink channels and vaporization chambers 92 and 94. A portion of the plastic body of the printhead cartridge 10, including raised walls 54 shown in FIGS. 7 and 8, is also shown.

FIG. 13 also illustrates how ink 88 from the ink reservoir 12 flows through the central slot 52 formed in the print cartridge 10 and flows around the edges 86 of the substrate 28 through ink channels 80 into the vaporization chambers 92 and 94. Thin film resistors 96 and 98 are shown within the vaporization chambers 92 and 94, respectively. When the resistors 96 and 98 are energized, the ink within the vaporization chambers 92 and 94 are ejected, as illustrated by the emitted drops of ink 101 and 102.

The edge feed feature, where ink flows around the edges 86 of the substrate 28 and directly into ink channels 80, has a number of advantages over previous center feed printhead designs which form an elongated central hole or slot running lengthwise in the substrate to allow ink to flow into a central manifold and ultimately to the entrances of ink channels. One advantage is that the substrate or die 28 width can be made narrower, due to the absence of the elongated central hole or slot in the substrate. Not only can the substrate be made narrower, but the length of the edge feed substrate can be shorter, for the same number of nozzles, than the center feed substrate due to the substrate structure now being less prone to cracking or breaking without the central ink feed hole. This shortening of the substrate 28 enables a shorter headland 50 in FIG. 8 and, hence, a shorter print cartridge snout. This is important when the print cartridge 10 is installed in a printer which uses one or more pinch rollers below the snout's transport path across the paper to press the paper against the rotatable platen and which also uses one or more rollers (also called star wheels) above the transport path to maintain the paper contact around the platen. With a shorter print cartridge snout, the star wheels can be located closer to the pinch rollers to ensure better paper/roller contact along the transport path of the print cartridge snout. Additionally, by making the substrate smaller, more substrates can be formed per wafer, thus lowering the material cost per substrate.

Other advantages of the edge feed feature are that manufacturing time is saved by not having to etch a slot in the substrate, and the substrate is less prone to breakage during handling. Further, the substrate is able to dissipate more heat, since the ink flowing across the back of the substrate and around the edges of the substrate acts to draw heat away from the back of the substrate.

There are also a number of performance advantages to the edge feed design. Be eliminating the manifold as well as the slot in the substrate, the ink is able to flow more rapidly into the vaporization chambers, since there is less restriction on the ink flow. This more rapid ink flow improves the frequency response of the printhead, allowing higher printing rates from a given number of orifices. Further, the more rapid ink flow reduces crosstalk between nearby vaporization chambers caused by variations in ink flow as the heater elements in the vaporization chambers are fired.

In another embodiment, the ink reservoir contains two separate ink sources, each containing a different color of ink. In this alternative embodiment, the central slot 52 in FIG. 13 is bisected, as shown by the dashed line 103, so that each side of the central slot 52 communicates with a separate ink source. Therefore, the left linear array of vaporization chambers can be made to eject one color of ink, while the right linear array of vaporization chambers can be made to eject a different color of ink. This concept can even be used to create a four color printhead, where a different ink reservoir feeds ink to ink channels along each of the four sides of the substrate. Thus, instead of the two-edge feed design discussed above, a four-edge design would be used, preferably using a square substrate for symmetry.

FIG. 14 illustrates one method for forming the preferred embodiment of the TAB head assembly 14. The starting material is a Kapton or Upilex type polymer tape 104, although the tape 104 can be any suitable polymer film which is acceptable for use in the below-described procedure. Some such films may comprise teflon, polyamide, polymethylmethacrylate, polycarbonate, polyester, polyamide polyethylene-terephthalate or mixtures thereof.

The tape 104 is typically provided in long strips on a reel 105. Sprocket holes 106 along the sides of the tape 104 are used to accurately and securely transport the tape 104. Alternately, the sprocket holes 106 may be omitted and the tape may be transported with other types of fixtures.

In the preferred embodiment, the tape 104 is already provided with conductive copper traces 36, such as shown in FIGS. 2, 4 and 5, formed thereon using conventional metal deposition and photolithographic processes. The particular pattern of conductive traces depends on the manner in which it is desired to distribute electrical signals to the electrodes formed on silicon dies, which are subsequently mounted on the tape 104.

In the preferred process, the tape 104 is transported to a laser processing chamber and laser-ablated in a pattern defined by one or more masks 108 using laser radiation 110, such as that generated by an Excimer laser 112 of the $F_2$, ArF, KrCl, KrF, or XeCl type. The masked laser radiation is designated by arrows 114.

In a preferred embodiment, such masks 108 define all of the ablated features for an extended area of the tape 104, for example encompassing multiple orifices in the case of an orifice pattern mask 108, and multiple vaporization chambers in the case of a vaporization chamber pattern mask 108. Alternatively, patterns such as the orifice pattern, the vaporization chamber pattern, or other patterns may be placed side by side on a common mask substrate which is substantially larger than the laser beam. Then such patterns may be moved sequentially into the beam. The masking material used in such masks will preferably be highly reflecting at the laser wavelength, consisting of, for example, a multilayer dielectric or a metal such as aluminum.

Figure 21:
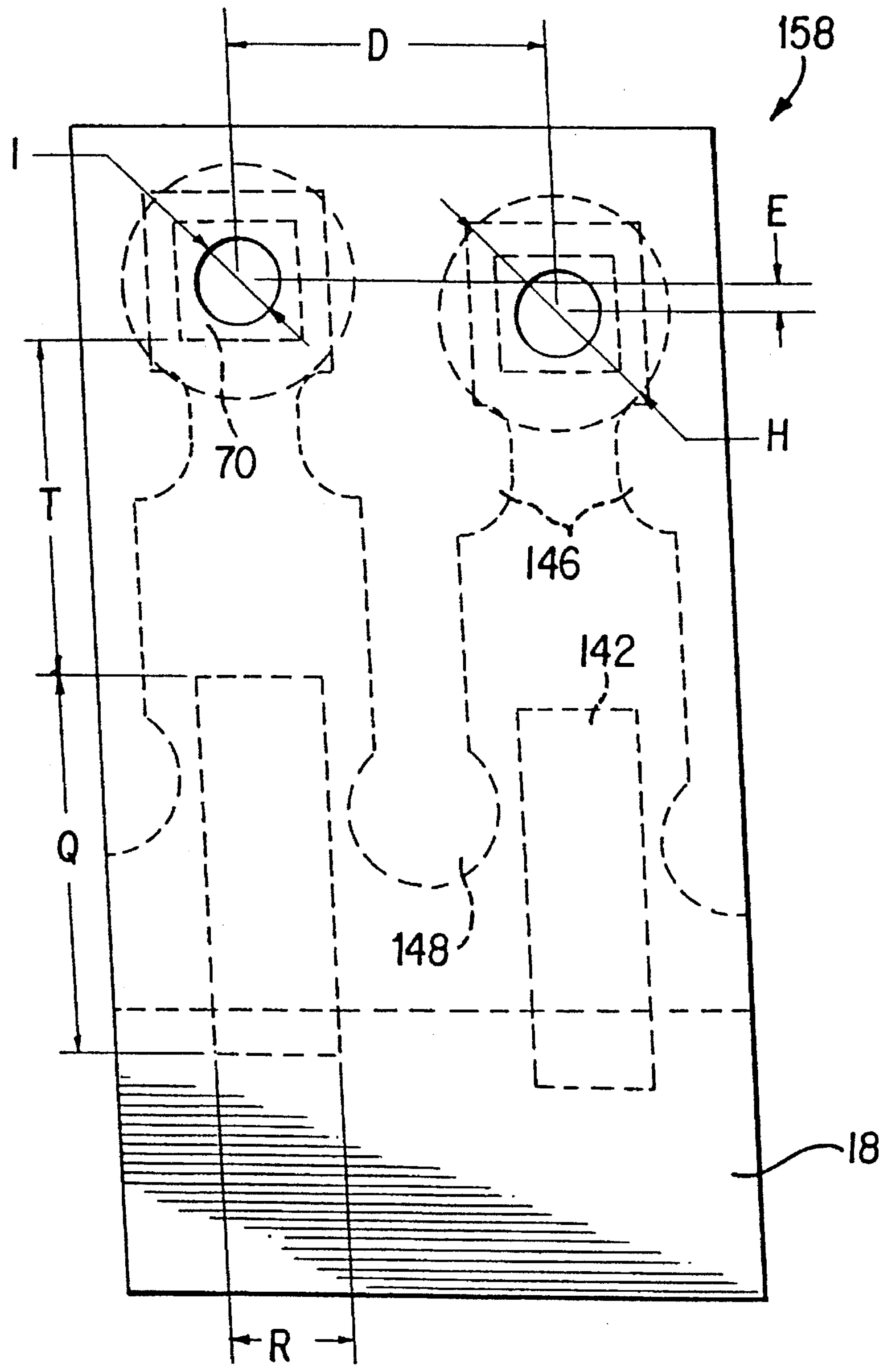
FIG. 21 is a top plan view of the TAB head assembly portion shown in FIG. 19.

The orifice pattern defined by the one or more masks 108 may be that generally shown in FIG. 21. Multiple masks 108 may be used to form a stepped orifice taper as shown in FIG. 12.

In one embodiment, a separate mask 108 defines the pattern of windows 22 and 24 shown in FIGS. 1 and 2; however, in the preferred embodiment, the windows 22 and 24 are formed using conventional photolithographic methods prior to the tape 104 being subjected to the processes shown in FIG. 14.

In an alternative embodiment of a nozzle member, where the nozzle member also includes vaporization chambers, one or more masks 108 would be used to form the orifices and another mask 108 and laser energy level (and/or number of laser shots) would be used to define the vaporization chambers, ink channels, and manifolds which are formed through a portion of the thickness of the tape 104.

The laser system for this process generally includes beam delivery optics, alignment optics, a high precision and high speed mask shuttle system, and a processing chamber including a mechanism for handling and positioning the tape 104. In the preferred embodiment, the laser system uses a projection mask configuration wherein a precision lens 115 interposed between the mask 108 and the tape 104 projects the Excimer laser light onto the tape 104 in the image of the pattern defined on the mask 108.

The masked laser radiation exiting from lens 115 is represented by arrows 116. Such a projection mask configuration is advantageous for high precision orifice dimensions, because the mask is physically remote from the nozzle member. Soot is naturally formed and ejected in the ablation process, traveling distances of about one centimeter from the nozzle member being ablated. If the mask were in contact with the nozzle member, or in proximity to it, soot buildup on the mask would tend to distort ablated features and reduce their dimensional accuracy. In the preferred embodiment, the projection lens is more than two centimeters from the nozzle member being ablated, thereby avoiding the buildup of any soot on it or on the mask.

Ablation is well known to produce features with tapered walls, tapered so that the diameter of an orifice is larger at the surface onto which the laser is incident, and smaller at the exit surface. The taper angle varies significantly with variations in the optical energy density incident on the nozzle member for energy densities less than about two joules per square centimeter. If the energy density were uncontrolled, the orifices produced would vary significantly in taper angle, resulting in substantial variations in exit orifice diameter. Such variations would produce deleterious variations in ejected ink drop volume and velocity, reducing print quality. In the preferred embodiment, the optical energy of the ablating laser beam is precisely monitored and controlled to achieve a consistent taper angle, and thereby a reproducible exit diameter. In addition to the print quality benefits resulting from the constant orifice exit diameter, a taper is beneficial to the operation of the orifices, since the taper acts to increase the discharge speed and provide a more focused ejection of ink, as well as provide other advantages. The taper may be in the range of 5 to 15 degrees relative to the axis of the orifice. The preferred embodiment process described herein allows rapid and precise fabrication without a need to rock the laser beam relative to the nozzle member. It produces accurate exit diameters even though the laser beam is incident on the entrance surface rather than the exit surface of the nozzle member.

After the step of laser-ablation, the polymer tape 104 is stepped, and the process is repeated. This is referred to as a step-and-repeat process. The total processing time required for forming a single pattern on the tape 104 may be on the order of a few seconds. As mentioned above, a single mask pattern may encompass an extended group of ablated features to reduce the processing time per nozzle member.

Laser ablation processes have distinct advantages over other forms of laser drilling for the formation of precision orifices, vaporization chambers, and ink channels. In laser ablation, short pulses of intense ultraviolet light are absorbed in a thin surface layer of material within about 1 micrometer or less of the surface. Preferred pulse energies are greater than about 100 millijoules per square centimeter and pulse durations are shorter than about 1 microsecond. Under these conditions, the intense ultraviolet light photodissociates the chemical bonds in the material. Furthermore, the absorbed ultraviolet energy is concentrated in such a small volume of material that it rapidly heats the dissociated fragments and ejects them away from the surface of the material. Because these processes occur so quickly, there is no time for heat to propagate to the surrounding material. As a result, the surrounding region is not melted or otherwise damaged, and the perimeter of ablated features can replicate the shape of the incident optical beam with precision on the scale of about one micrometer. In addition, laser ablation can also form chambers with substantially flat bottom surfaces which form a plane recessed into the layer, provided the optical energy density is constant across the region being ablated. The depth of such chambers is determined by the number of laser shots, and the power density of each.

Laser-ablation processes also have numerous advantages as compared to conventional lithographic electroforming processes for forming nozzle members for inkjet printheads. For example, laser-ablation processes generally are less expensive and simpler than conventional lithographic electroforming processes. In addition, by using laser-ablations processes, polymer nozzle members can be fabricated in substantially larger sizes (i.e., having greater surface areas) and with nozzle geometries that are not practical with conventional electroforming processes. In particular, unique nozzle shapes can be produced by controlling exposure intensity or making multiple exposures with a laser beam being reoriented between each exposure. Examples of a variety of nozzle shapes are described in copending application Ser. No. 07/658726, entitled "A Process of Photo-Ablating at Least One Stepped Opening Extending Through a Polymer Material, and a Nozzle Plate Having Stepped Openings," assigned to the present assignee and incorporated herein by reference. Also, precise nozzle geometries can be formed without process controls as strict as those required for electroforming processes.

Another advantage of forming nozzle members by laser-ablating a polymer material is that the orifices or nozzles can be easily fabricated with various ratios of nozzle length (L) to nozzle diameter (D). In the preferred embodiment, the L/D ratio exceeds unity. One advantage of extending a nozzle's length relative to its diameter is that orifice-resistor positioning in a vaporization chamber becomes less critical.

In use, laser-ablated polymer nozzle members for inkjet printers have characteristics that are superior to conventional electroformed orifice plates. For example, laser-ablated polymer nozzle members are highly resistant to corrosion by water-based printing inks and are generally hydrophobic. Further, laser-ablated polymer nozzle members have a relatively low elastic modulus, so built-in stress between the nozzle member and an underlying substrate or barrier layer has less of a tendency to cause nozzle member-to-barrier layer delamination. Still further, laser-ablated polymer nozzle members can be readily fixed to, or formed with, a polymer substrate.

Although an Excimer laser is used in the preferred embodiments, other ultraviolet light sources with substantially the same optical wavelength and energy density may be used to accomplish the ablation process. Preferably, the wavelength of such an ultraviolet light source will lie in the 150 nm to 400 nm range to allow high absorption in the tape to be ablated. Furthermore, the energy density should be greater than about 100 millijoules per square centimeter with a pulse length shorter than about 1 microsecond to achieve rapid ejection of ablated material with essentially no heating of the surrounding remaining material.

As will be understood by those of ordinary skill in the art, numerous other processes for forming a pattern on the tape 104 may also be used. Other such processes include chemical etching, stamping, reactive ion etching, ion beam milling, and molding or casting on a photodefined pattern.

A next step in the process is a cleaning step wherein the laser ablated portion of the tape 104 is positioned under a cleaning station 117. At the cleaning station 117, debris from the laser ablation is removed according to standard industry practice.

The tape 104 is then stepped to the next station, which is an optical alignment station 118 incorporated in a conventional automatic TAB bonder, such as an inner lead bonder commercially available from Shinkawa Corporation, model number IL-20. The bonder is preprogrammed with an alignment (target) pattern on the nozzle member, created in the same manner and/or step as used to created the orifices, and a target pattern on the substrate, created in the same manner and/or step used to create the resistors. In the preferred embodiment, the nozzle member material is semi-transparent so that the target pattern on the substrate may be viewed through the nozzle member. The bonder then automatically positions the silicon dies 120 with respect to the nozzle members so as to align the two target patterns. Such an alignment feature exists in the Shinkawa TAB bonder. This automatic alignment of the nozzle member target pattern with the substrate target pattern not only precisely aligns the orifices with the resistors but also inherently aligns the electrodes on the dies 120 with the ends of the conductive traces formed in the tape 104, since the traces and the orifices are aligned in the tape 104, and the substrate electrodes and the heating resistors are aligned on the substrate. Therefore, all patterns on the tape 104 and on the silicon dies 120 will be aligned with respect to one another once the two target patterns are aligned.

Thus, the alignment of the silicon dies 120 with respect to the tape 104 is performed automatically using only commercially available equipment. By integrating the conductive traces with the nozzle member, such an alignment feature is possible. Such integration not only reduces the assembly cost of the printhead but reduces the printhead material cost as well.

The automatic TAB bonder then uses a gang bonding method to press the ends of the conductive traces down onto the associated substrate electrodes through the windows formed in the tape 104. The bonder then applies heat, such as by using thermocompression bonding, to weld the ends of the traces to the associated electrodes. A schematic side view of one embodiment of the resulting structure is shown in FIG. 6. Other types of bonding can also be used, such as ultrasonic bonding, conductive epoxy, solder paste, or other well-known means.

The tape 104 is then stepped to a heat and pressure station 122. As previously discussed with respect to FIGS. 9 and 10, an adhesive layer 84 exists on the top surface of the barrier layer 30 formed on the silicon substrate. After the above-described bonding step, the silicon dies 120 are then pressed down against the tape 104, and heat is applied to cure the adhesive layer 84 and physically bond the dies 120 to the tape 104.

Thereafter the tape 104 steps and is optionally taken up on the take-up reel 124. The tape 104 may then later be cut to separate the individual TAB head assemblies from one another.

The resulting TAB head assembly is then positioned on the print cartridge 10, and the previously described adhesive seal 90 is formed to firmly secure the nozzle member to the print cartridge, provide an ink-proof seal around the substrate between the nozzle member and the ink reservoir, and encapsulate the traces in the vicinity of the headland so as to isolate the traces from the ink.

Peripheral points on the flexible TAB head assembly are then secured to the plastic print cartridge 10 by a conventional melt-through type bonding process to cause the polymer flexible circuit 18 to remain relatively flush with the surface of the print cartridge 10, as shown in FIG. 1.

To increase resolution and print quality, the printhead nozzles must be placed closer together. This requires that both heater resistors and the associated orifices be placed closer together. To increase printer throughput, the firing frequency of the resistors must be increased. When firing the resistors at high frequencies, i.e., greater than 8 kHz, conventional ink channel barrier designs either do not allow the vaporization chambers to adequately refill or allow extreme blowback or catastrophic overshoot and puddling on the exterior of the nozzle member. Also, the closer spacing of the resistors created space problems and restricted possible barrier solutions due to manufacturing concerns.

Figure 15:
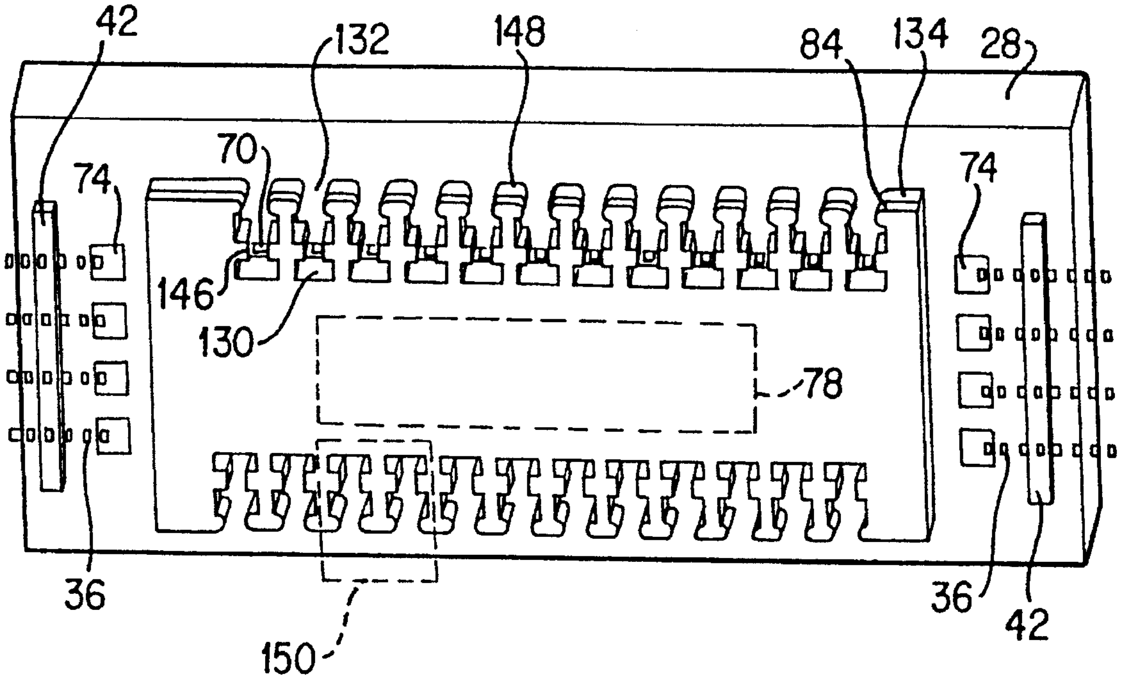
FIG. 15 shows the same substrate structure as that shown in FIG. 11 but having a different barrier layer pattern for improved printing performance.

The TAB head assembly architecture shown schematically in FIG. 15 is advantageous when a very high density of dots is required to be printed (e.g., 600 dpi). However, at such high dot densities and at high firing rates (e.g., 12 kHz) cross-talk between neighboring vaporization chambers becomes a serious problem. During the firing of a single nozzle, bubble growth initiated by a resistor displaces ink outward in the form of a drop. At the same time, ink is also displaced back into the ink channel. The quantity of ink so displaced is often described as "blowback volume." The ratio of ejected volume to blowback volume is an indication of ejection efficiency, which may be on the order of about 1:1 for the TAB head assembly 14 of FIG. 11. In addition to representing an inertial impediment to refill, blowback volume causes displacements in the menisci of neighboring nozzles. When these neighboring nozzles are fired, such displacements of their menisci cause deviations in drop volume from the nominally equilibrated situation resulting in nonuniform dots being printed.

A second embodiment of the present invention shown in the TAB head assembly architecture of FIG. 15 is designed to minimize such cross-talk effects. Elements in FIGS. 9 and 13 which are labelled with the same numbers are similar in structure and operation. The significant differences between the structures of FIGS. 9 and 13 include the barrier layer pattern and the increased density of the vaporization chambers.

In FIG. 15, vaporization chambers 130 and ink channels 132 are shown formed in barrier layer 134. Ink channels 132 provide an ink path between the source of ink and the vaporization chambers 130. The flow of ink into the ink channels 132 and into the vaporization chambers 130 is generally similar to that described with respect to FIGS. 10 and 11, whereby ink flows around the long side edges 86 of the substrate 28 and into the ink channels 132.

The vaporization chambers 130 and ink channels 132 may be formed in the barrier layer 134 using conventional photolithographic techniques. The barrier layer 134 may be similar to the barrier layer 30 in FIGS. 5 and 10 and may comprise any high quality photoresist, such as Vacrel or Parad.

Thin film resistors 70 in FIG. 15 are similar to those described with respect to FIG. 11 and are formed on the surface of the silicon substrate 28. As previously mentioned with respect to FIG. 11, resistors 70 may instead be well known piezoelectric pump-type ink ejection elements or any other conventional ink ejection elements where vaporization of ink is not necessarily occurring in chambers 130. If a piezoelectric ink ejection element is used, such chambers 130 may be broadly referred to as ink ejection chambers.

Figure 17:
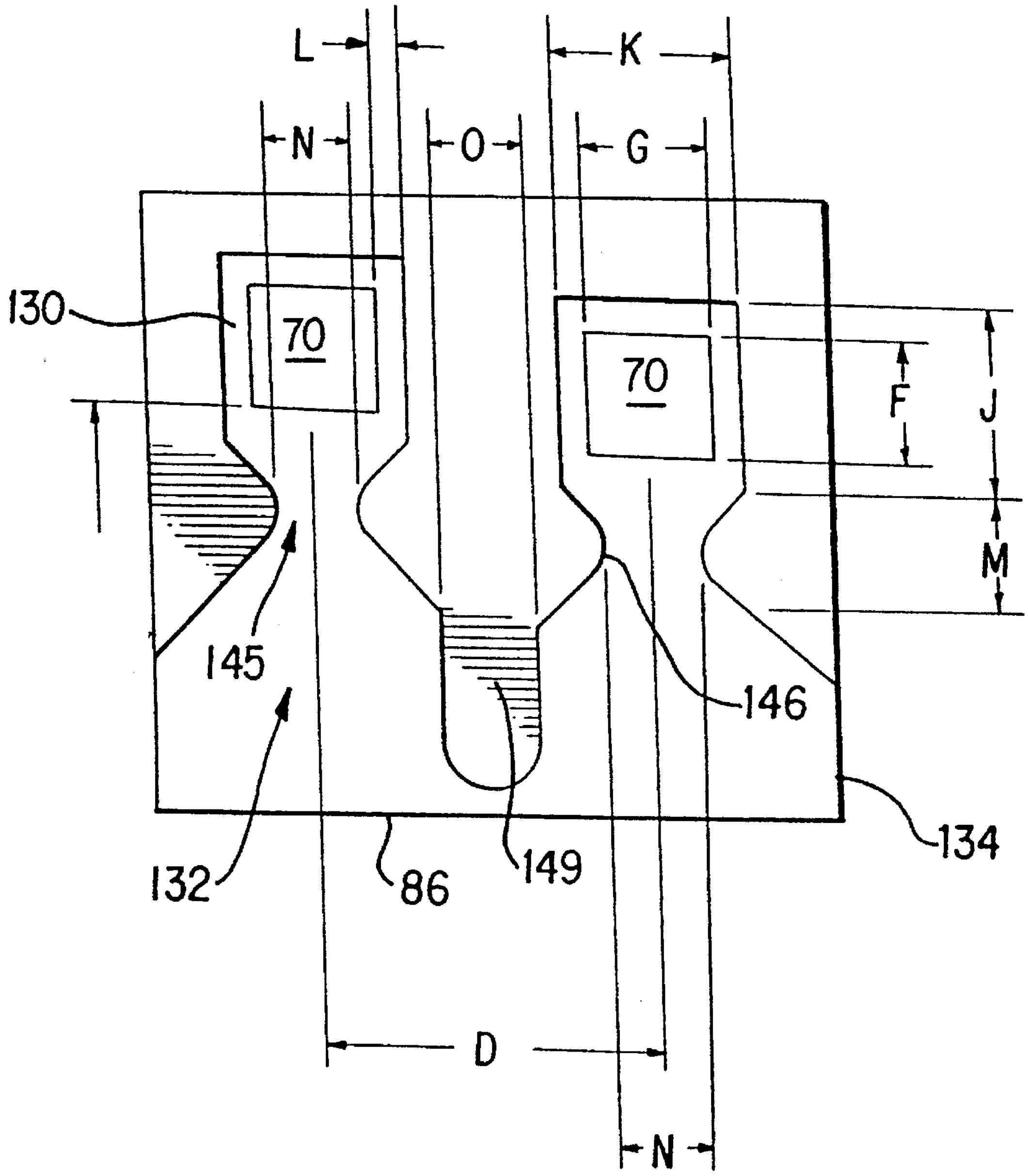
FIG. 17 is a top plan view of a magnified portion of an alternative structure to the structure of FIG. 16.

To form a completed TAB head assembly, the substrate structure of FIG. 15 is affixed to the nozzle member 136 of FIG. 17 in the manner shown in FIG. 19 which is described in greater detail later. The resulting TAB head assembly is very similar to the TAB head assembly 14 in FIGS. 2, 4, 5, and 6.

Generally, the particular architecture of the ink channels 132 in FIG. 15 provides advantages over the architecture shown in FIG. 11. Further details and other advantages of the TAB head assembly architecture will be described with respect to FIG. 16, which is a magnified top plan view of the portion of FIG. 15 shown within dashed outline 150. The architecture of the ink channels 132 in FIG. 16 has the following differences from the architecture shown in FIG. 11. The relatively narrow constriction points or pinch point gaps 145 created by the pinch points 146 in the ink channels 132 provide viscous damping during refill of the vaporization chambers 130 after firing. This viscous damping helps minimize cross-talk between neighboring vaporization chambers 130. The pinch points 146 also help control ink blow-back and bubble collapse after firing to improve the uniformity of ink drop ejection. The addition of "peninsulas" 149 extending from the barrier body out to the edge of the substrate provided fluidic isolation of the vaporization chambers 130 from each other to prevent cross-talk and allowed support of the nozzle member 136 at the edge of the substrate. The enlarged areas or reefs 148 formed on the ends of the peninsulas 149 near the entrance to each ink channel 132 increase the nozzle member 136 support area at the edges of the barrier layer 134 so that the nozzle member 136 lies relatively flat on barrier layer 134 when affixed to barrier layer 134. Adjacent reefs 148 also act to constrict the entrance of the ink channels 132 so as to help filter large foreign particles.

Figure 16:
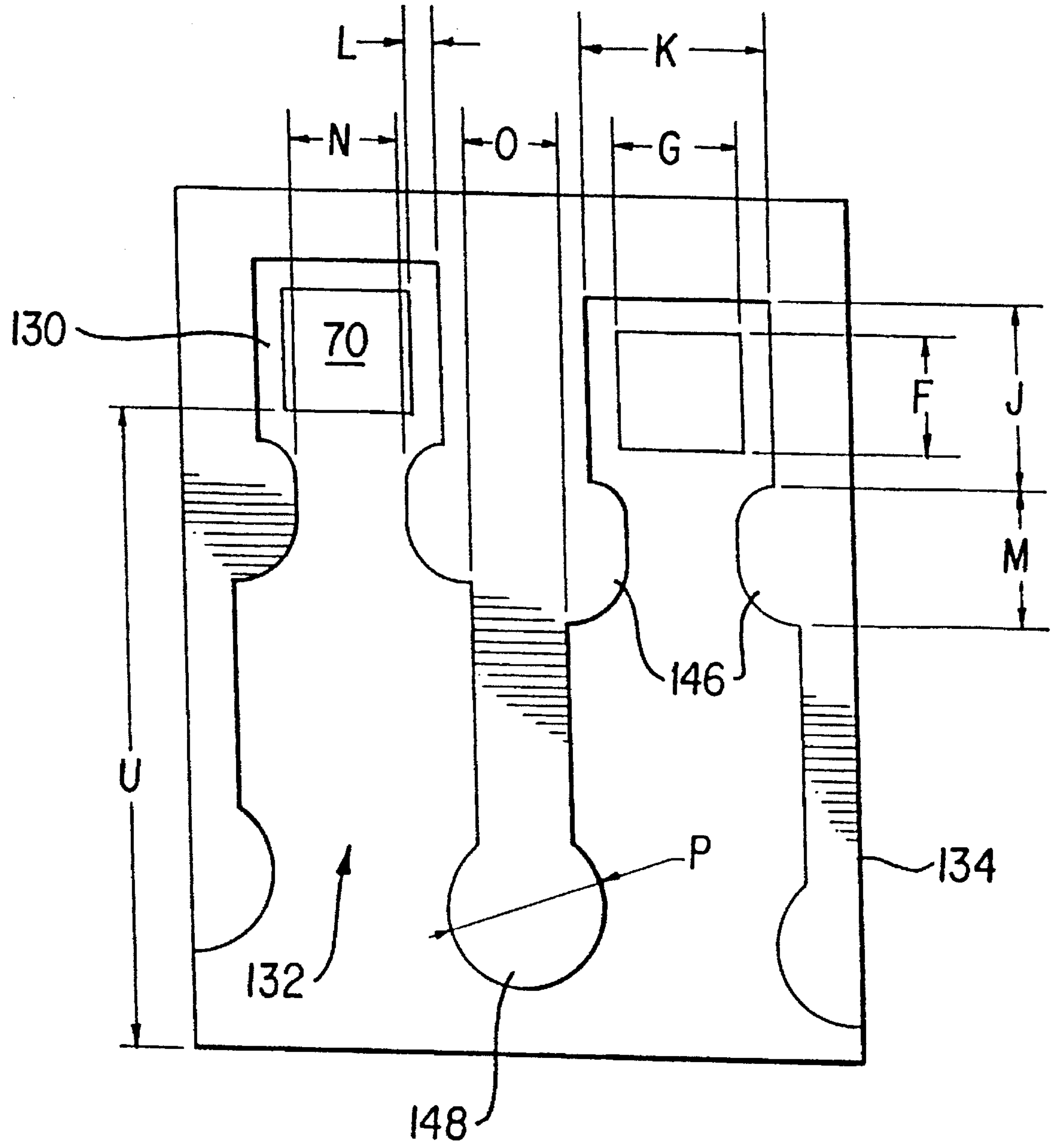
FIG. 16 is a top plan view of a magnified portion of the structure of FIG. 15.
Figure 22:
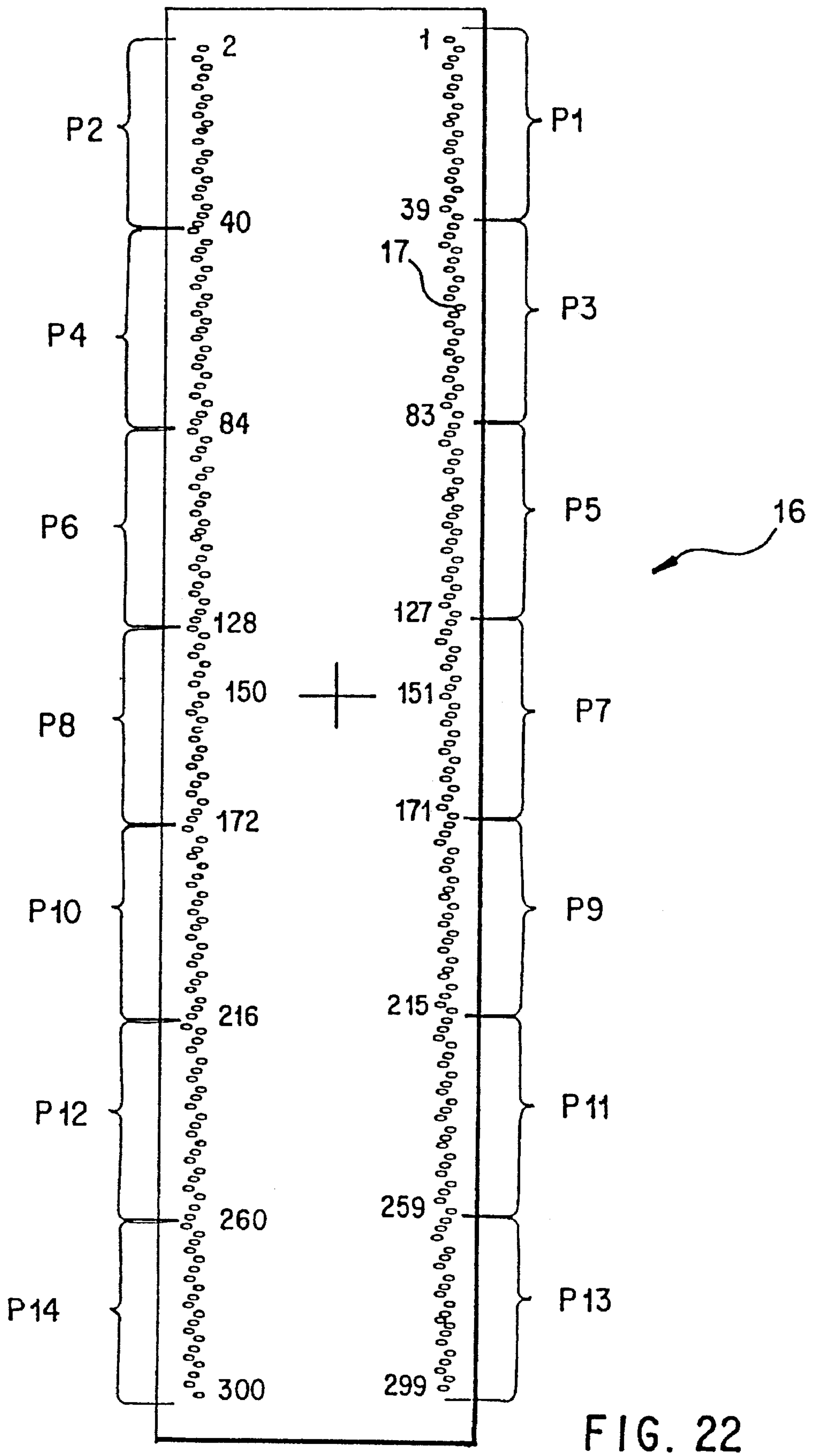
FIG. 22 is a view of one arrangement of orifices and the associated heater resistors on a printhead.

The pitch D of the vaporization chambers 130 shown in FIG. 16 provides for 600 dots per inch (dpi) printing using two rows of vaporization chambers 130 as shown in FIG. 22 and to be described below. Within a single row or column of vaporization chambers 130, a small offset E (shown in FIG. 21) is provided between vaporization chambers 130. This small offset E allows adjacent resistors 70 to be fired at slightly different times when the TAB head assembly is scanning across the recording medium to further minimize cross-talk effects between adjacent vaporization chambers 130. There are twenty two different offset locations, one for each address line. Further details are provided below with respect to FIGS. 22–24. The definition of the dimensions of the various elements shown in FIGS. 16, 17, 20 and 21 are provided in Table I.

TABLE I

DEFINITION OF INK CHAMBER DEFINITIONS

| Dimension | Definition |
|---|---|
| A | Substrate Thickness |
| B | Barrier Thickness |
| C | Nozzle Member Thickness |
| D | Orifice/Resistor Pitch |
| E | Resistor/Orifice Offset |
| F | Resistor Length |
| G | Resistor Width |
| H | Nozzle Entrance Diameter |
| I | Nozzle Exit Diameter |
| J | Chamber Length |
| K | Chamber Width |
| L | Chamber Gap |
| M | Channel Length |
| N | Channel Width |
| O | Barrier Width |
| P | Reef Diameter |
| Q | Cavity Length |
| R | Cavity Width |
| S | Cavity Depth |
| T | Cavity Location |
| U | Shelf Length |

The dimensions of the various elements formed in the barrier layer 134 shown in FIG. 16 are given in Table II below. Also shown in Table II is the orifice diameter I shown in FIG. 21.

TABLE II

INK CHAMBER DIMENSIONS IN MICRONS

| Dimension | Minimum | Nominal | Maximum |
|---|---|---|---|
| E | 1 | 1.73 | 2 |
| F | 30 | 35 | 40 |
| G | 30 | 35 | 40 |
| I | 23 | 26 | 34 |
| J | 45 | 50 | 55 |
| K | 45 | 50 | 55 |
| L | 0 | 8 | 10 |
| M | 20 | 35 | 50 |
| N | 15 | 30 | 55 |
| O | 10 | 25 | 40 |
| P | 30 | 40 | 50 |
| U | 75 | 155–190 | 270 |

An alternative embodiment of the TAB head assembly architecture will be described with respect to FIG. 17, which is a modified top plan view of the portion of the ink channels 132 shown in FIG. 16. The architecture of the ink channels 132 in FIG. 17 has the following differences from the architecture shown in FIG. 16. As the shelf length U decreases in length, the nozzle frequency increases. In the embodiment shown in FIG. 17 the shelf length is reduced. As a consequence, the fluid impedance is reduced, resulting in a more uniform frequency response for all nozzles. Edge feed permits use of a second saw cut partially through the wafer to allowing a shorter shelf length, U, to be formed. Alternatively, precise etching may be used. This shelf length is shorter than that of other commercially available printer cartridges and permits firing at much higher frequencies.

The frequency limit of a thermal inkjet pen is limited by resistance in the flow of ink to the nozzle. However, some resistance in ink flow is necessary to damp meniscus oscillation, but too much resistance limits the upper frequency at which a print cartridge can operate. Ink flow resistance (impedance) is intentionally controlled by the pinch point gap 145 gap adjacent the resistor with a well-defined length and width. The distance of the resistor 70 from the substrate edge varies with the firing patterns of the TAB head assembly. An additional component to the fluid impedance is the entrance to the firing chamber. The entrance comprises a thin region between the nozzle member 16 and the substrate 28 and its height is essentially a function of the thickness of the barrier layer 134. This region has high fluid impedance, since its height is small.

Figure 18:
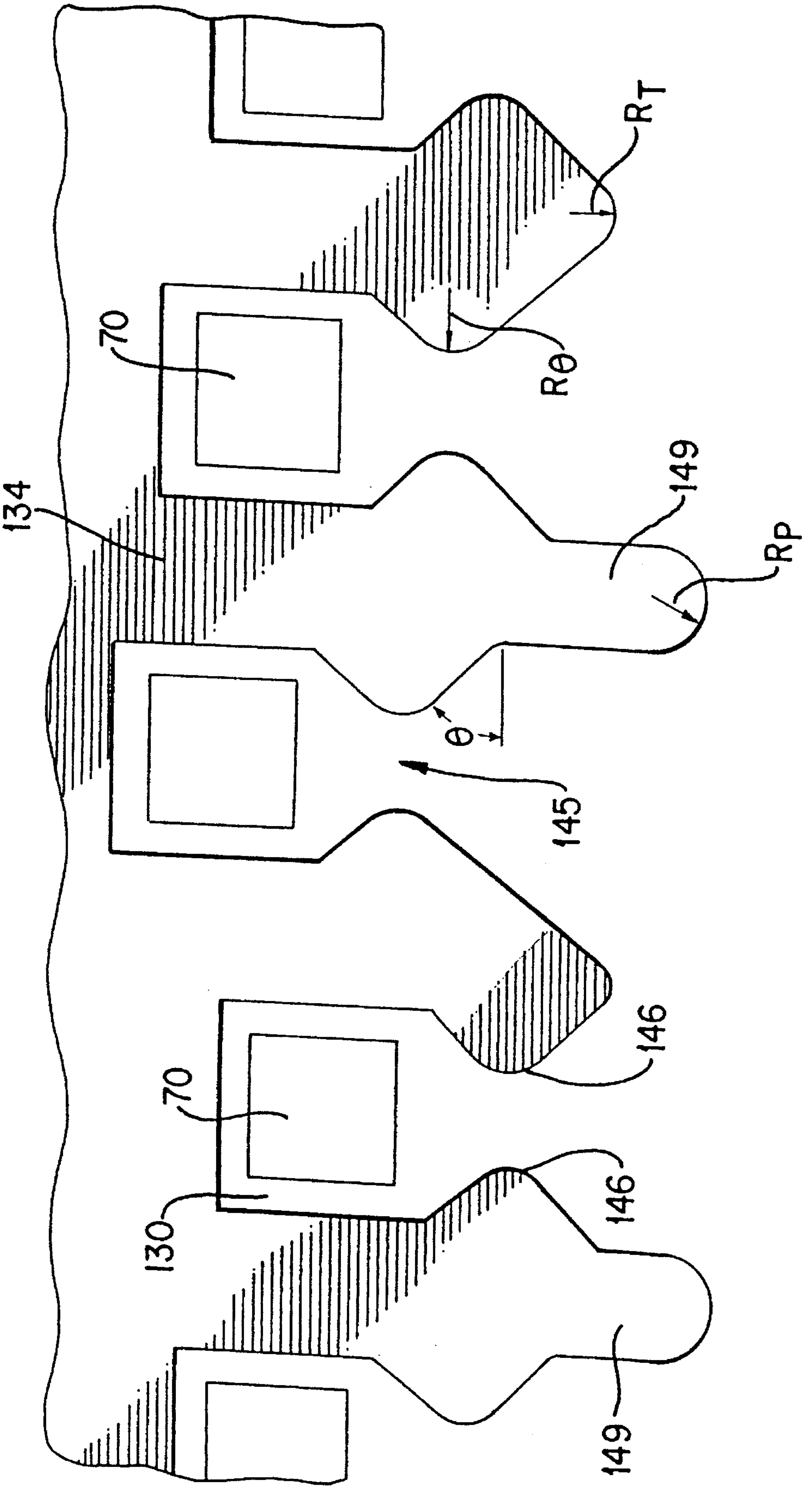
FIG. 18 is a top plan view of the structure of FIG. 15 expanded to show four resistors and the associated barrier structure..

The refill ink channel was reduced to a minimum shelf length, to allow the fastest possible refill, and "pinched" to the minimum width, to create the best damping. The short shelf length reduced the mass of the moving ink during ink chamber refill, thus reducing the sensitivity to damping features. This allowed wider processing tolerances while at the same time maintaining controlled damping. The principal difference is that the peninsulas 149 have been shortened and the reefs 148 have been removed. In addition, every other peninsula 149 has been shortened further to the pinch points 146. Also as shown in FIG. 17 the shape of the pinch points 146 have been modified. The pinch points 146 can be on one or both sides of the ink channel 130 with various tip configurations. This architecture allows greater than 8 kHz ink refill speed while providing sufficient overshoot damping. The shorter ink channel allows barrier processing of narrow ink channel widths that could not previously be accomplished. The dimensions of the various elements formed in the barrier layer 134 shown in FIG. 16 are identified in Table III below. FIG. 18 shows the effect of the offset from resistor to resistor on the shape long and shortened peninsulas due to the pinch points 146.

TABLE III

| INK CHAMBER DIMENSIONS IN MICRONS | | | |
|---|---|---|---|
| Dimension | Minimum | Nominal | Maximum |
| E | 1 | 1.73 | 2 |
| F | 30 | 35 | 40 |
| G | 30 | 35 | 40 |
| I | 20 | 28 | 40 |
| J | 45 | 51 | 75 |
| K | 45 | 51 | 55 |
| L | 0 | 8 | 10 |
| M | 20 | 25 | 50 |
| N | 15 | 30 | 55 |
| O | 10 | 25 | 40 |
| $R_B$ | 5 | 15 | 25 |
| $R_P$ | 5 | 12.5 | 20 |
| $R_T$ | 0 | 5 | 20 |
| U | 0 | 90–130 | 270 |

Figure 19:
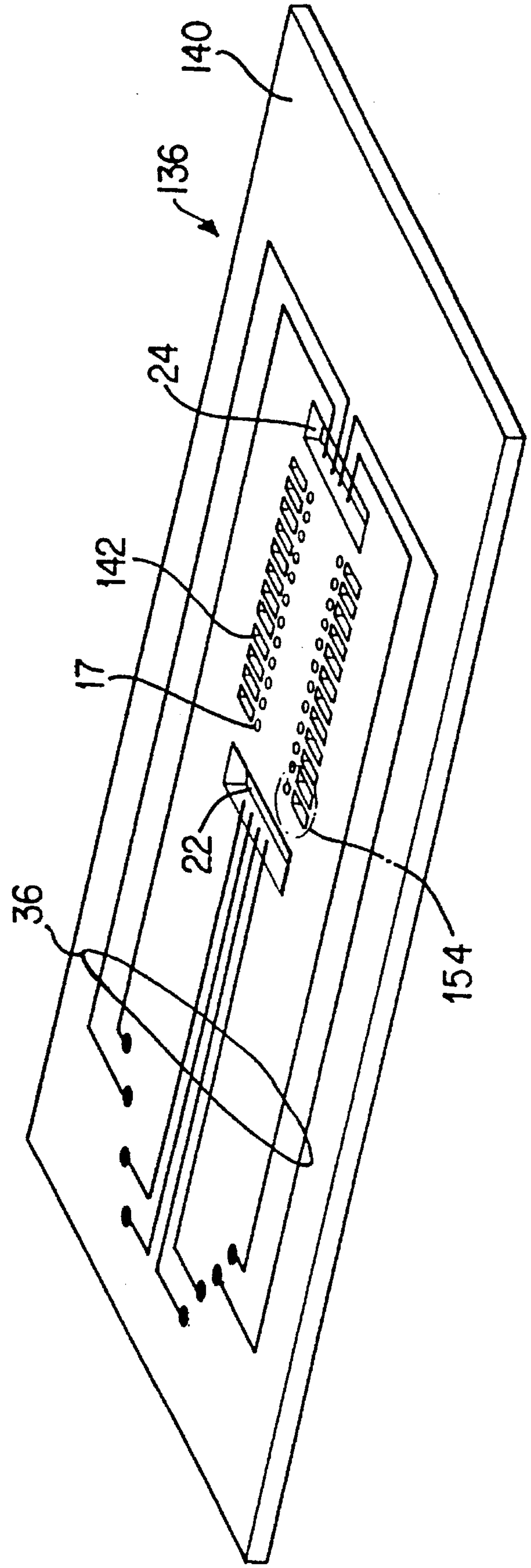
FIG. 19 is a perspective view of the back surface of a flexible polymer circuit having ink orifices and cavities formed in it.

FIG. 19 is a preferred nozzle member 136 in the form of a flexible polymer tape 140, which, when affixed to the substrate structure shown in FIG. 15, forms a TAB head assembly similar to that shown in FIGS. 4 and 5. Elements in FIGS. 5 and 15 which are labelled with the same numbers are similar in structure and operation. The flexible polymer nozzle member 136 in FIG. 19 primarily differs from the flexible circuit 18 in FIG. 5 by the increased density of laser-ablated nozzles 17 in the nozzle member 136 (to produce a higher printing resolution) and by the inclusion of cavities 142 which are laser-ablated through a partial thickness of the nozzle member 136. A separate mask 108 in the process shown in FIG. 14 may be used to define the pattern of cavities 142 in the nozzle member 136. A second laser source may be used to output the proper energy and pulse length to laser ablate cavities 142 through only a partial thickness of the nozzle member 136.

Conductors 36 on flexible circuit 140 provide an electrical path between the contact pads 20 (FIG. 4) and the electrodes 74 on the substrate 28 (FIG. 15). Conductors 36 are formed directly on flexible circuit 140 as previously described with respect to FIG. 5.

Figure 20:
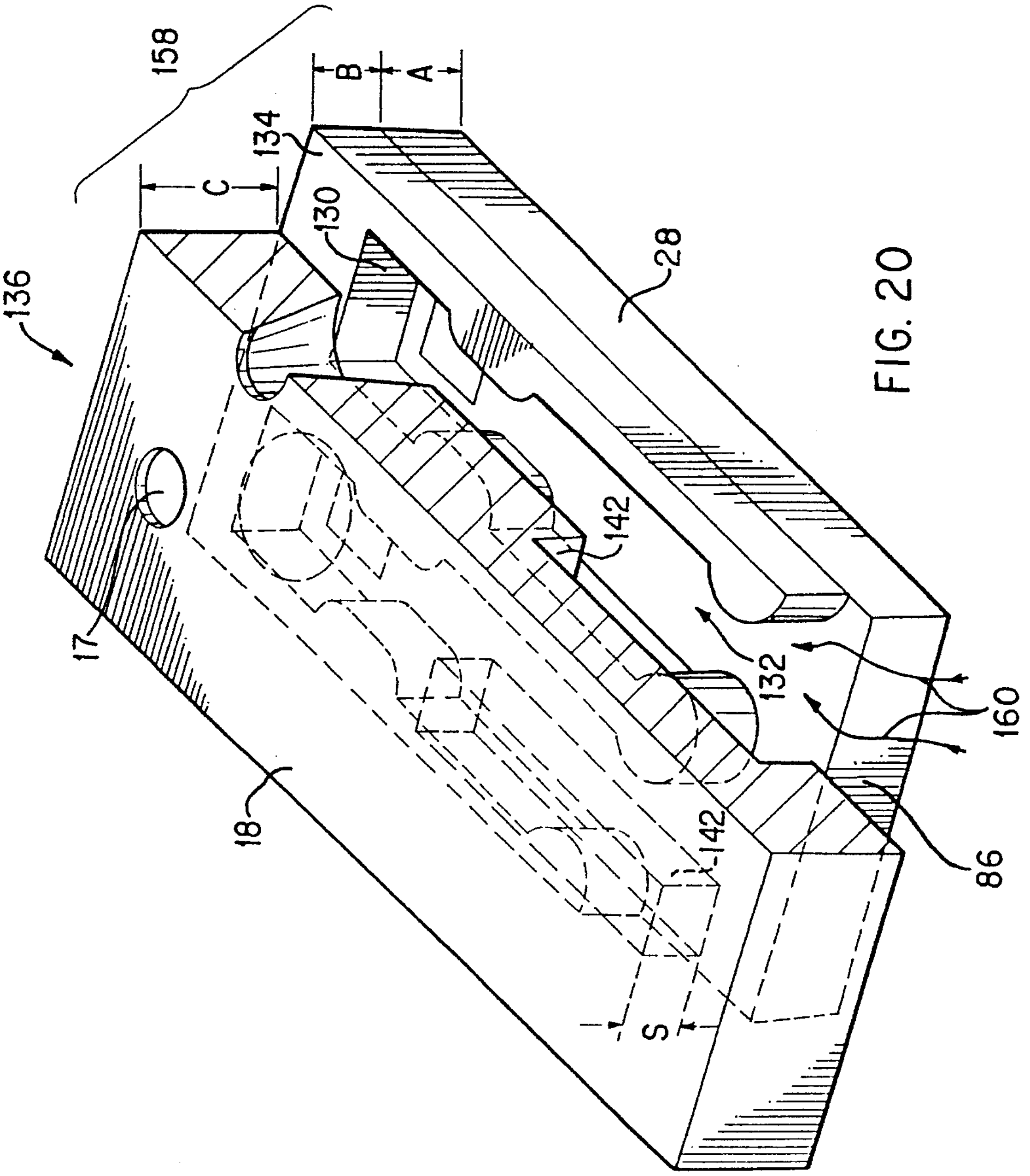
FIG. 20 is a magnified perspective view, partially cut away, of a portion of the resulting TAB head assembly when the back surface of the flexible circuit in FIG. 19 is properly affixed to the barrier layer of the substrate structure shown in FIG. 15.

FIG. 20 is a magnified, partially cut away view in perspective of the portion of the nozzle member 136 shown in the dashed outline 154 of FIG. 19 after the nozzle member 136 has been properly positioned over the substrate structure of FIG. 20 to form a TAB head assembly 158 similar to the TAB head assembly 14 in FIG. 5. As shown in FIG. 20, the nozzles 17 are aligned over the vaporization chambers 130, and the cavities 142 are aligned over the ink channels 132. FIG. 20 also illustrates the ink flow 160 from an ink reservoir generally situated behind the substrate 28 as the ink flows over an edge 86 of the substrate 28 and enters cavities 142 and ink channels 132.

Preferred dimensions A, B, and C in FIG. 20 are provided in Table IV below, where dimension C is the thickness of the nozzle member 136, dimension B is the thickness of the barrier layer 134, and dimension A is the thickness of the substrate 28.

FIG. 21 is a top plan view of the portion of the TAB head assembly 158 shown in FIG. 20, where the vaporization chambers 130 and ink channels 132 can be seen through the nozzle member 136. The various dimensions of the cavities 142, the nozzles 17, and the separations between the various elements are identified in Table IV below. In FIG. 21, dimension H is the entrance diameter of the nozzles 17, while dimension I is the exit diameter of the nozzles 17. The other dimensions are self-explanatory.

The cavities 142 minimize the viscous damping of ink during refill as the ink flows into the ink channels 132. This helps compensate for the increased viscous damping provided by the pinch points 146, reefs 148, and increased length of the ink channels 132 along the substrate shelf. Minimizing viscous damping helps increase the maximum firing rate of the resistors 70, since ink can enter into the ink channels 132 more quickly after firing. Thus, the damping function is provided primarily by the pinch points rather than the viscous damping which is different individual vaporization chambers due to the different shelf lengths for individual vaporization chambers caused by the offsets, E, between the vaporization chambers.

TABLE IV

| SUBSTRATE, INK CHANNEL AND NOZZLE MEMBER DIMENSIONS IN MICRONS | | | |
|---|---|---|---|
| Dimension | Minimum | Nominal | Maximum |
| A | 600 | 625 | 650 |
| B | 19 | 25 | 32 |
| C | 25 | 50 | 75 |
| D | | 84.7 | |
| H | 40 | 55 | 70 |
| Q | 80 | 120 | 200 |
| R | 20 | 35 | 50 |
| S | 0 | 25 | 50 |
| T | 50 | 100 | 150 |

Tables I, II and III above lists the nominal values of the various dimensions A–U of the TAB head assembly structure of FIGS. 13–18 as well as their preferred ranges. It should be understood that the preferred ranges and nominal values of an actual embodiment will depend upon the intended operating environment of the TAB head assembly, including the type of ink used, the operating temperature, the printing speed, and the dot density.

Referring to FIG. 22, as discussed above, the orifices 17 in the nozzle member 16 of the TAB head assembly are generally arranged in two major columns of orifices 17 as shown in FIG. 22. For clarity of understanding, the orifices 17 are conventionally assigned a number as shown, starting at the top right as the TAB head assembly as viewed from the external surface of the nozzle member 16 and ending in the lower left, thereby resulting in the odd numbers being arranged in one column and even numbers being arranged in the second column. Of course, other numbering conventions may be followed, but the description of the firing order of the orifices 17 associated with this numbering system has advantages. The orifices/resistors in each column are spaced 1/300 of an inch apart in the long direction of the nozzle member. The orifices and resistors in one column are offset from the orifice/resistors in the other column in the long direction of the nozzle member by 1/600 of an inch, thus, providing 600 dots per inch (dpi) printing.

Figure 23:
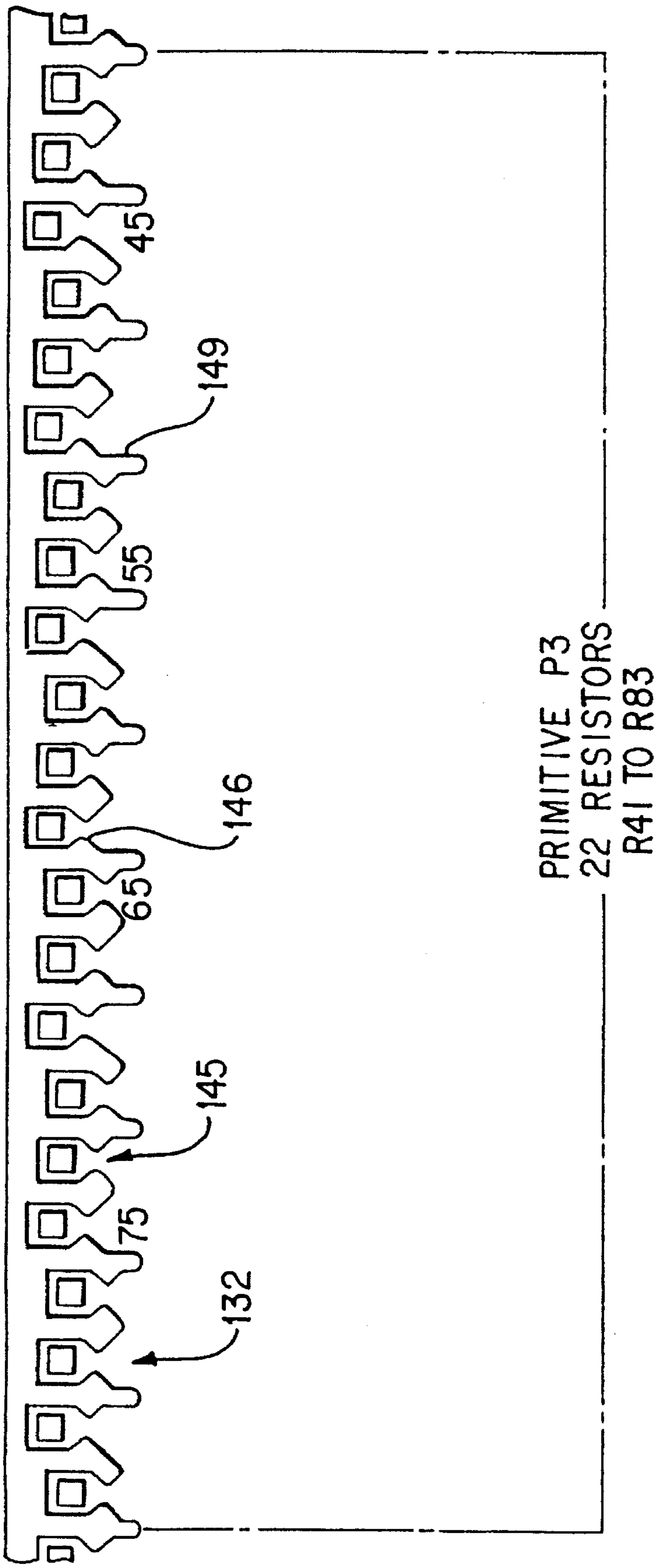
FIG. 23 is top plan view of one primitive of resistors and the associated ink vaporization chambers, ink channels and barrier architecture.
Figure 25A:
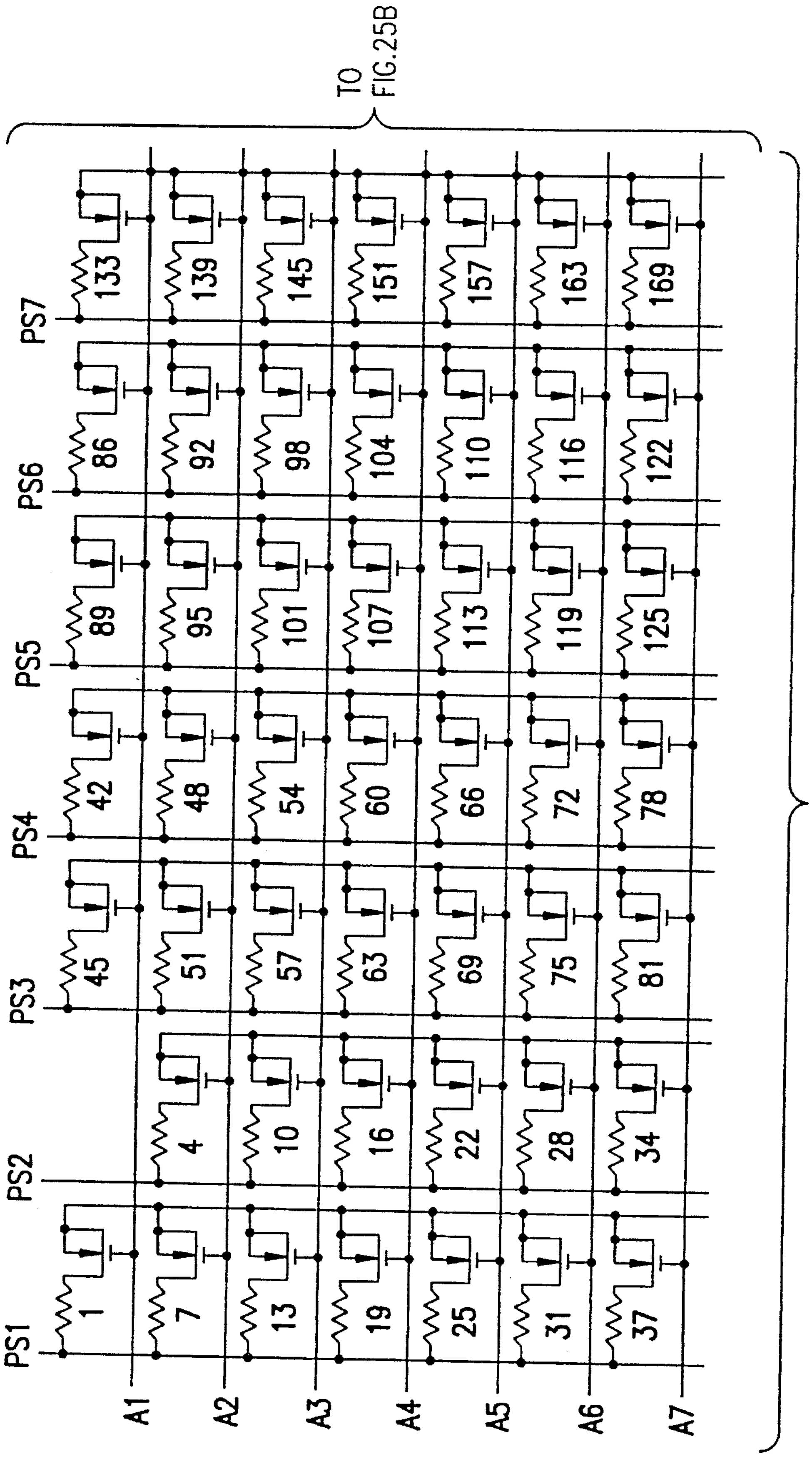
FIG. 25 is a schematic diagram of the heater resistors and the associated address lines, primitive select lines and ground lines which may be employed in the present invention.
Figure 25B:
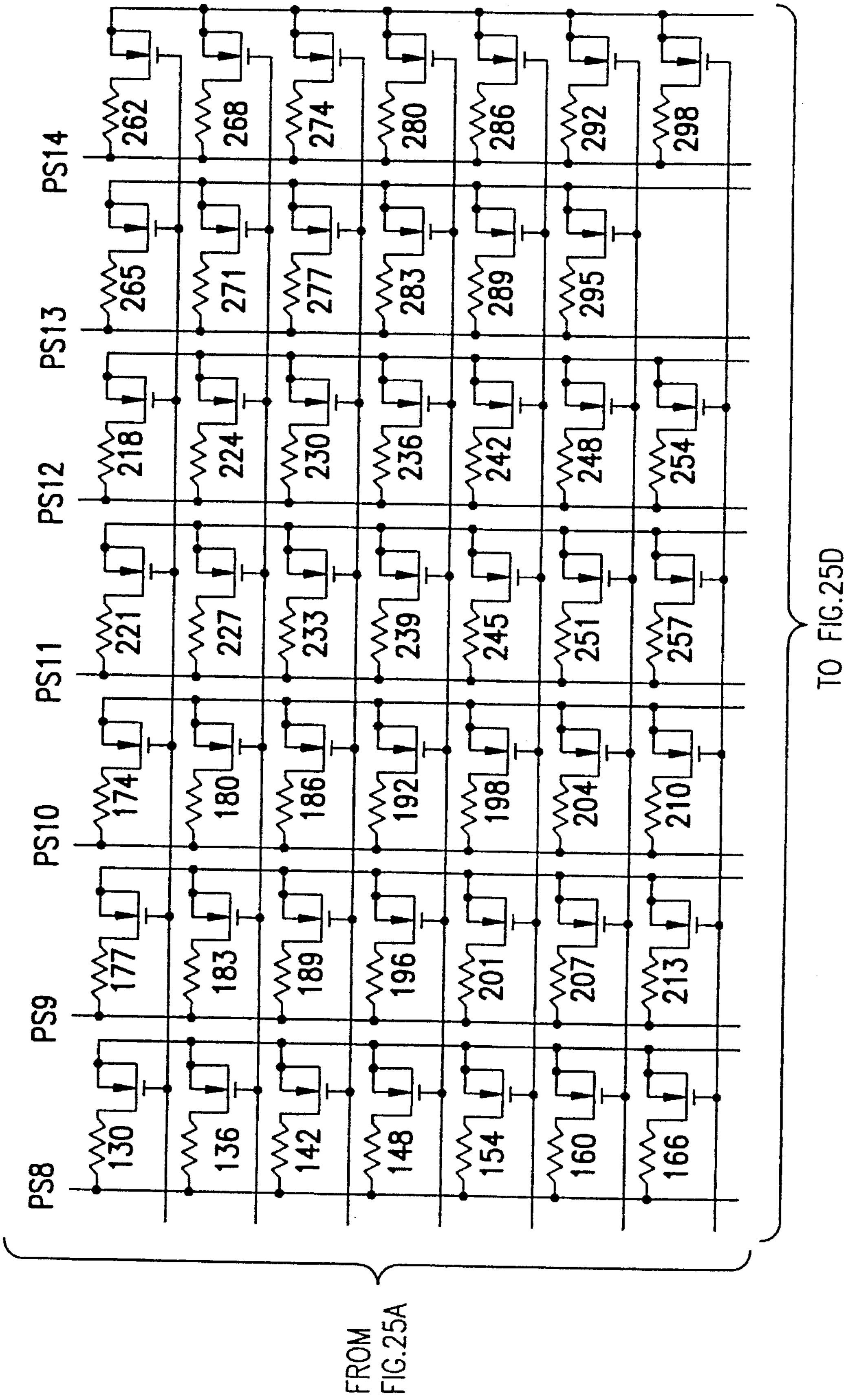
Figure 25C:
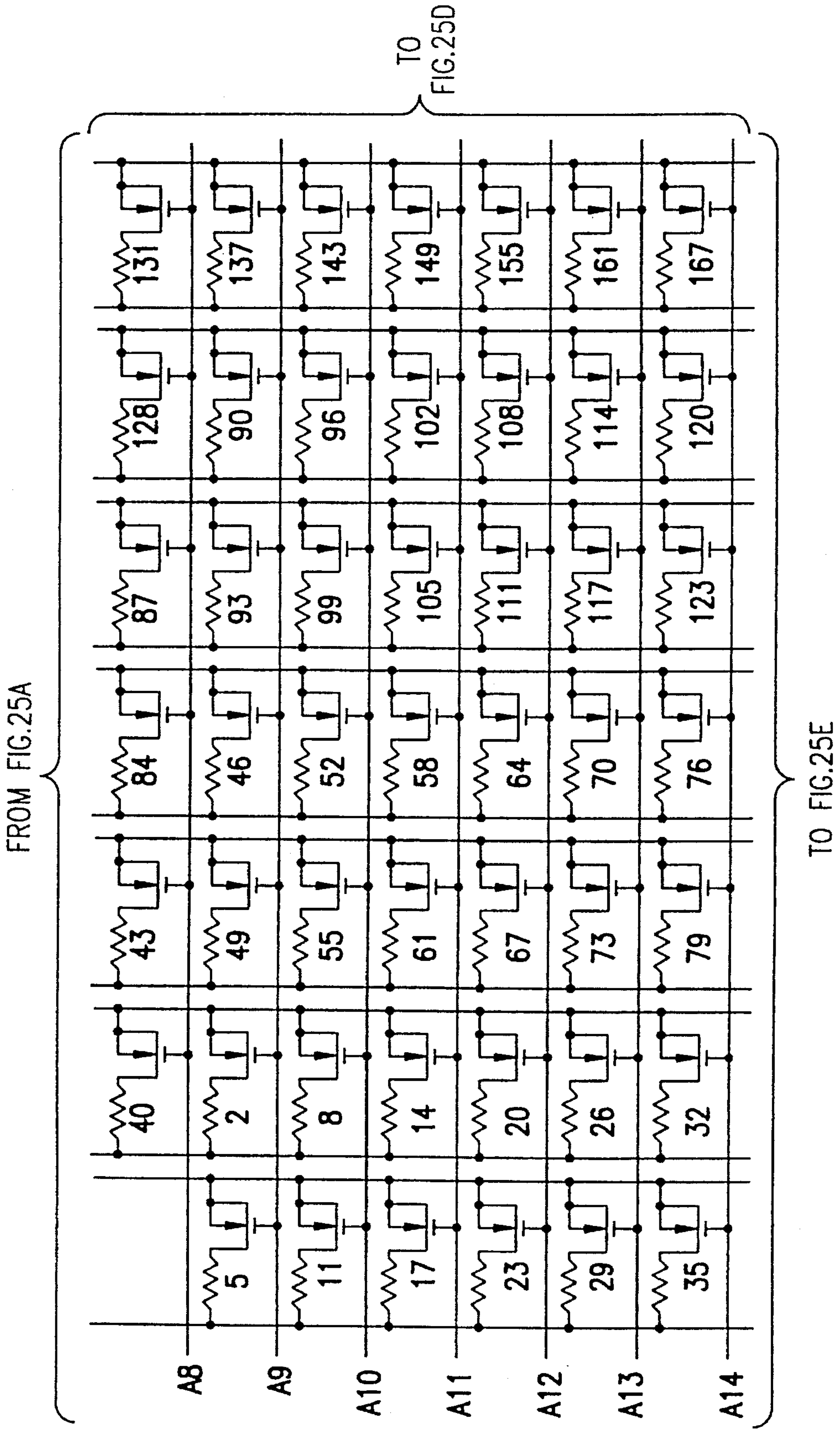
Figure 25D:
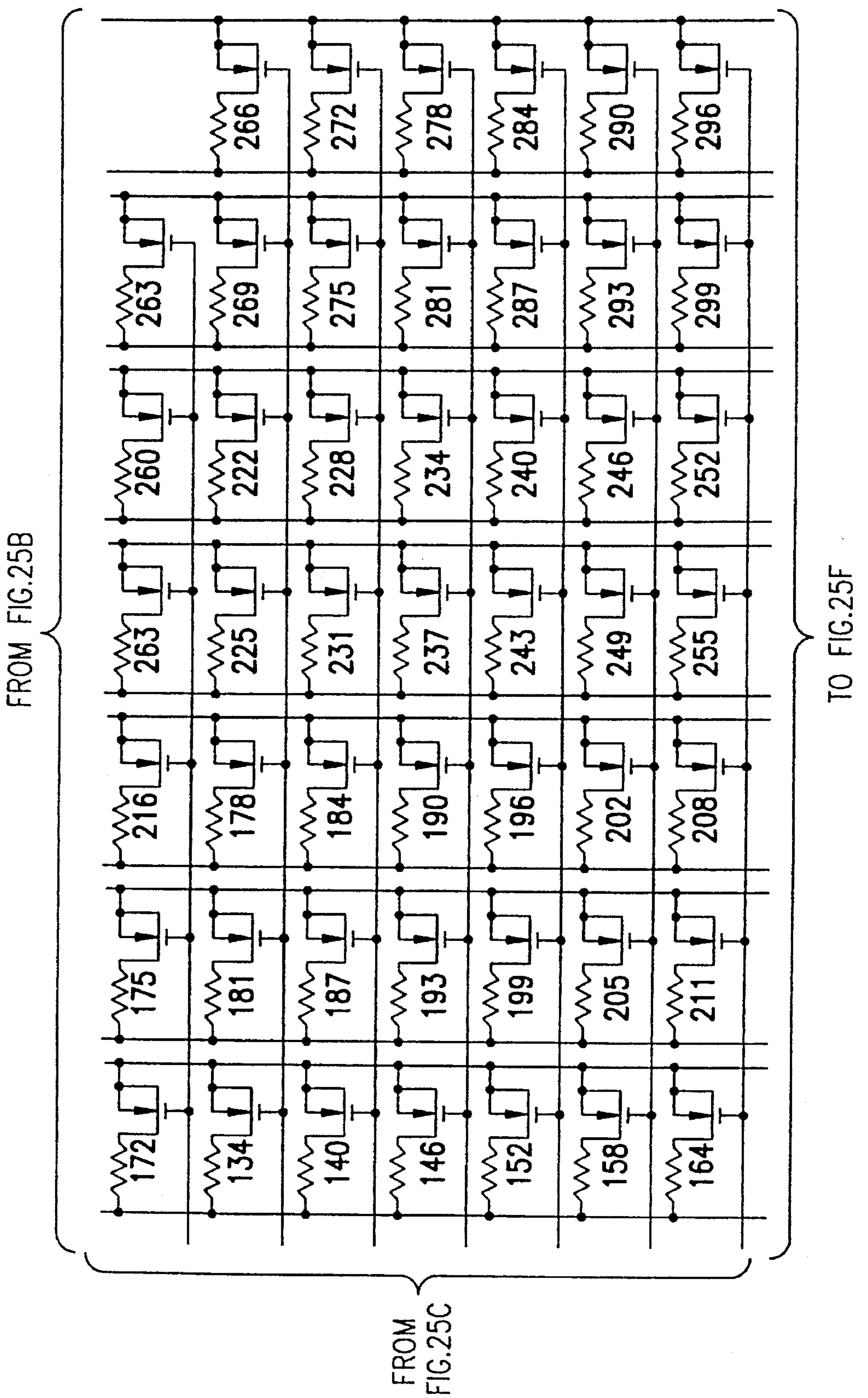
Figure 25E:
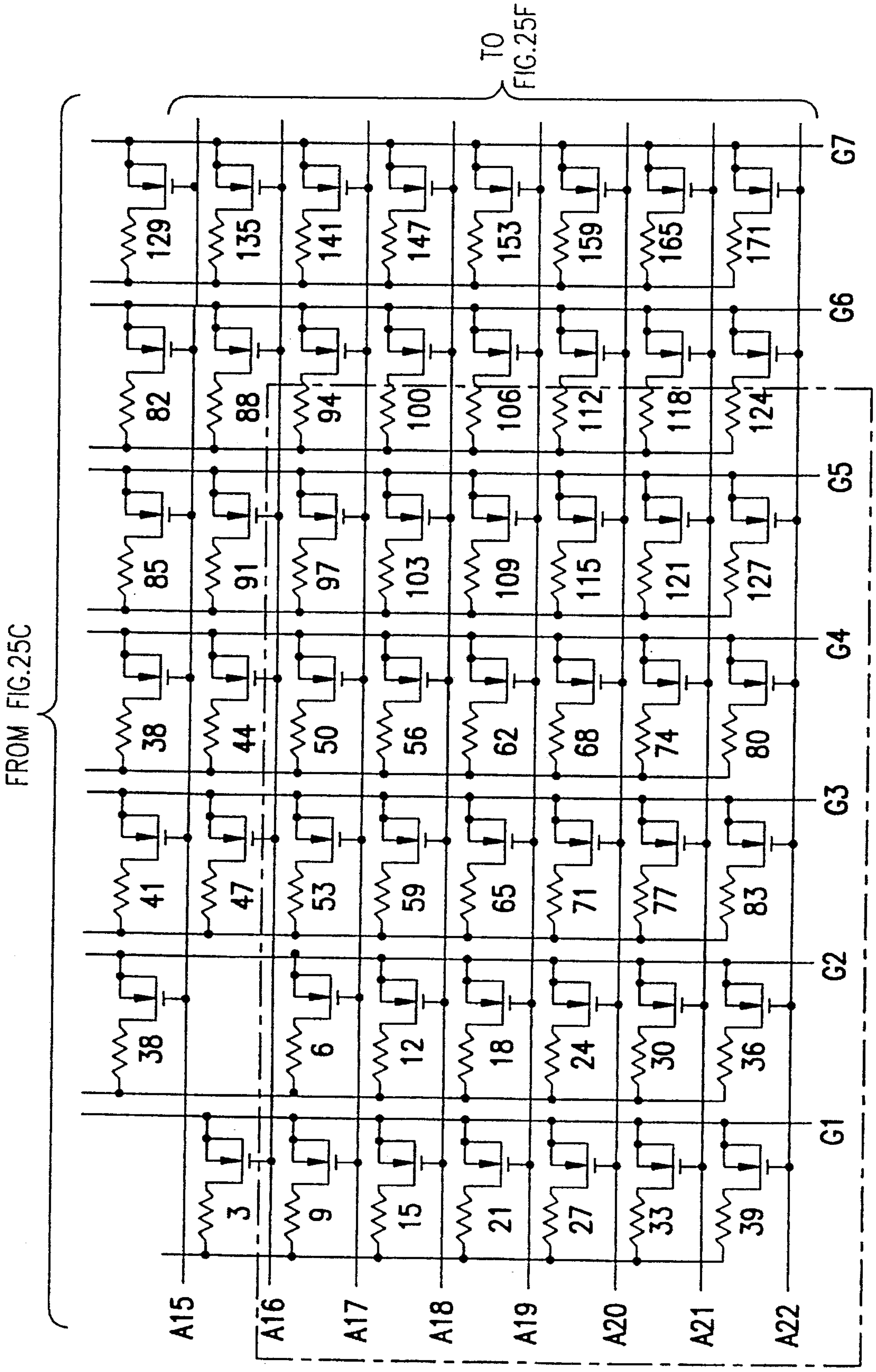
Figure 25F:
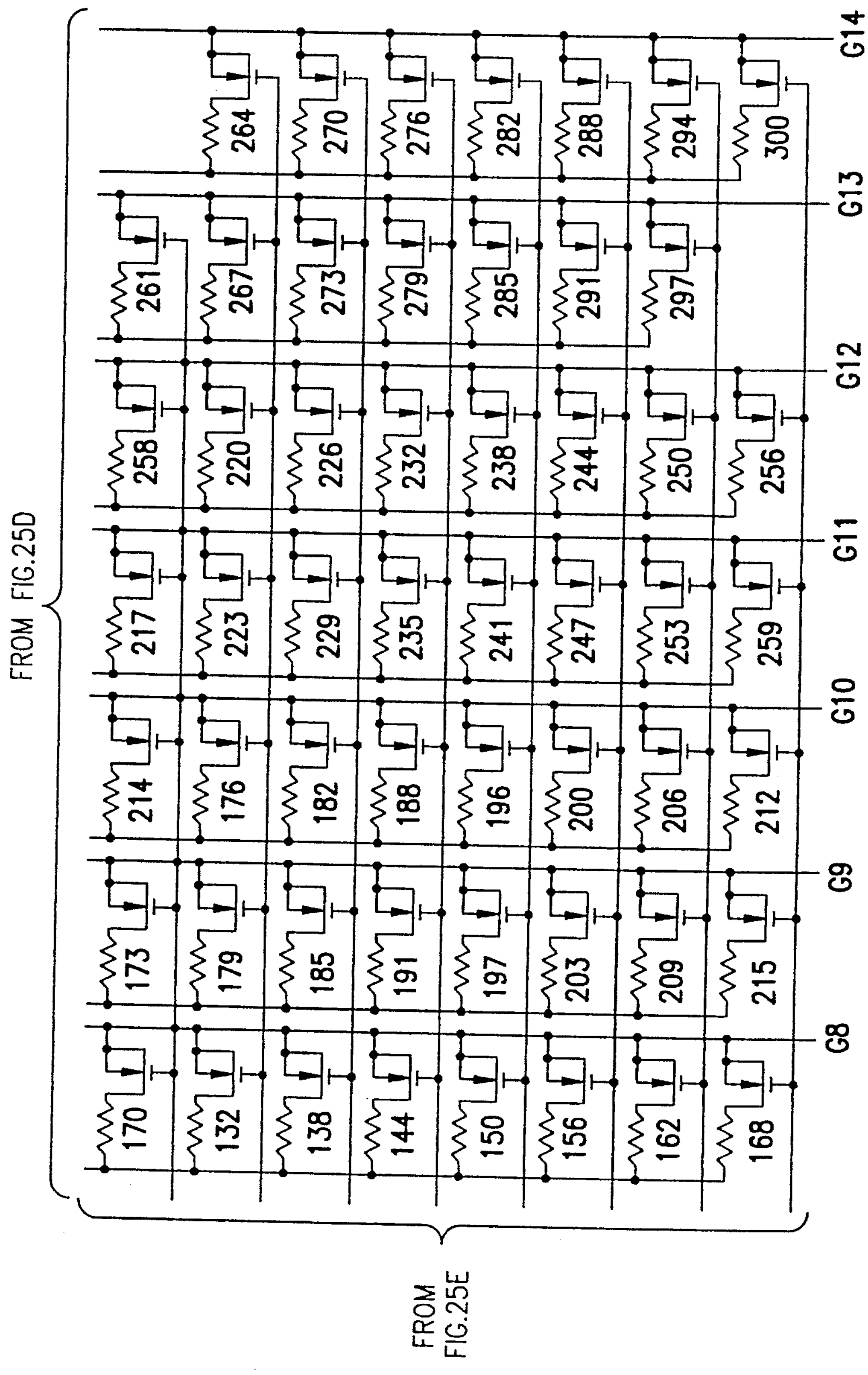

In one embodiment of the present invention the orifices 17, while aligned in two major columns as described, are further arranged in an offset pattern within each column to match the offset heater resistors 70 disposed in the substrate 28 as illustrated in FIGS. 22 and 23. Within a single row or column of resistors, a small offset E (shown in FIG. 21) is provided between resistors. This small offset E allows adjacent resistors 70 to be fired at slightly different times when the TAB head assembly is scanning across the recording medium to further minimize cross-talk effects between adjacent vaporization chambers 130. Thus, although the resistors are fired at twent two different times, the offset allows the ejected ink drops from different nozzles to be placed in the same horizontal position on the print media. .The resistors 70 are coupled to electrical drive circuitry (not shown in FIG. 22) and are organized in groups of fourteen primitives which consist of four primitives of twenty resistors (P1, P2, P13 and P14) and ten primitives of twenty two resistors for a total of 300 resistors. The fourteen resistor primitives (and associated orifices) are shown in FIG. 22.

FIG. 23 shows the offset of the resistors and the ink channels 132, peninsulas 149, pinch point gaps 145 and pinch points 146 of primitive P5. The spatial location of the 300 resistor/orifices with respect to the centroid of the substrate is provided in FIG. 24. The TAB head assembly orifices 17 are positioned directly over the heater resistors 70 and are positioned relative to its most adjacent neighbor in accordance with FIG. 16. This placement and firing sequence provides a more uniform frequency response for all resistors 70 and reduces the crosstalk between adjacent vaporization chambers.

Figure 26:
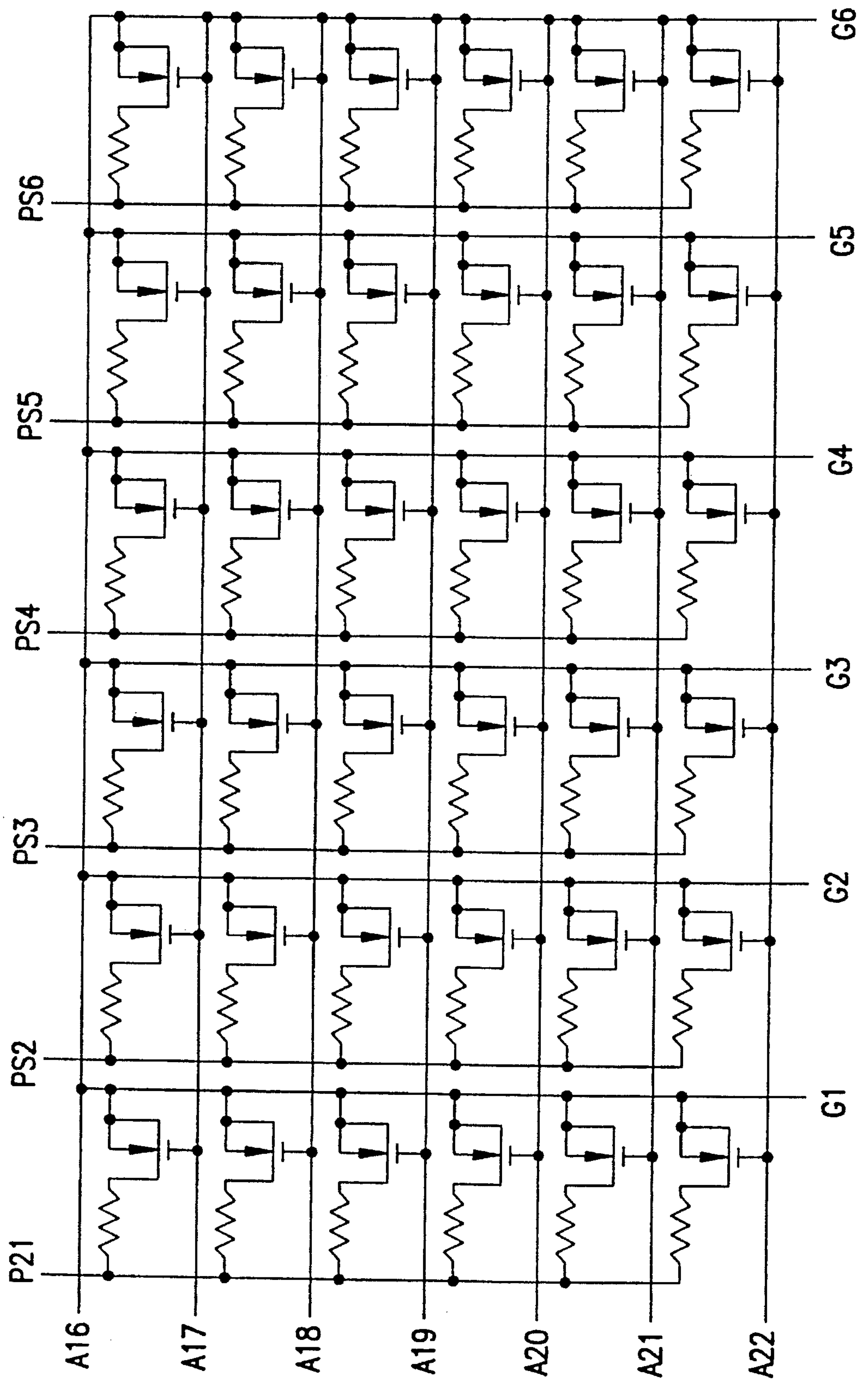
FIG. 26 is an enlarged schematic diagram of the heater resistors and the associated address lines, primitive select lines and ground lines of the outlined portion of FIG. 25.
Figure 27:
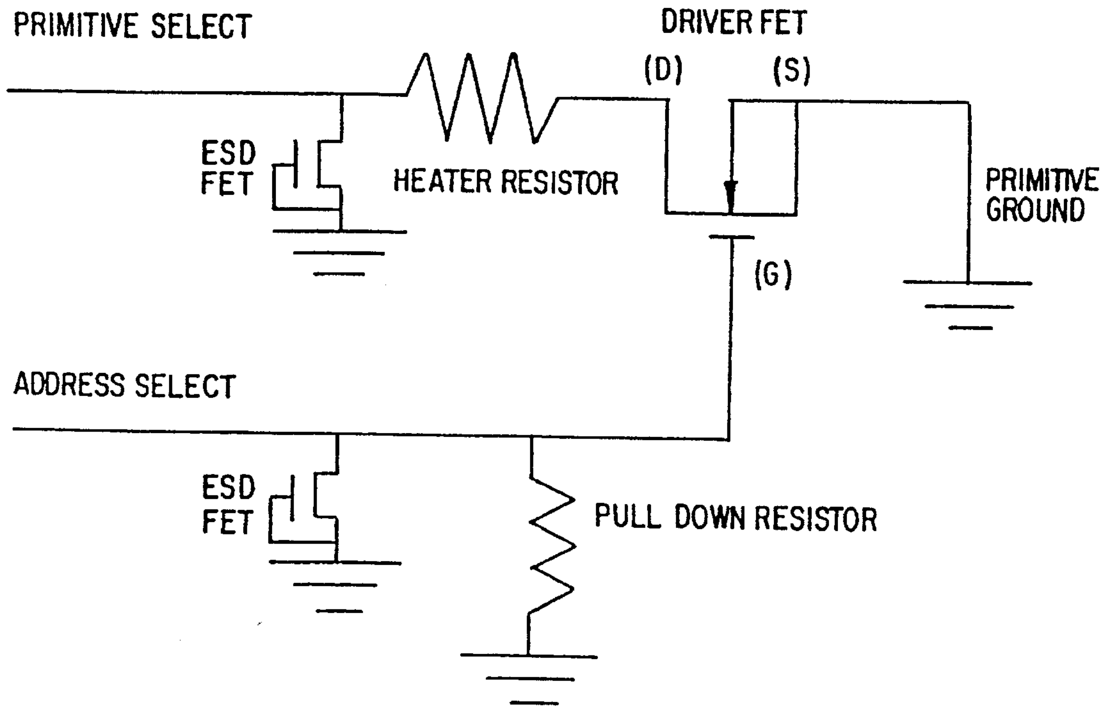
FIG. 27 is a schematic diagram of one heater resistor of FIGS. 25 and 26 and its associated address line, drive transistor, primitive select line and ground line.
Figure 29:
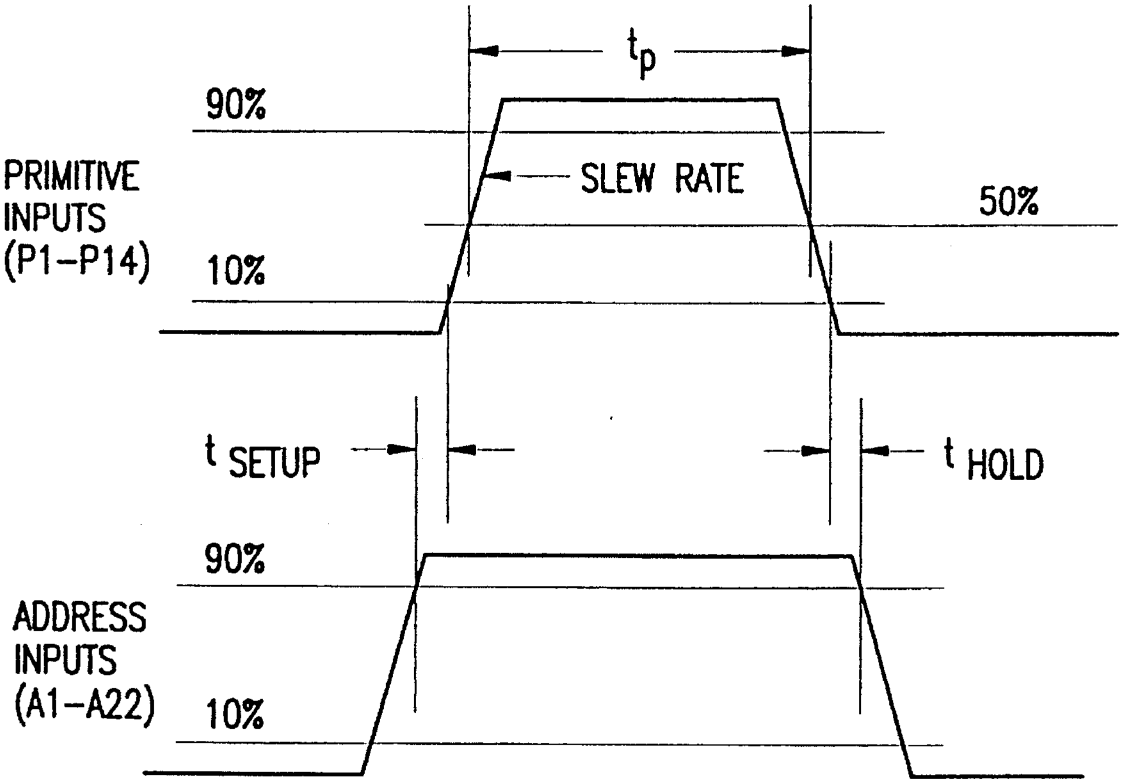
FIG. 29 is a schematic timing diagram for the setting of the address select and primitive select lines.

As described, the firing heater resistors 70 of the preferred embodiment are organized as fourteen primitive groups of twenty or twenty-two resistors. Referring now to the electrical schematic of FIG. 25 and the enlargement of a portion of FIG. 25 shown in FIG. 26, it can be seen that each resistor (numbered 1 through 300 and corresponding to the orifices 17 of FIG. 22) is controlled by its own FET drive transistor, which shares its control input Address Select (A1–A22) with thirteen other resistors. Each resistor is tied to nineteen or twenty-one other resistors by a common node Primitive Select (PS1–PS14). Consequently, firing a particular resistor requires applying a control voltage at its "Address Select" terminal and an electrical power source at its "Primitive Select" terminal. Only one Address Select line is enabled at one time. This ensures that the Primitive Select and Group Return lines supply current to at most one resistor at a time. Otherwise, the energy delivered to a heater resistor would be a function of the number of resistors 70 being fired at the same time. FIG. 27 is a schematic diagram of an individual heater resistor and its FET drive transistor. As shown in FIG. 27, Address Select and Primitive Select lines also contain transistors for draining unwanted electrostatic discharge and pull down resistors to place all unselected addresses in an off state. Table V and FIG. 28 show the correlation between the firing resistor/orifice and the Address Select and Primitive Select Lines.

energized) from A1 to A22 when printing form left to right and from A22 to A1 when printing from right to left. The print data retrieved from the printer memory turns on any combination of the Primitive Select lines. Primitive Select lines (instead of Address Select lines) are used in the preferred embodiment to control the pulse width. Disabling Address Select lines while the drive transistors are conducting high current can cause avalanche breakdown and consequent physical damage to MOS transistors. Accordingly, the Address Select lines are "set" before power is applied to the Primitive Select lines, and conversely, power is turned off before the Address Select lines are changed as shown in FIG. 29.

Figure 30:
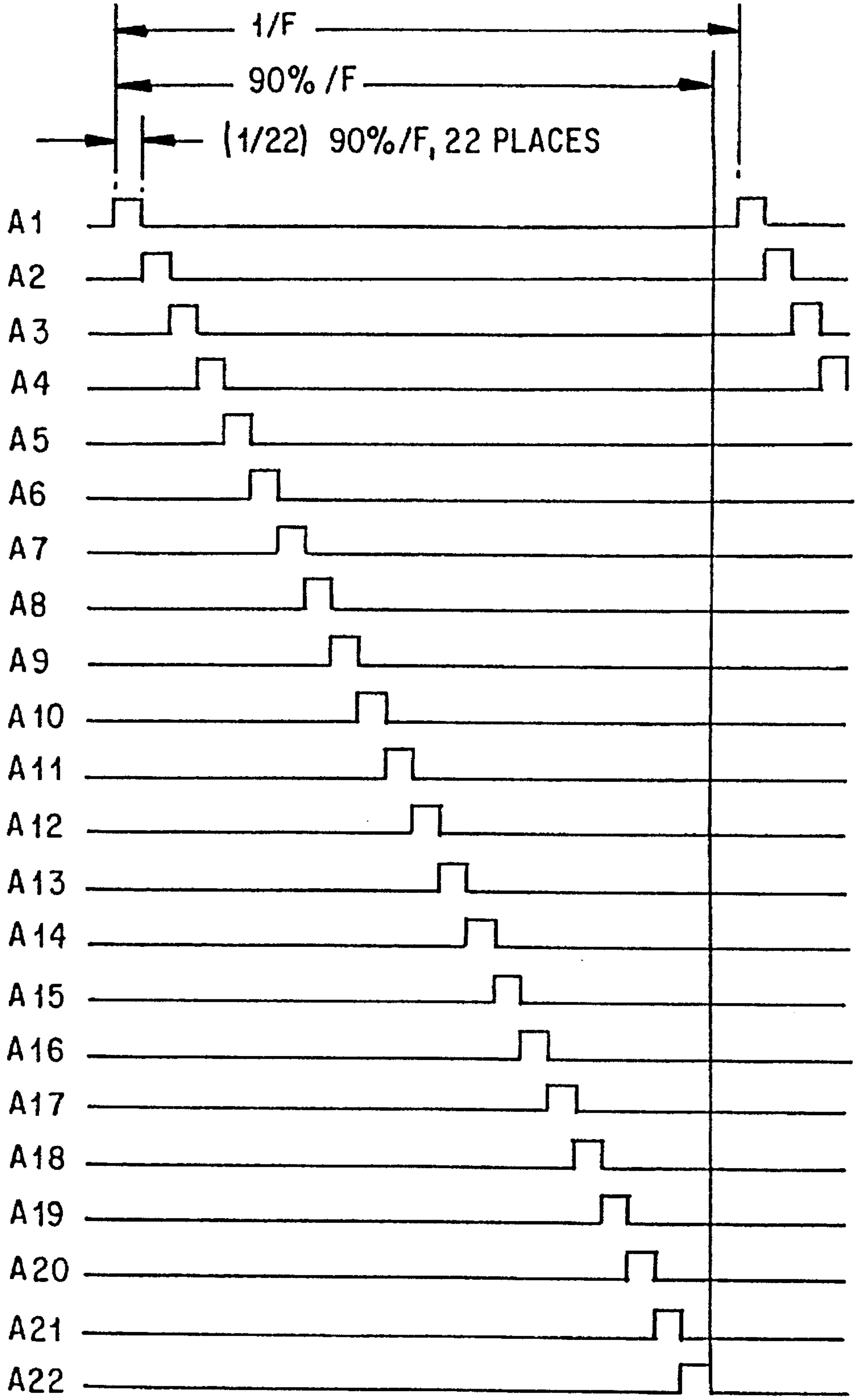
FIG. 30 is a schematic diagram of the firing sequence for the address select lines when the printer carriage is moving from left to right.

In response to print commands from the printer, each primitive is selectively fired by powering the associated primitive select interconnection. To provide uniform energy per heater resistor only one resistor is energized at a time per primitive. However, any number of the primitive selects may be enabled concurrently. Each enabled primitive select thus delivers both power and one of the enable signals to the driver transistor. The other enable signal is an address signal provided by each address select line only one of which is active at a time. Each address select line is tied to all of the switching transistors so that all such switching devices are conductive when the interconnection is enabled. Where a primitive select interconnection and an address select line for a heater resistor are both active simultaneously, that particular heater resistor is energized. Thus, firing a particular resistor requires applying a control voltage at its "Address Select" terminal and an electrical power source at its "Primitive Select" terminal. Only one Address Select line is enabled at one time. This ensures that the Primitive Select and Group Return lines supply current to at most one resistor at a time. Otherwise, the energy delivered to a heater resistor would be a function of the number of resistors 70 being fired at the same time. FIG. 30 shows the firing sequence when the print carriage is scanning from left to right. The firing

TABLE V

| | Nozzle Number by Address Select and Primitive Select Lines | | | | | | | | | | | | | |
|---|---|---|---|---|---|---|---|---|---|---|---|---|---|---|
| | P1 | P2 | P3 | P4 | P5 | P6 | P7 | P8 | P9 | P10 | P11 | P12 | P13 | P14 |
| A1 | 1 | | 45 | 42 | 89 | 86 | 133 | 130 | 177 | 174 | 221 | 218 | 205 | 262 |
| A2 | 7 | 4 | 51 | 48 | 95 | 92 | 139 | 136 | 183 | 180 | 227 | 224 | 271 | 208 |
| A3 | 13 | 10 | 57 | 54 | 101 | 98 | 145 | 142 | 189 | 186 | 233 | 230 | 277 | 274 |
| A4 | 19 | 16 | 63 | 60 | 107 | 104 | 151 | 148 | 195 | 192 | 239 | 238 | 283 | 290 |
| A5 | 25 | 22 | 69 | 66 | 113 | 110 | 157 | 154 | 201 | 198 | 245 | 242 | 289 | 286 |
| A6 | 31 | 28 | 75 | 72 | 119 | 116 | 163 | 160 | 207 | 204 | 251 | 248 | 295 | 282 |
| A7 | 37 | 34 | 81 | 78 | 125 | 122 | 169 | 166 | 213 | 210 | 257 | 254 | | 208 |
| A8 | | 40 | 43 | 84 | 87 | 128 | 131 | 172 | 175 | 216 | 219 | 260 | 263 | |
| A9 | 5 | 2 | 49 | 46 | 93 | 90 | 137 | 134 | 181 | 178 | 225 | 222 | 269 | 266 |
| A10 | 11 | 8 | 55 | 52 | 99 | 96 | 143 | 140 | 187 | 184 | 231 | 228 | 275 | 272 |
| A11 | 17 | 14 | 61 | 58 | 105 | 102 | 149 | 146 | 193 | 190 | 237 | 234 | 281 | 278 |
| A12 | 23 | 20 | 67 | 64 | 111 | 108 | 155 | 152 | 199 | 196 | 243 | 240 | 287 | 284 |
| A13 | 29 | 26 | 73 | 70 | 117 | 114 | 161 | 158 | 205 | 202 | 249 | 246 | 293 | 290 |
| A14 | 35 | 32 | 79 | 76 | 123 | 120 | 167 | 164 | 211 | 208 | 255 | 252 | 290 | 296 |
| A15 | | 38 | 41 | 82 | 85 | 126 | 129 | 170 | 173 | 214 | 217 | 258 | 261 | |
| A16 | 3 | | 47 | 44 | 91 | 88 | 135 | 132 | 179 | 176 | 223 | 220 | 267 | 264 |
| A17 | 9 | 6 | 53 | 50 | 97 | 94 | 141 | 138 | 185 | 182 | 229 | 226 | 273 | 270 |
| A18 | 15 | 12 | 59 | 56 | 103 | 100 | 147 | 144 | 191 | 188 | 235 | 232 | 279 | 276 |
| A19 | 21 | 18 | 65 | 62 | 109 | 106 | 153 | 150 | 197 | 194 | 241 | 238 | 285 | 282 |
| A20 | 27 | 24 | 71 | 68 | 115 | 112 | 159 | 156 | 203 | 200 | 247 | 244 | 291 | 288 |
| A21 | 33 | 30 | 77 | 74 | 121 | 118 | 165 | 162 | 209 | 206 | 253 | 250 | 297 | 294 |
| A22 | 39 | 36 | 83 | 80 | 127 | 124 | 171 | 168 | 215 | 212 | 259 | 256 | | 300 |

The Address Select lines are sequentially turned on via TAB head assembly interface circuitry according to a firing order counter located in the printer and sequenced (independently of the data directing which resistor is to be sequence is reversed when scanning from right to left. A brief rest period of approximately ten percent of the period is allowed between cycles. This rest period prevents Address Select cycles from overlapping due to printer carriage velocity variations.

The interconnections for controlling the TAB head assembly driver circuitry include separate primitive select and primitive common interconnections. The driver circuity of the preferred embodiment comprises an array of fourteen primitives, fourteen primitive commons, and twenty-two address select lines, thus requiring 50 interconnections to control 300 firing resistors. The integration of both heater resistors and FET driver transistors onto a common substrate creates the need for additional layers of conductive circuitry on the substrate so that the transistors could be electrically connected to the resistors and other components of the system. This creates a concentration of heat generation within the substrate.

Figure 31:
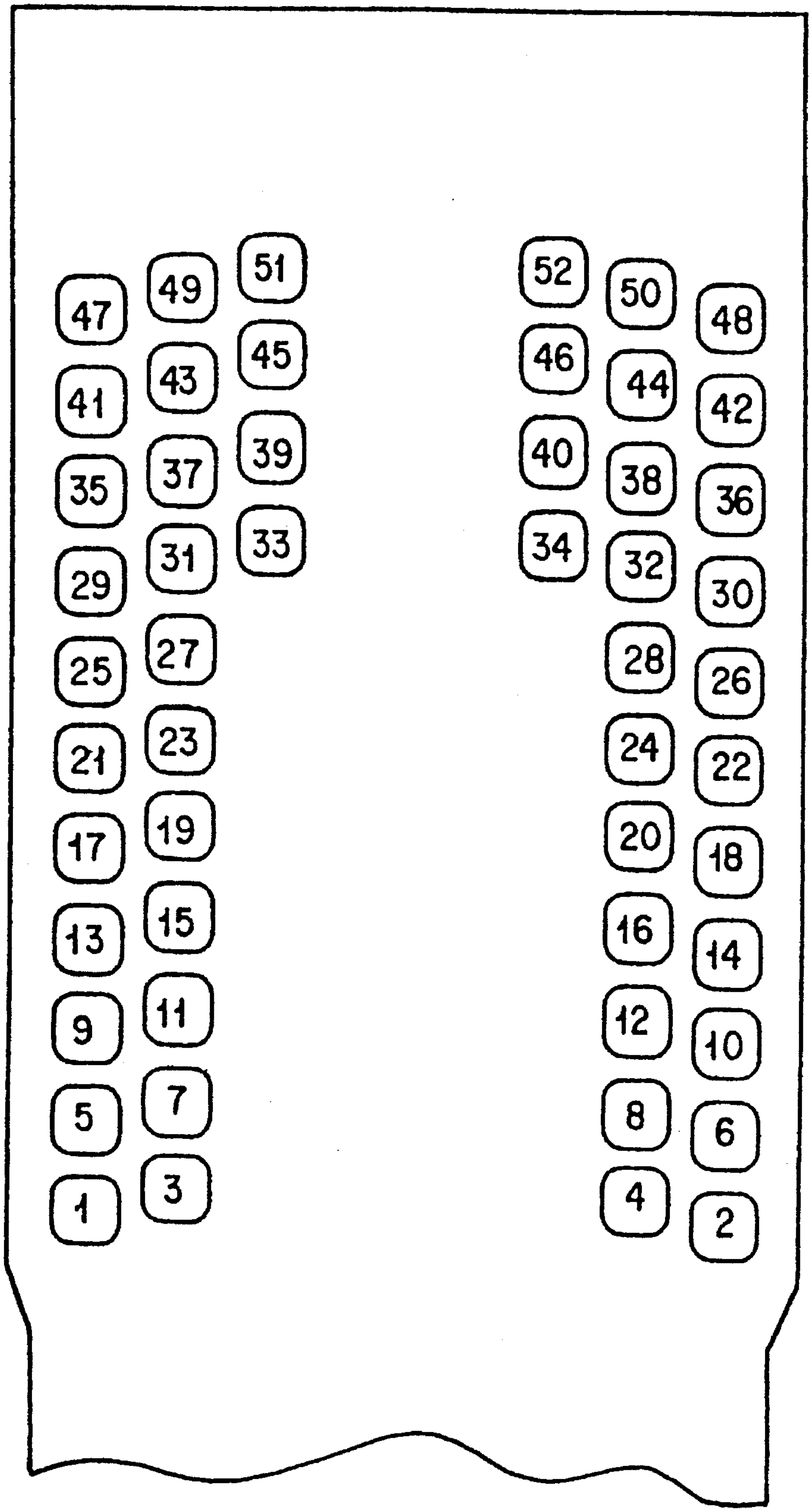
FIG. 31 is a diagram showing the layout of the contact pads on the TAB head assembly.

Referring to FIGS. 1 and 2, the print cartridge 10 is designed to be installed in a printer so that the contact pads 20, on the front surface of the flexible circuit 18, contact printer electrodes which couple externally generated energization signals to the TAB head assembly. To access the traces 36 on the back surface of the flexible circuit 18 from the front surface of the flexible circuit, holes (vias) are formed through the front surface of the flexible circuit to expose the ends of the traces. The exposed ends of the traces are then plated with, for example, gold to form the contact pads 20 shown on the front surface of the flexible circuit in FIG. 2. In the preferred embodiment, the contact or interface pads 20 are assigned the functions listed in Table VI. FIG. 31 shows the location of the interface pads 20 on the TAB head assembly of FIG. 2.

TABLE VI

ELECTRICAL PAD DEFINITION

| Odd Side of Head | | | Even Side of Head | | |
|---|---|---|---|---|---|
| Pad # | Name | Function | Pad # | Name | Function |
| 1 | A9 | Address Select 9 | 2 | G6 | Common 6 |
| 3 | PS7 | Primitive Select 7 | 4 | PS6 | Primitive Select 6 |
| 5 | G7 | Common 7 | 6 | A11 | Address Select 11 |
| 7 | PS5 | Primitive Select 5 | 8 | A13 | Address Select 13 |
| 9 | G5 | Common 5 | 10 | G4 | Common 4 |
| 11 | G3 | Common 3 | 12 | PS4 | Primitive Select 4 |
| 13 | PS3 | Primitive Select 3 | 14 | A15 | Address Select 15 |
| 15 | A7 | Address Select 7 | 16 | A17 | Address Select 17 |
| 17 | A5 | Address Select 5 | 18 | G2 | Common 2 |
| 19 | G1 | Common 1 | 20 | PS2 | Primitive Select 2 |
| 21 | PS1 | Primitive Select 1 | 22 | A19 | Address Select 19 |
| 23 | A3 | Address Select 3 | 24 | A21 | Address Select 21 |
| 25 | A1 | Address Select 1 | 26 | A22 | Address Select 22 |
| 27 | TSR | Thermal Sense | 28 | R10X | 10X Resistor |
| 29 | A2 | Address Select 2 | 30 | A20 | Address Select 20 |
| 31 | A4 | Address Select 4 | 32 | PS14 | Primitive Select 14 |
| 33 | PS13 | Primitive Select 13 | 34 | G14 | Common 14 |
| 35 | G13 | Common 13 | 36 | A18 | Address Select 18 |
| 37 | A6 | Address Select 6 | 38 | A 16 | Address Select 16 |
| 39 | A8 | Address Select 8 | 40 | PS12 | Primitive Select 12 |
| 41 | PS11 | Primitive Select 11 | 42 | G12 | Common 12 |
| 43 | G11 | Common 11 | 44 | G10 | Common 10 |
| 45 | A10 | Address Select 10 | 46 | PS10 | Primitive Select 10 |
| 47 | A12 | Address Select 12 | 48 | G8 | Common 8 |
| 49 | PS9 | Primitive Select 9 | 50 | PS8 | Primitive Select 8 |
| 51 | G9 | Common 9 | 52 | A14 | Address Select 14 |

The foregoing has described the principles, preferred embodiments and modes of operation of the present invention. However, the invention should not be construed as being limited to the particular embodiments discussed. As an example, the above-described inventions can be used in conjunction with inkjet printers that are not of the thermal type, as well as inkjet printers that are of the thermal type. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An inkjet printing system comprising:

an ink reservoir;

a substrate having a plurality of ink firing chambers with an ink firing element in each ink firing chamber along a top surface of said substrate, said substrate having a first outer edge along a periphery of said substrate, said first outer edge being in close proximity to the ink firing elements and substantially parallel to said ink firing elements;

an ink channel connecting said reservoir with said ink firing chambers, said ink channel including a primary channel connected at a first end with said reservoir and at a second end to a secondary channel, said primary channel allowing ink to flow from said ink reservoir, around said first outer edge of said substrate, and to said secondary channel along said top surface of said substrate; and a separate inlet passage for each firing chamber, said separate inlet passage being completely defined within the outer boundaries of said substrate, said separate inlet passage for each ink firing chamber connecting said secondary channel with said ink firing chamber for allowing refill of said ink firing chamber.

2. The inkjet printing system of claim 1 wherein said first outer edge around which said ink flows is continuous along said substrate.

3. The inkjet printing system of claim 1 wherein said secondary channel through which said ink flows is continuous along said first outer edge.

4. The inkjet printing system of claim 1 wherein said first outer edge is approximately 90 to 130 microns from said ink firing elements.

5. The inkjet printing system of claim 1 wherein said first outer edge is approximately 0 to 270 microns from said ink firing elements.

6. The inkjet printing system of claim 1 wherein said separate inlet passage for each firing chamber is formed in a barrier layer located only on said top surface of said substrate.

7. The inkjet printing system of claim 6 wherein said separate inlet passage for each firing chamber is defined by peninsulas formed in said barrier layer.

8. The inkjet printing system of claim 6 wherein the thickness of said barrier layer is approximately 19 to 32 microns.

9. The inkier printing system of claim 1 wherein said substrate includes a second outer edge, with said primary channel allowing ink to flow from said ink reservoir, around said second outer edge of said substrate, and to another secondary channel along said top surface of said substrate.

10. The inkjet printing system of claim 1 wherein said primary channel is defined by a print cartridge wall and the outer edge of said substrate.

11. The inkjet printing system of claim 1 wherein said ink reservoir is located within a print cartridge body also housing said substrate.

12. An inkier printing system comprising:

an ink reservoir;

a substrate having a plurality of ink firing chambers with an ink firing element in each ink firing chamber along a top surface of said substrate, said substrate having a first outer edge along a periphery of said substrate, said first outer edge being in close proximity to the ink firing elements and substantially parallel to said ink firing elements;

a nozzle member having a plurality of ink orifices formed therein, said nozzle member being positioned to overlie said top surface of said substrate;

an ink channel connecting said reservoir with said ink firing chambers, said ink channel including a primary channel connected at a first end with said reservoir and at a second end to a secondary channel, said primary channel allowing ink to flow from said ink reservoir, around said first outer edge of said substrate, and to said secondary channel along said top surface of said substrate; and a separate inlet passage for each ink firing chamber defined by a barrier layer on said top surface of said substrate located completely within the outer boundaries of said substrate, said separate inlet passage for each ink firing chamber connecting said secondary channel with said ink firing chamber for allowing refill of said ink firing chamber.

13. The inkjet printing system of claim 12 wherein said secondary channel is defined by the top surface of said substrate and a bottom surface of said nozzle member without said barrier layer therebetween.

14. The inkjet printing system of claim 12 wherein said separate inlet passage for each firing chamber is defined by peninsulas formed in said barrier layer.

15. The inkjet printing system of claim 14 wherein said peninsulas are constructed to provide an increased surface area for supporting said nozzle member when said nozzle member is positioned on a top surface of said substrate.

16. The inkjet printing system of claim 12 wherein said nozzle member has a plurality of cavities formed in it, each of said cavities being located over an associated inlet passage when said nozzle member is positioned on the top surface of said substrate.

17. The inkjet printing system of claim 16 wherein said cavities have a length between approximately 80 to 200 microns.

18. The inkjet printing system of claim 16 wherein said cavities have a width between approximately 20 to 50 microns.

19. The inkjet printing system of claim 16 wherein said cavities have a depth between greater than 0 to approximately 150 microns.

20. The inkjet printing system of claim 16 wherein said cavities are located between approximately 50 to 150 microns from said ink firing elements.

21. The inkjet printing system of claim 12 wherein said ink reservoir is located within a print cartridge body also housing said substrate.

22. The inkjet printing system of claim 12 wherein said primary channel includes wall portions which substantially surround said substrate, and said nozzle number is affixed to said wall portions to completely surround said substrate.

* * * * *